United States Patent
Whittingham et al.

(10) Patent No.: US 7,171,903 B2
(45) Date of Patent: *Feb. 6, 2007

(54) RATIOING ALGORITHM FOR A LABEL PRINTING SYSTEM USING PLATES

(75) Inventors: Paul Kenneth Whittingham, Harlow (GB); Patrick Tony Kenny, South Shore Blackpool (GB); Mandy Jane Smith, Loughborough (GB)

(73) Assignee: Paxar Corporation, White Plains, NY (US)

(*) Notice: Subject to any disclaimer, the term of this patent is extended or adjusted under 35 U.S.C. 154(b) by 1004 days.

This patent is subject to a terminal disclaimer.

(21) Appl. No.: 09/986,226

(22) Filed: Oct. 22, 2001

(65) Prior Publication Data
US 2003/0076538 A1 Apr. 24, 2003

Related U.S. Application Data

(63) Continuation-in-part of application No. 09/965,359, filed on Sep. 27, 2001, now Pat. No. 7,117,211.

(51) Int. Cl.
B41M 99/00 (2006.01)
G06Q 50/00 (2006.01)

(52) U.S. Cl. ..................... 101/484; 101/494

(58) Field of Classification Search ............ 101/483, 101/494, 484, 481; 358/1.18, 1.15; 707/9
See application file for complete search history.

(56) References Cited

U.S. PATENT DOCUMENTS

| | | | |
|---|---|---|---|
| 5,227,643 A | 7/1993 | Craig et al. | 235/462.15 |
| 5,239,622 A | 8/1993 | Best et al. | 358/1.18 |
| 5,287,434 A | 2/1994 | Bain et al. | 235/462.15 |
| 5,345,091 A | 9/1994 | Craig et al. | 235/462.15 |
| 5,621,864 A | 4/1997 | Benade et al. | 358/1.18 |
| 5,930,810 A | 7/1999 | Farros et al. | 715/506 |
| 6,018,338 A | 1/2000 | Greulich et al. | 715/823 |
| 2002/0030854 A1 | 3/2002 | Schutz et al. | 358/1.18 |
| 2002/0154338 A1 | 10/2002 | Tanaka | 358/1.18 |
| 2003/0004946 A1 | 1/2003 | VanDenAvond et al. | 707/9 |

FOREIGN PATENT DOCUMENTS

| WO | WO 01/55869 A1 | 1/2001 |
|---|---|---|
| WO | WO 01/66349 A1 | 3/2001 |

*Primary Examiner*—Leslie J. Evanisko
(74) *Attorney, Agent, or Firm*—McAndrews, Held & Malloy Ltd.

(57) ABSTRACT

A system and method of producing labels at remote locations worldwide in communication with a server and central database via the internet is shown and described. The present invention accommodates vastly different printing methods including thermal printing, lithographic printing, etc. For lithographic printing or other printing methods using plates, a ratioing algorithm is used to determine the optimum number of plates and label layout on each plate to minimize production costs.

27 Claims, 65 Drawing Sheets

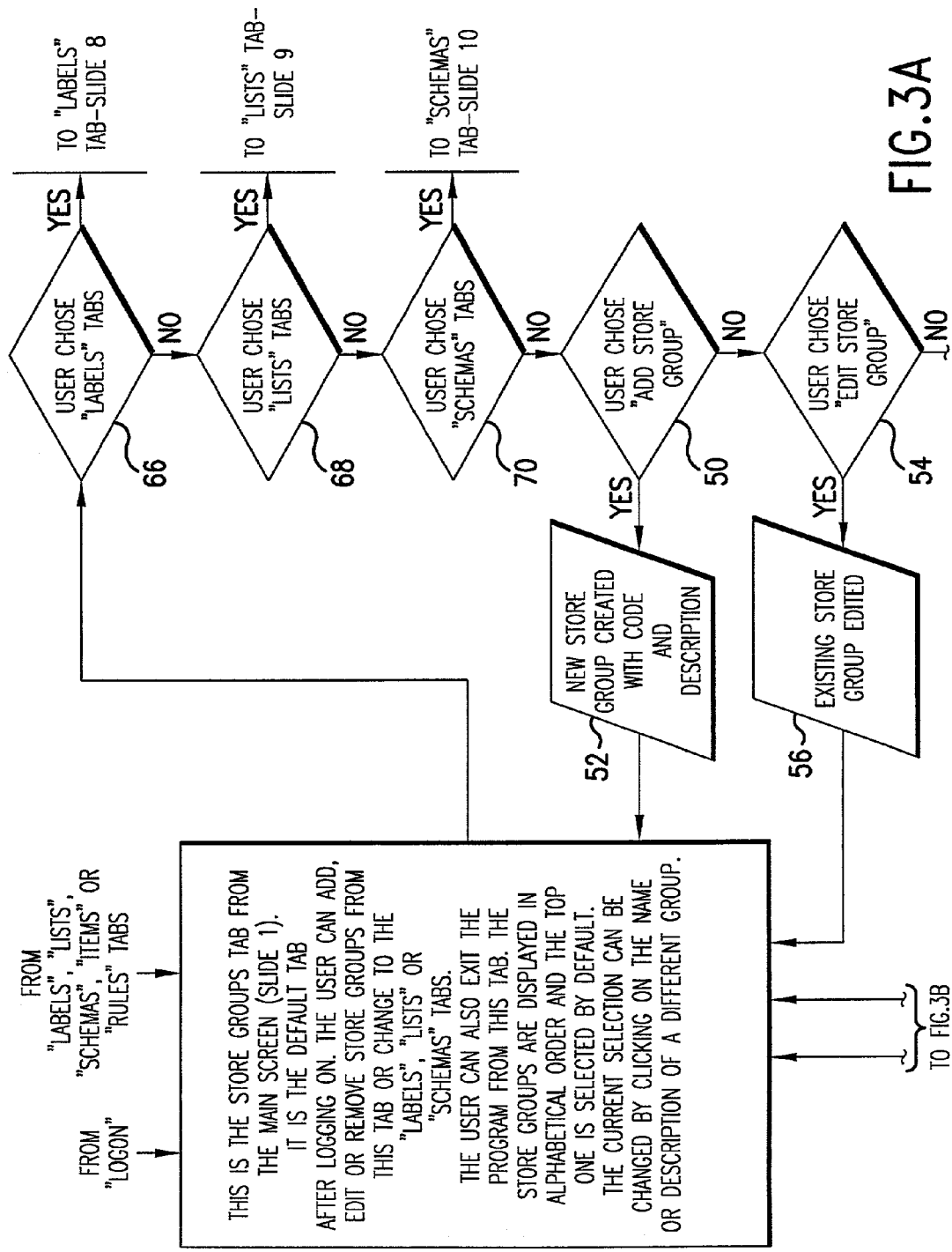

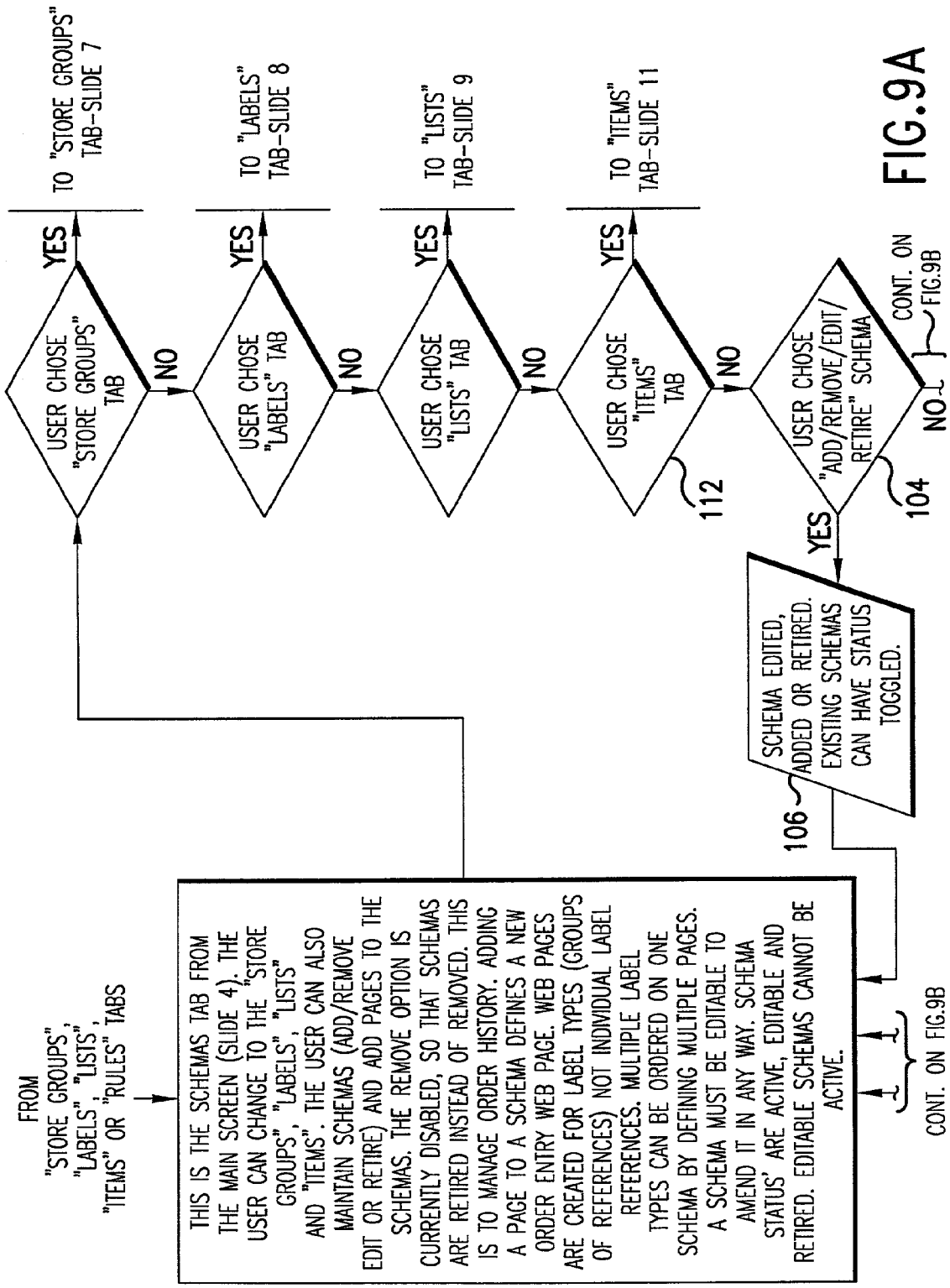

| PAGIT Schema Editor | | | | | | | | |
|---|---|---|---|---|---|---|---|---|
| Store Groups | Labels | Lists | Schemas | Items | Rules | | | |

Items

| Name | Type | S | T | M | Tag | Field ID | Count |
|---|---|---|---|---|---|---|---|
| Label Reference | List | N | N | O | LAB | F01 | 1 |
| Fibre | Static | Y | N | O | FIBRE | | 1 |
| Size Text | Text | Y | N | O | SIZETEXT | | 1 |
| Department | Text | Y | N | O | DEPT | | 1 |
| Style | Text | Y | N | O | STYLE | | 1 |
| Country Of Origin | Text | Y | N | O | CO | | 1 |
| Company Name | Static | Y | N | O | DGTEXT | | 1 |
| Website | Static | Y | N | O | WEBSITE | | 1 |

[Add Item]  [Edit Item]  [Remove Item]  [View Page]

Sub-Items

| Name | Type | S | T | M | Tag | Field ID | Count |
|---|---|---|---|---|---|---|---|

[Add Sub Item]  [Edit Sub Item]  [Remove Sub Item]

Current Store Group: [DG Demonstration]  Current Schema: [DG Labels]

Current Page: [Label Entry]  Current Item: [Label Reference]

Current Sub Item: [ ]

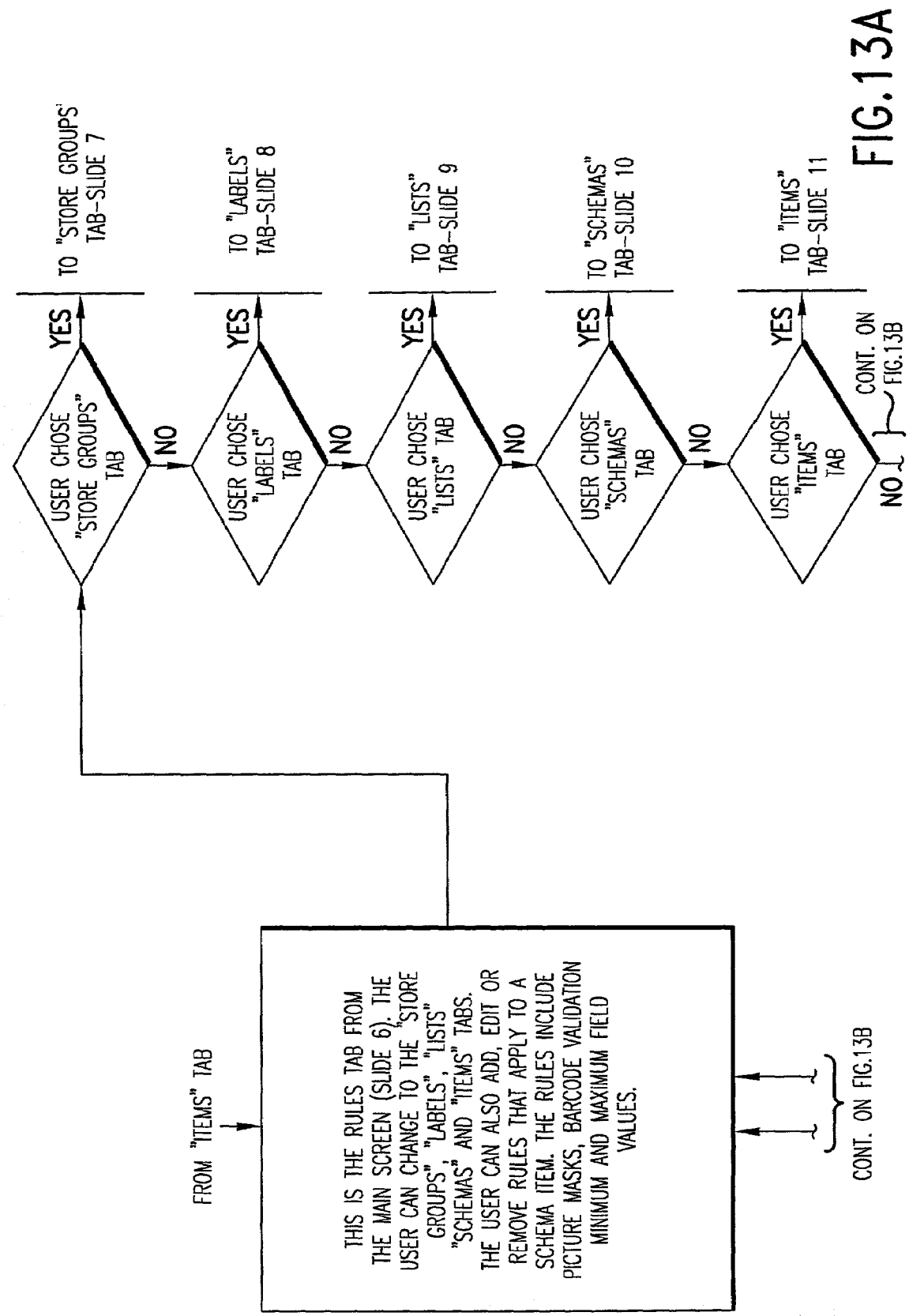

This page will show the order details and ask the user to confirm the details.
It will also have a link to take the user back to the order form to amend the order.

Order Details

Static variable data

| Block No | Var ID | Var Text | Field ID |
|---|---|---|---|
| 0001 | FLEX1_1 | RG | S09 |
| 0001 | FLEXD1_1 | Racing Green | S09 |
| 0001 | IEURO_1 | Y | P03 |
| 0001 | IRISH_1 | Y | P03 |
| 0001 | MESS_1 | JJB | S09 |
| 0001 | MSA_1 | Y | S09 |
| 0001 | P03_1 | 1.50 | P03 |
| 0001 | S01_1 | 43245 | S01 |

Lines

| Line No | DivisionID | ProductID | Quantity | Block No |
|---|---|---|---|---|
| 0001 | PAGN | ARC/UKRGDMT3775R | 100 | 0001 |
| 0002 | PAGN | ARC/UKRGDMT3775R | 200 | 0001 |
| 0003 | PAGN | ARC/UKRGDMT3775R | 300 | 0001 |

[Confirm]

FIG.20

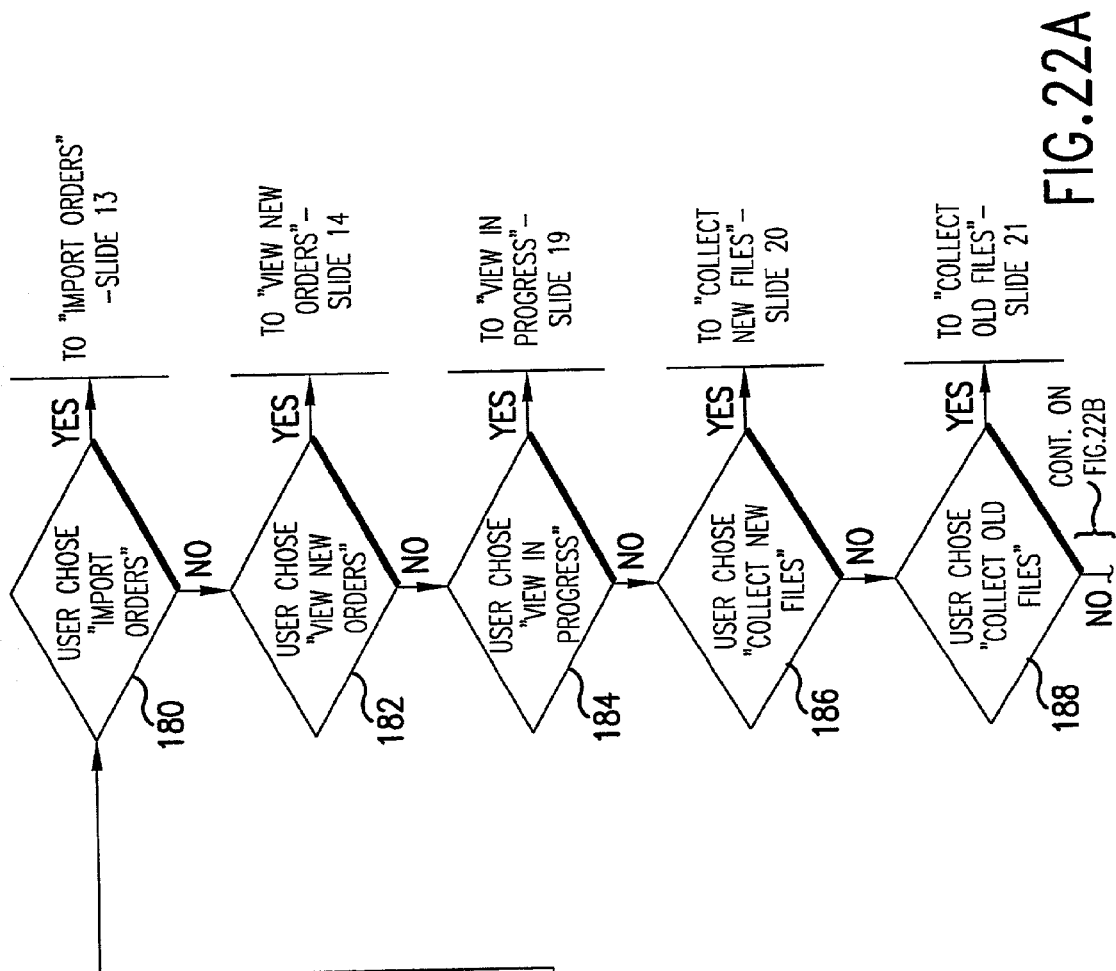

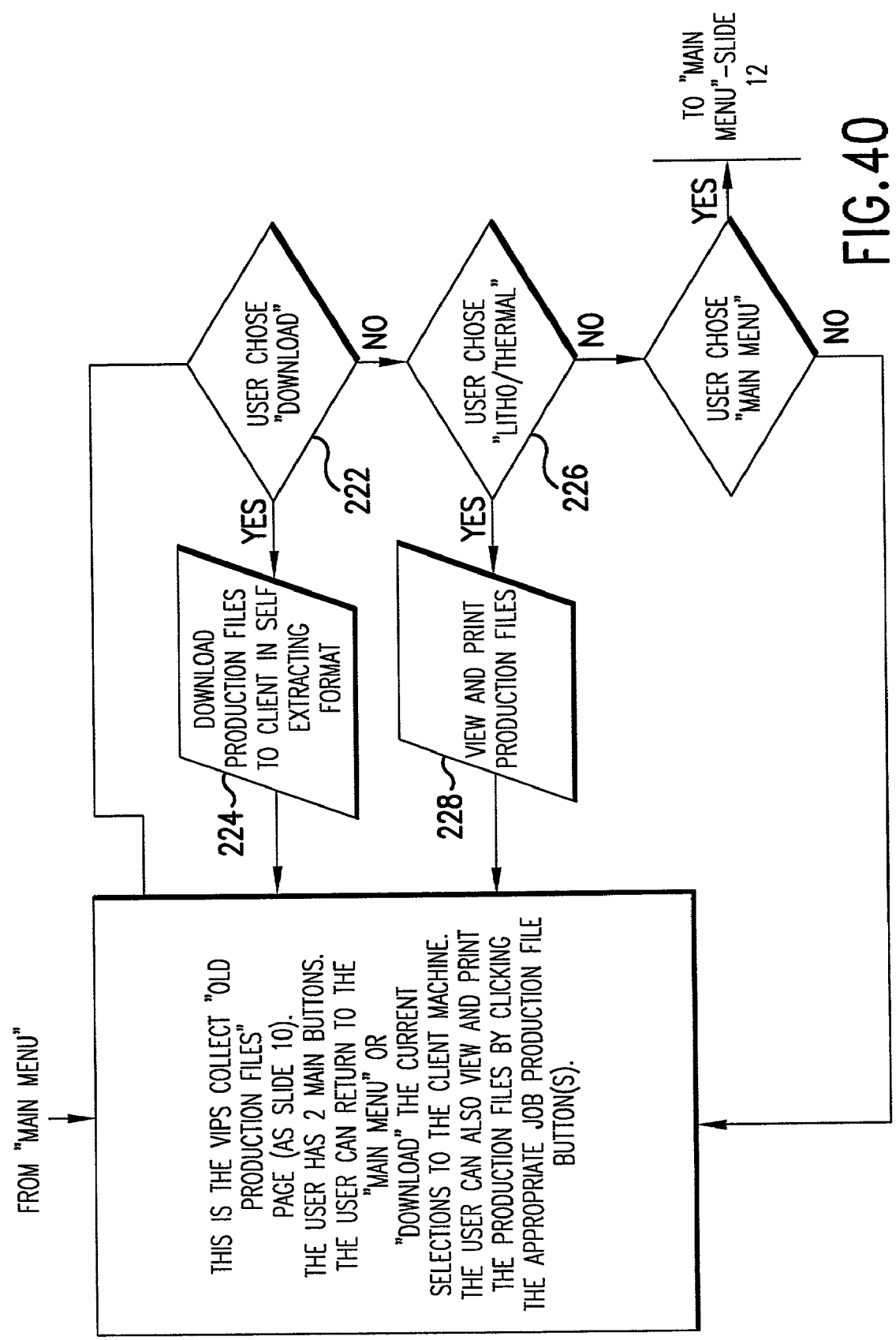

Files In Error

All Files In Error

| File Name | Date Created | Size |
|---|---|---|
| 020_quick | 04/10/00 11:14:34 | 53248 |
| BONM+UKBMDMT4815B+ | 26/02/01 14:11:57 | 86016 |
| MANGO+020 | 04/10/00 11:14:34 | 70656 |
| PAGN11_ARC+UKRGDMT3775R | 20/03/01 14:52:29 | 8807 |
| PAGN16_B errors | 03/07/01 14:01:58 | 370432 |
| PAGN16_F errors | 03/07/01 14:02:12 | 286464 |
| PAGN24_DG+MENS_LABEL | 20/03/01 14:52:29 | 8807 |
| PAGN25_DG+MENS_TICKET | 20/03/01 14:52:29 | 8807 |
| PAGN26_DG+MENS_TICKET | 20/03/01 14:52:29 | 8807 |
| PAGN27_DG+MENS_TICKET | 20/03/01 14:52:29 | 8807 |
| PAGN28_DG+MENS_TICKET | 20/03/01 14:52:29 | 8807 |
| PAGN29_DG+MENS_TICKET | 20/03/01 14:52:29 | 8807 |
| PAGN30_DG+MENS_TICKET | 20/03/01 14:52:29 | 8807 |
| PAGN32_DG+LADIES_TICKET | 20/03/01 14:52:29 | 8807 |
| PAGN36_B errors | 10/07/01 16:18:02 | 194304 |
| PAGN36_F errors | 10/07/01 16:18:09 | 196608 |
| PAGN3_PW+SmartLabel | 20/03/01 14:52:29 | 8807 |

FIG. 41

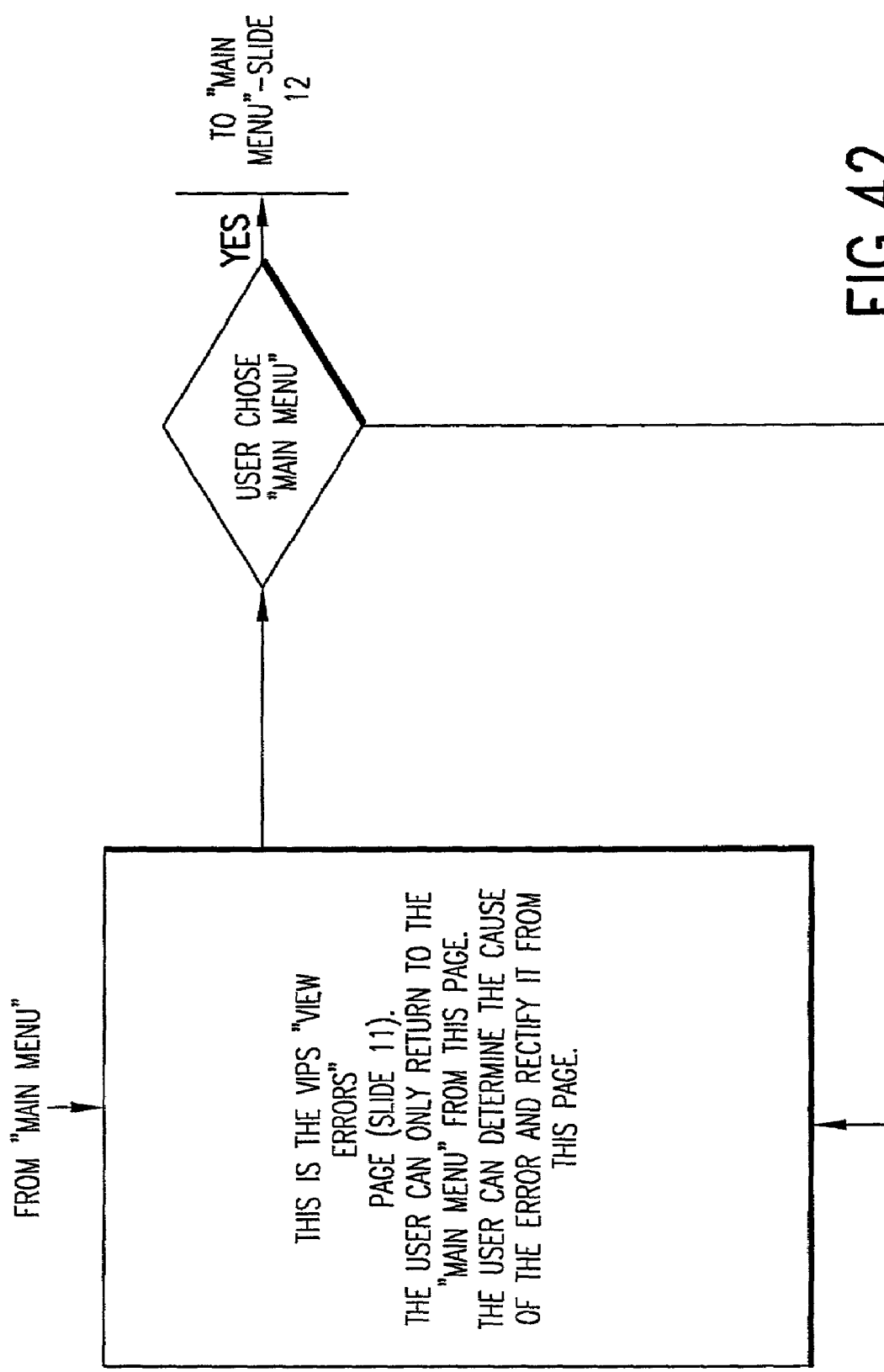

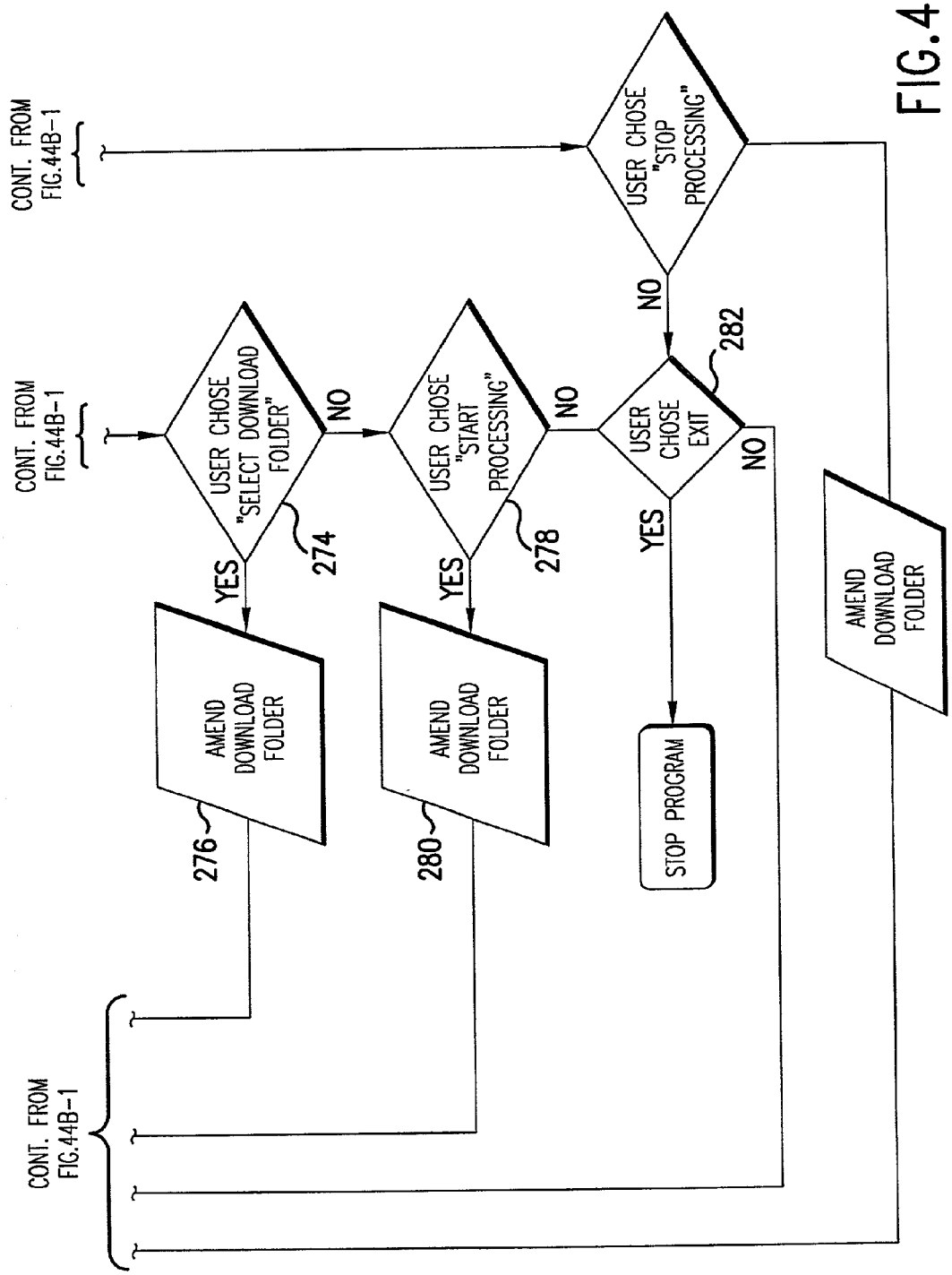

```
┌──────────────────────────────────────────────────────────────┐
│ □                        DG+MENS_TICKET                   □□ │
├─────────┬────────────────────────────────────────────────────┤
│ AllInfo │                                                    │
│ ┌─────┐ │   ┌──────────────────────────┐                     │
│ │▥▥▥▥▥│ │   │ PAGN75_                  │                     │
│ │  1  │ │   └──────────────────────────┘                     │
│ Records:│   ┌──────────────────────────┐                     │
│   2     │   │ DG/MENS_TICKET           │                     │
│ Unsorted│   └──────────────────────────┘                     │
```

| Field | Value |
|---|---|
| JobNumber | NA8180 |
| Quantity | 34 |
| NumberUp | 3 |
| Division | PAGN |
| BatchNo | 75 |
| Size | 32 |
| Department | 9038759 |
| Style | 87375 |
| Colour | Beige |
| Barcode | 000000000000 |
| Price | 59.99 |
| PriceExport | £59.99 |
| LineNo | 0001 |
| bardigits | 00 |
| BarcodeCreate | 000000000000 |
| ReadableBarcode | 0000000000008 |
| SizeLookupCode | DG/MENS_TICKET / 32 |
| CheckDigitFinal | 8 |
| Printer | Quickmaster (Platestream 46) |
| UserInfo | 20/7/2001   10:49:01 |
| Size1 | WAIST |
| Size2 | 32 |
| COO | UK  Made in the United Kingdom |
| COOout | Made in the United Kingdom |

RATIOING ALGORITHM FOR A LABEL PRINTING SYSTEM USING PLATES

CROSS-REFERENCE TO RELATED APPLICATIONS

This is a continuation-in-part of United States application Ser. No. 09/965,359 entitled "Internet Label Production System" filed Sep. 27, 2001 now U.S. Pat. No. 7,117,211.

STATEMENT REGARDING FEDERALLY SPONSORED RESEARCH OR DEVELOPMENT

N/A

TECHNICAL FIELD

The present invention relates to a system and method of producing labels at remote locations worldwide in communication with a server and central database via the internet.

BACKGROUND OF THE INVENTION

Systems are known that facilitate various processes in the production cycle of a label or tag. One such system known as GOES uses a limited number of hubs that are synchronized once a day to allow communication therebetween via a local area network. Once synchronized all customer orders, product updates, table amendments etc. can be distributed by a Global Router to and between all of the hubs. Each hub is further connected to a number of subsidiary sites which communicate with their parent hub by synchronization as well. In order for an order change from a subsidiary site to be updated at all of the hubs, the subsidiary site must first be synchronized at the parent hub and then the order change replicated and sent to other hub sites through the daily synchronization and routing process. Not only does this system require replication of all of the data at all of the hubs, but the synchronization process for routing information includes an inherent delay. Because of the delay, one or more hubs may be operating with obsolete information during a portion of the day before the synchronization process occurs. Typically, the system is set up so that only the parent hub has order entry capabilities and the subsidiary sites are limited to production based on data received from the hub. Once data is received at a production site it can be processed as described in U.S. Pat. No. 5,287,434. The systems shown in U.S. Pat. Nos. 5,227,643; 5,239,622 and 5,345,091 can interact with the GOES system to create printing jobs, edit formats and enter print data.

BRIEF SUMMARY OF THE INVENTION

In accordance with the present invention, the disadvantages of prior label ordering and production systems as discussed above, have been overcome. The label production system and method of the present invention allows labels to be produced at remote locations worldwide in communication with a server and central database via the internet. The system and method of the present invention provides automatic typesetting to generate various types of production, image data files in accordance with different requirements from various customers wherein the generated production files are used to print labels by vastly different printing techniques such as thermal printing, lithographic printing, etc. For lithographic printing, a ratioing method is implemented to generate the most cost effective number of plates and the layout of the labels on each plate.

More particularly, the ratioing method of the present invention includes determining a minimum number of plates to print the predetermined number of labels; determining a total number of times that each of the plates must be run to print the predetermined number of labels; and comparing the total run time number to a reference to determine whether to increase the number of plates.

In accordance with another feature of the method of the present invention, the reference number is a function of the total number of labels to be printed and the fixed number of label positions on a plate. Further, the minimum number of plates is determined based on the number of variables or different label types to be printed for a job and the fixed number of label positions on a plate.

In accordance with another feature of the present invention, the step of determining the total number of times that each of the plates must be run includes determining a number of label positions on at least one plate to be used for printing labels with the same data. Further, a quantity of labels with the same data can be printed by splitting the quantity between two or more plates.

BRIEF DESCRIPTION OF THE SEVERAL VIEWS OF THE DRAWING

FIGS. 3A and 3B form a flow chart illustrating the main configurator routine for store groups;

FIGS. 9A and 9B form a flow chart illustrating the configurator routine for schemas;

FIG. 10 is the screen associated with the flow chart of FIGS. 9A and 9B for schemas;

FIG. 12 is the screen associated with the flow chart of FIGS. 11A and 11B for items; Image Page 2

FIGS. 13a and 13B form a flow chart illustrating the configurator routine for validation rules;

FIG. 20 is a variable data and quantity display screen used for order confirmation and is associated with the flow chart of FIG. 15;

FIGS. 22A and 22B form a flow chart illustrating the main menu for the production routine;

FIG. 40 is a flow chart for the production routine, collect old production files;

FIG. 41 is a screen associated with the flow chart of FIG. 40;

FIG. 42 is a flow chart illustrating the production routine, files in error;

FIGS. 44B-1 and 44B-2 illustrate a screen and associated flow chart for the main typesetting job controller routine;

FIGS. 46A–C illustrate a screen, associated flow chart and postscript file screen for the typesetting routine, data merge;

Figure 47C:
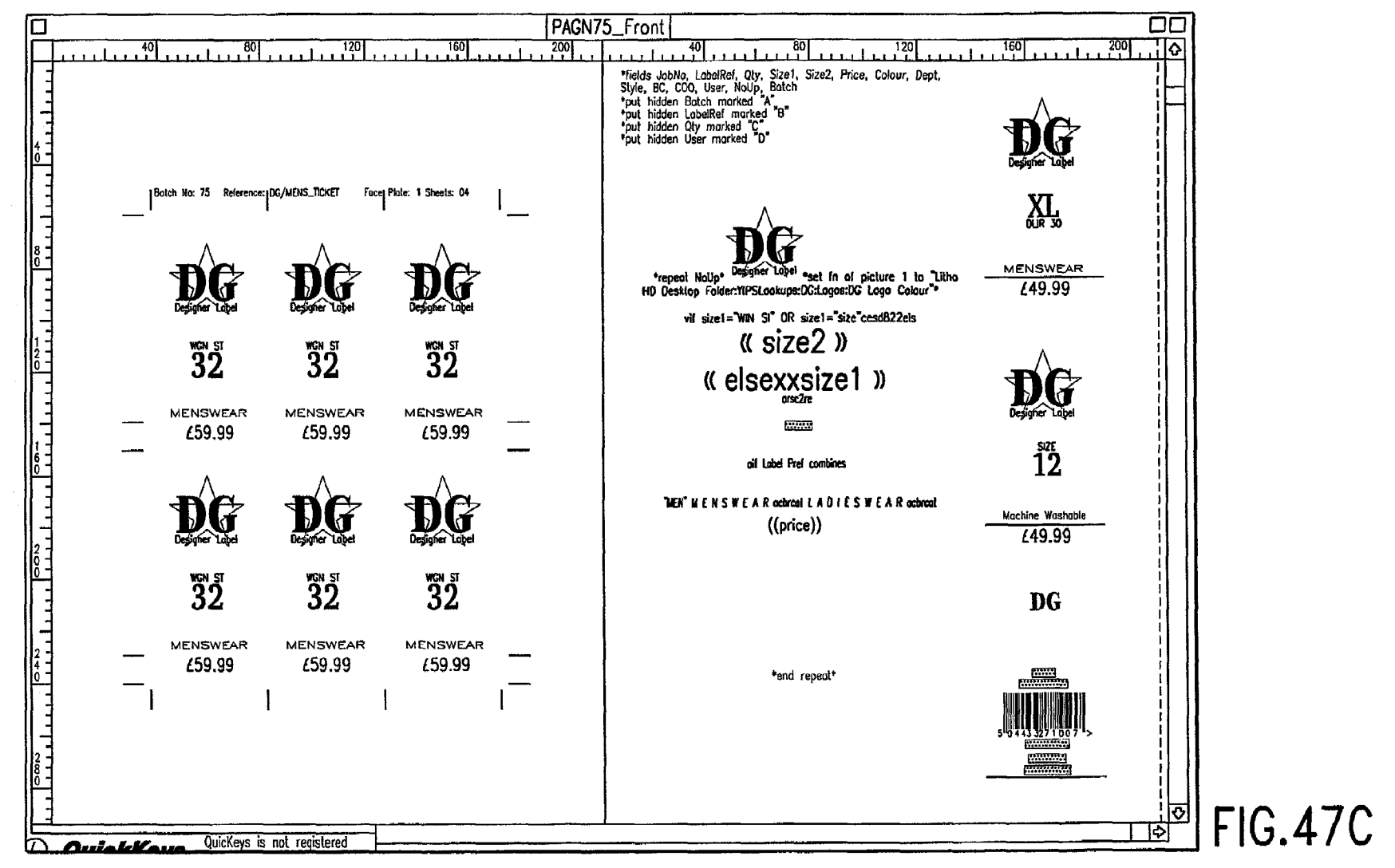

FIGS. 47A–D illustrate a screen, associated flow chart, PDF file front side and PDF file reverse side screens for the typesetting routine, PDF output.

FIG. 50 is a chart illustrating the data input to and the data output from the ratioing algorithm of FIG. 48.

DETAILED DESCRIPTION OF THE INVENTION

Figure 1:
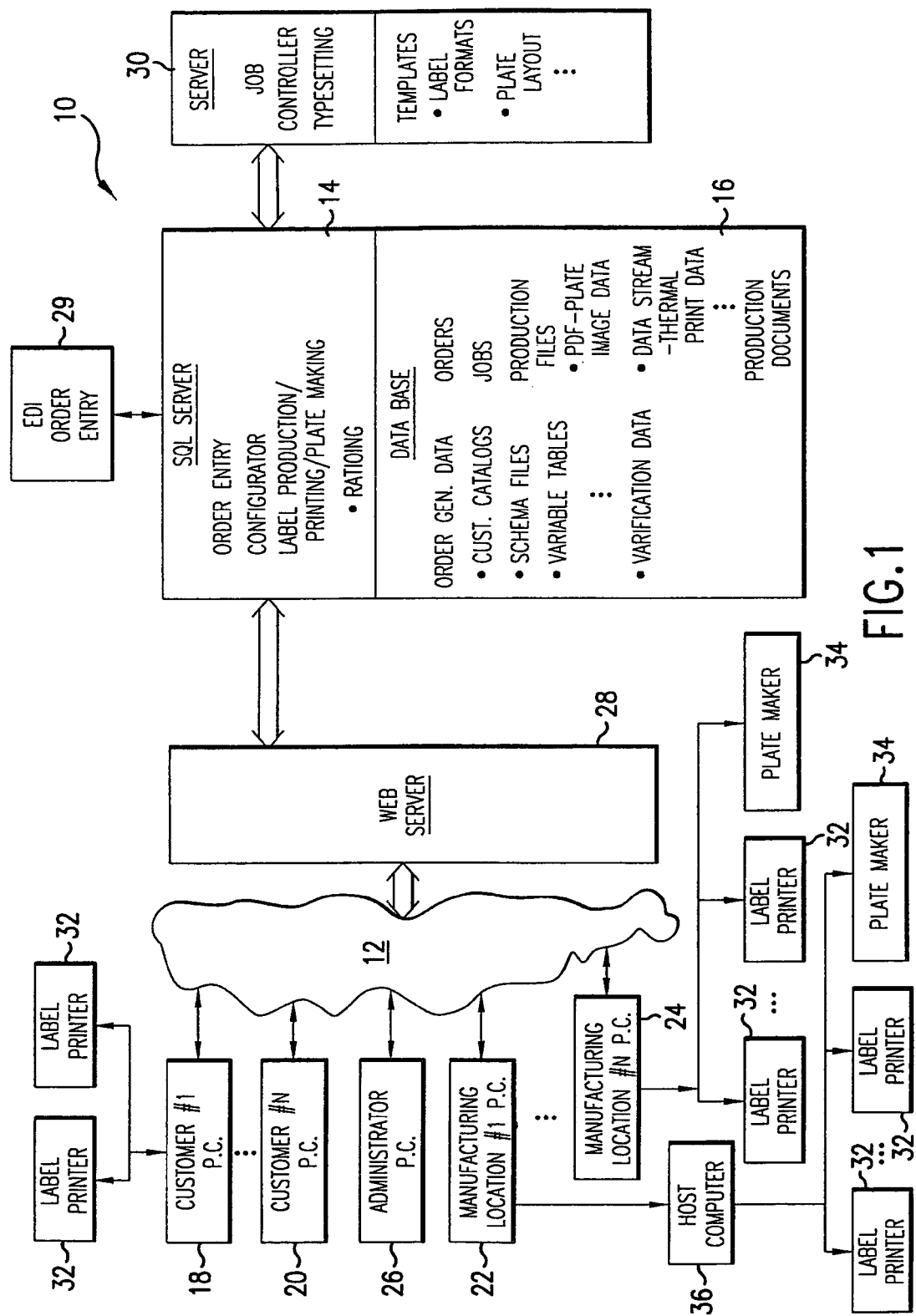
FIG. 1 is a block diagram of the label ordering, processing and production system of the present invention.

The label ordering and production system 10 of the present invention utilizes internet 12 communications with a server 14 and a central database 16 to allow orders for label products with variable data to be placed thereon to be received electronically from customers 18, 20 worldwide. The system 10 more importantly allows manufacturing locations 22, 24 worldwide to access received orders stored in the central database 16 and to process one order or groups of orders placed from various locations together for the production of labels in the most timely and cost effective manner. Not only can the system accommodate customers with different formats and different label type requirements, but the system processes and produces labels according to vastly different production methods including thermal printing and lithographic printing, but not limited thereto. The term label, as used herein, is meant to encompass any record member, paper, woven, etc. with information to be printed thereon for association with a product. For example, the term label encompasses care labels, content labels, price labels, hang tags, tickets, adhesive backed labels, non-adhesive backed labels, etc.

The main server 14 operates in accordance with a number of software routines as discussed in detail below to allow remote label ordering and production. A web server 28 acts as an interface for the main server 14, the web server 28 passing web pages to the various users 18, 20, 22, 24, 26 of the system and passing user entered information back to the main server 14. The main server routines include order entry routines to allow customers, such as a store group, vendor, garment or product manufacturer, using a PC 18, 20 or the like to order labels with variable data printed thereon via the internet. The variable data can include alphanumeric text such as price, size, content information, care information, etc. as well as barcode information. Orders that are received via the internet are stored in the central database 16 along with electronic orders entered as EDI files 29 and with keyboard entered orders received by phone and fax.

The order entry routines, as well as other routines, use information stored in the central database 16 including customer catalog files, schema files defining web pages, variable tables, verification data, etc. This stored data can be updated by an administrator using a PC 26 in communication with the main server 14 via the internet 12. The main server routines include configurator routines that allow the administrator to add via the internet new label products with different formats and/or production methods to the system. The configurator routines automatically generate web pages as defined in the schema files for order entry and processing of the new products. The configurator routines also allow the various tables such as the variable tables and verification data to be updated for products. This feature allows new products to be easily and quickly added to the system and web pages automatically created by personnel that are not skilled in writing software or programming.

Label production routines of the main server 14 allow any manufacturer worldwide using a PC 22, 24 or the like in communication with the server 14 via the internet 12 to access one or more orders stored in the central database to process the orders through production of labels. Orders originating from different locations, but for like or similar products, can be grouped together to form a job for more cost effective and efficient label production. A manufacturer can also take an order associated with one job and process it separately if the need arises. The system enables jobs to be easily formed and altered. The job data generated by the server 14 during the processing of one or more orders is stored in the central database 16. It is noted, that the manufacturing location can also alter the production method associated with a job for efficiency. For example, lithographic printing can be used for large jobs and thermal printing used for smaller volume jobs. Once one or more orders are grouped into a job and a production method or machine type selected, the label production routines of the server 14 and a job controller server 30 provide automatic typesetting. Although the main server 14 works with the job controller server 30 for automatic typesetting so as to affect extremely fast processing, it should be apparent that the functions performed by the server 30 can be performed by the server 14 alone if desired. The present invention need not use three servers as shown, the number of servers can be increased or decreased depending on the capabilities of each.

The server 30 has an associated database used for typesetting in which various templates are stored, each template defining a label format or plate layout, etc. for the various label products produced by the system 10. It is noted that the template information may also be stored in the central database 16. When a job is processed, the main server 30 passes job data to the job controller server 30 which opens the appropriate template; merges the print data included in the job data with a selected template and creates an appropriate production file for the type of production method or machine type to be used to produce the labels of the job. The production file preferably includes an image of the labels and/or plates to be produced as well as all required fonts and graphics so that the latter are not required to be stored at the actual printing, i.e. manufacturing location. It should be appreciated, however, that the production file need not include font and graphic information if that information is stored and readily accessible at the manufacturing location, for example. The types of production files generated varies with the different types of production methods employed. For example, for thermal printing, the production file preferably includes a data stream that can be fed to and printed by a thermal printer 32 coupled to a PC 18, 22, 24 or other type of computer that receives the production file via the internet 12. For lithographic printing, a PDF type production file is generated wherein this type of production file can be sent via the internet 12 to a remote PC or other computer which then couples the production file to a plate making machine 34 for the generation of a plate used in lithographic printing. The production files generated are transferred from the server 30 to the server 14 and stored in the central database 16 along with other production documents generated by the server 14. The production files for a job are then sent via the internet to the manufacturing location or customer location where the labels are printed. It should be appreciated that the production files can include one or more commands or instructions to effect automatic printing or platemaking upon receipt of the files by the machines 32, 34. Alternatively, the commands to start a printing or plate making operation can be sent in association with the production file by the receiving P.C. or host computer coupled to the machine 32, 34.

It is noted that prior to typesetting for lithographic printing, a ratioing algorithm may be performed. Multiple plates may be used for a lithographic printing job wherein each plate contains a layout of a number of label images which may be the same or different. Ratioing is an algorithm that determines the most cost effective number of plates and layout for each plate to produce a job of labels with different variable data to be printed thereon.

The generation of production files by the system 10 of the present invention takes only seconds as opposed to minutes or even hours as required by prior systems. Once the production file is generated by the system 10 and stored in the central database 16, the production file can be downloaded via the internet to a particular manufacturing location and, as discussed above, the job automatically printed on a thermal printer 32 or the plate automatically made by a plate maker 34 depending on the production method specified for the job. It is noted, that the printers 32 and/or plate makers 34 can be directly coupled via a network to the manufacturing location P.C. 22, 24 or, the printers 32 and/or plate makers 34 can be indirectly connected to the manufacturing location PC via a host computer 36 and local network. It should be appreciate that at the manufacturing location, the production file may be communicated to the printers 32/plate makers 34 by wireless communication or by a hard wired connection. It should also be noted that the labels may be produced or printed by the customer that ordered the labels on the customers own printers 32. This feature allows customers to order and print labels using the system 10 so that the customers do not have to generate production files themselves. Prior to the present invention, the generation of production files especially, when new formats or machine types are used, could be extremely time consuming and require highly skilled personnel.

Figure 2:
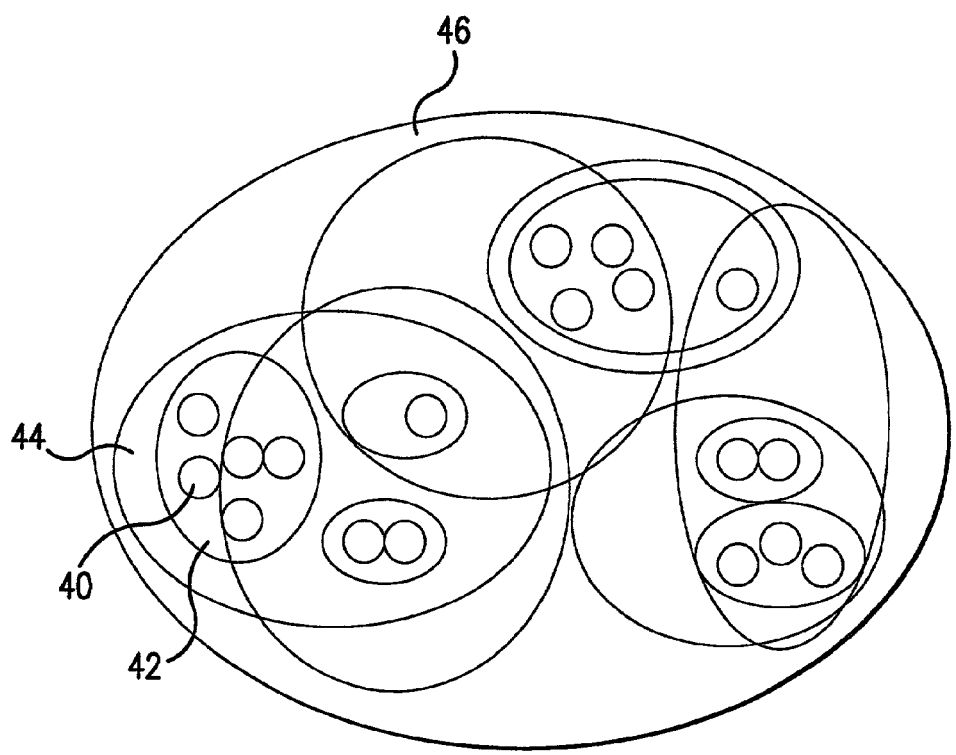
FIG. 2 is a diagram illustrating the relationship between store groups, label types, label references and vendor or product manufacturers ordering labels.

The organization of label information used in accordance with the present invention is depicted in FIG. 2. This organization allows the system 10 to dynamically generate new web pages as new label products are added to the system. This organization also facilitates order entry for products with variable data which in the past has been fairly complex. The organization includes store groups, label types, label references and customers as shown in FIG. 2 as well as schemas, pages and items described below. Label products that are available on the system 10 are given a label reference or identification 40. Label references are then placed in a label type 42. A label type is a group of label references that can share an order entry screen or web page. A label type 42 is associated with a particular store group 44. A customer 46, such as a vendor or garment manufacturer, may order labels for more than one store group. Each label type has an associated web page defined by a schema file for a particular store group. Contained within each web page are items to allow data for individual label fields, such as price, size, a barcode, content, care instruction, etc. to be entered. The schema definition is split into three main tables: schema header, schema page and schema items. The schema header is linked to a store group. A store group can have multiple schemas defined for it. Schema headers have one or more schema pages. The schema pages define the order entry web pages. A schema page is, as noted above, directly related to label types. For example, within a store group, label types could be defined for woven care labels and swing tickets or hang tags. Because the printed information required on each of these types of labels is so different, a different schema is required for each label type. The schema items table contains a description of all of the entry fields on a particular web page. Each page has a sequence number that describes the order in which the pages will be displayed during the course of order entry. Because a schema page is tied to a label type, there can be more than one page with the same sequence number. The user's choice of label selected from one web page will effect the display of subsequent pages. It is noted that schema items can range from simple alphanumeric entry fields to complex linked lists. Data validation is achieved by the system 10 by applying validation lists to as many of the entry fields as possible and at the point of entry of the data.

Figure 3B:
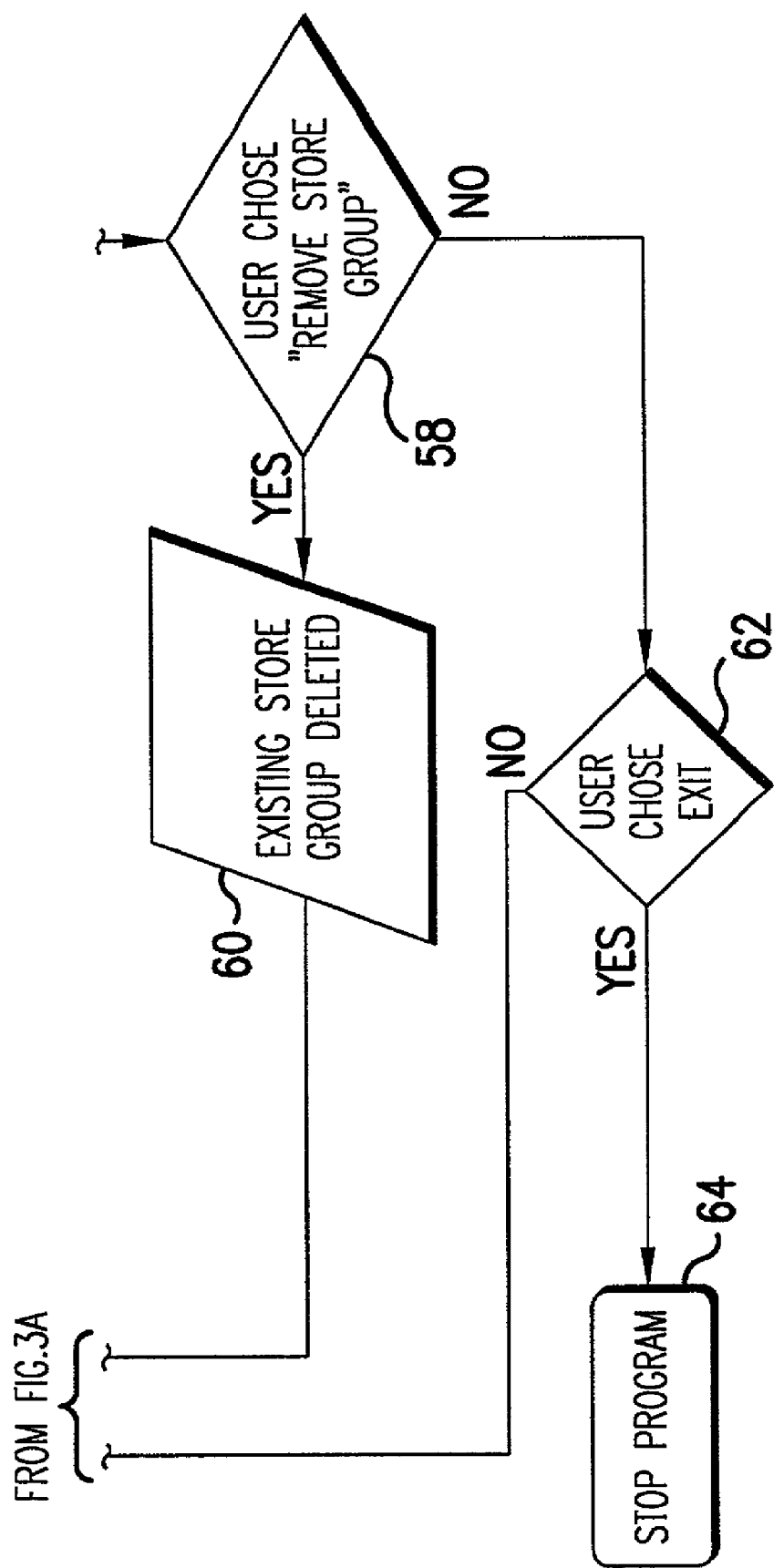
Figure 4:
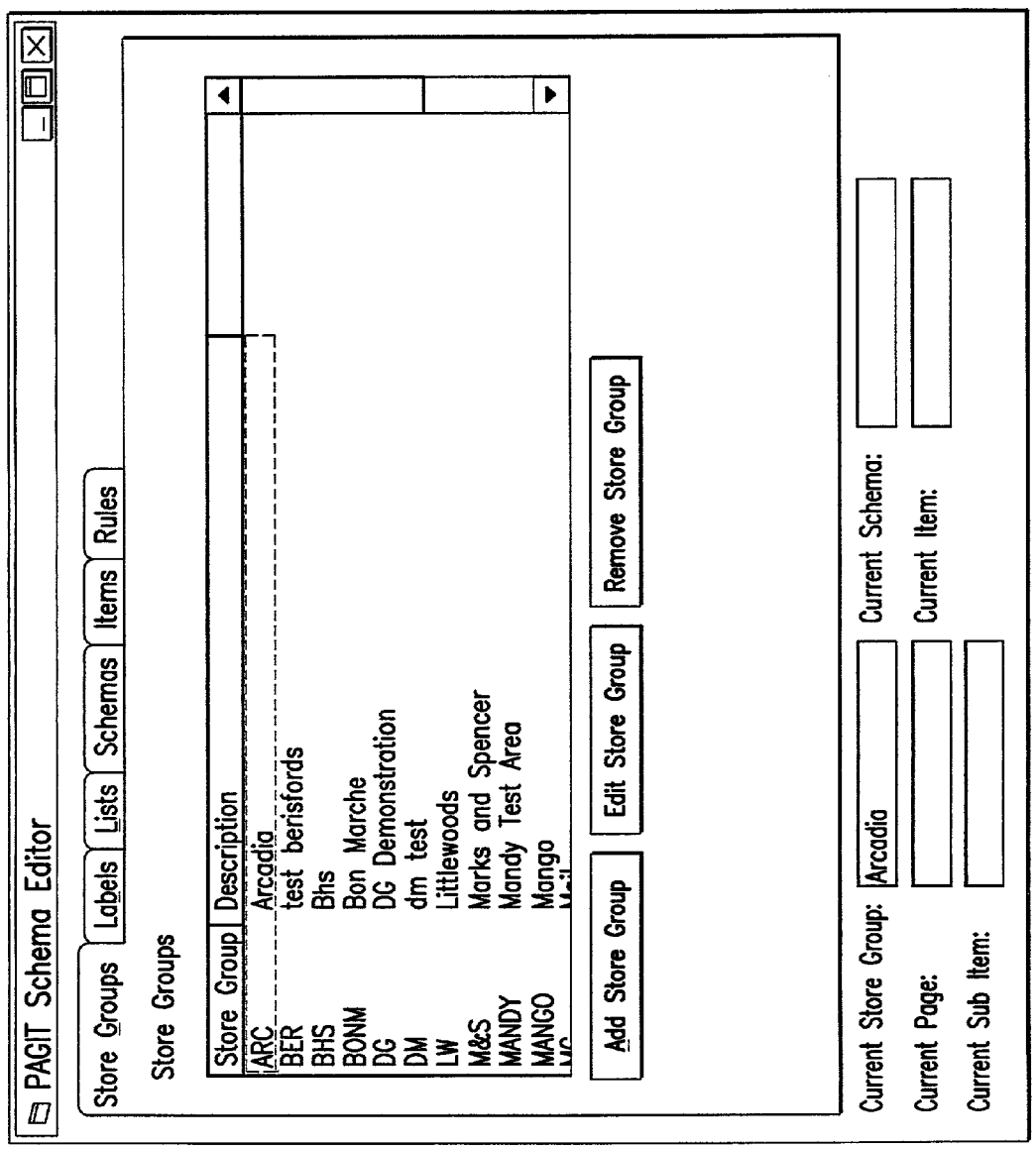
FIG. 4 is the screen associated with the flow chart of FIGS. 3A and 3B for store groups.

The configurator routines depicted in FIGS. 3–14 allow an administrator to add new products to the system wherein new web pages are automatically created in accordance with the updated schema tables. FIG. 3 illustrates the main configurator routine and FIG. 4 illustrates the associated screen. The main screen of FIG. 4 is divided into selection buttons or tabs. Each tab takes the user to a different area of the configurator. The configurator allows the user to configure variable data fields for a label. Multiple labels with the same printed information may be grouped together into label types. Validation rules can be applied to each field. The structure of the label is saved into the schema database table which is used to automatically generate the order entry web pages when a user logs on to the internet to place an order. FIG. 3 illustrates the flow chart for the store group tab of the main screen of FIG. 3. This is the default tab after the user logs on. If the user chooses to add a store group as determined at block 50 a new store group is created at block 52 with associated code and description. If the user chooses to edit a store group as determined at block 54, the existing store group is edited at block 56. If the user chooses to remove a store group as determined at block 58, the existing store group is deleted at block 60. The user can also exit the program as determined at block 62 and the program will be stopped at block 64. As shown in FIG. 4, the store groups are displayed in alphabetical order and the top store group is highlighted or selected by default. The current selection can be changed by moving the cursor to the name or description of a different group. From the screen of FIG. 4, if the user chooses the "Labels" tab as determined at block 66, the routine proceeds to the routine depicted in FIG. 5. If the user chooses the "Lists" tab as determined at block 68, the routine proceeds to the routine depicted in FIG. 7. If the user chooses the "Schemas" tab as determined at block 70, the routine proceeds to the routine depicted in FIG. 9.

Figure 5A:
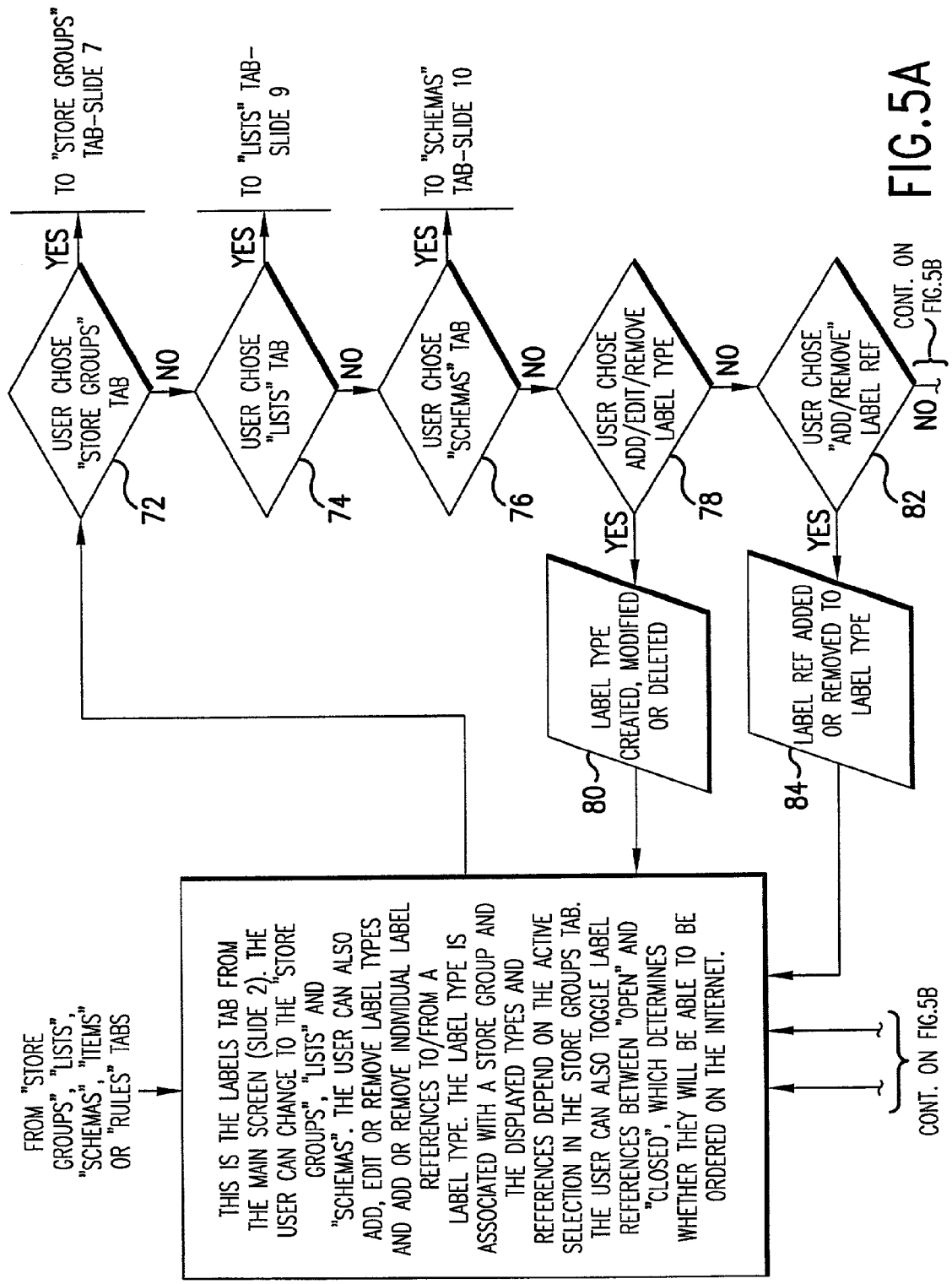
FIGS. 5A and 5B form a flow chart illustrating the configurator routine for labels.
Figure 5B:
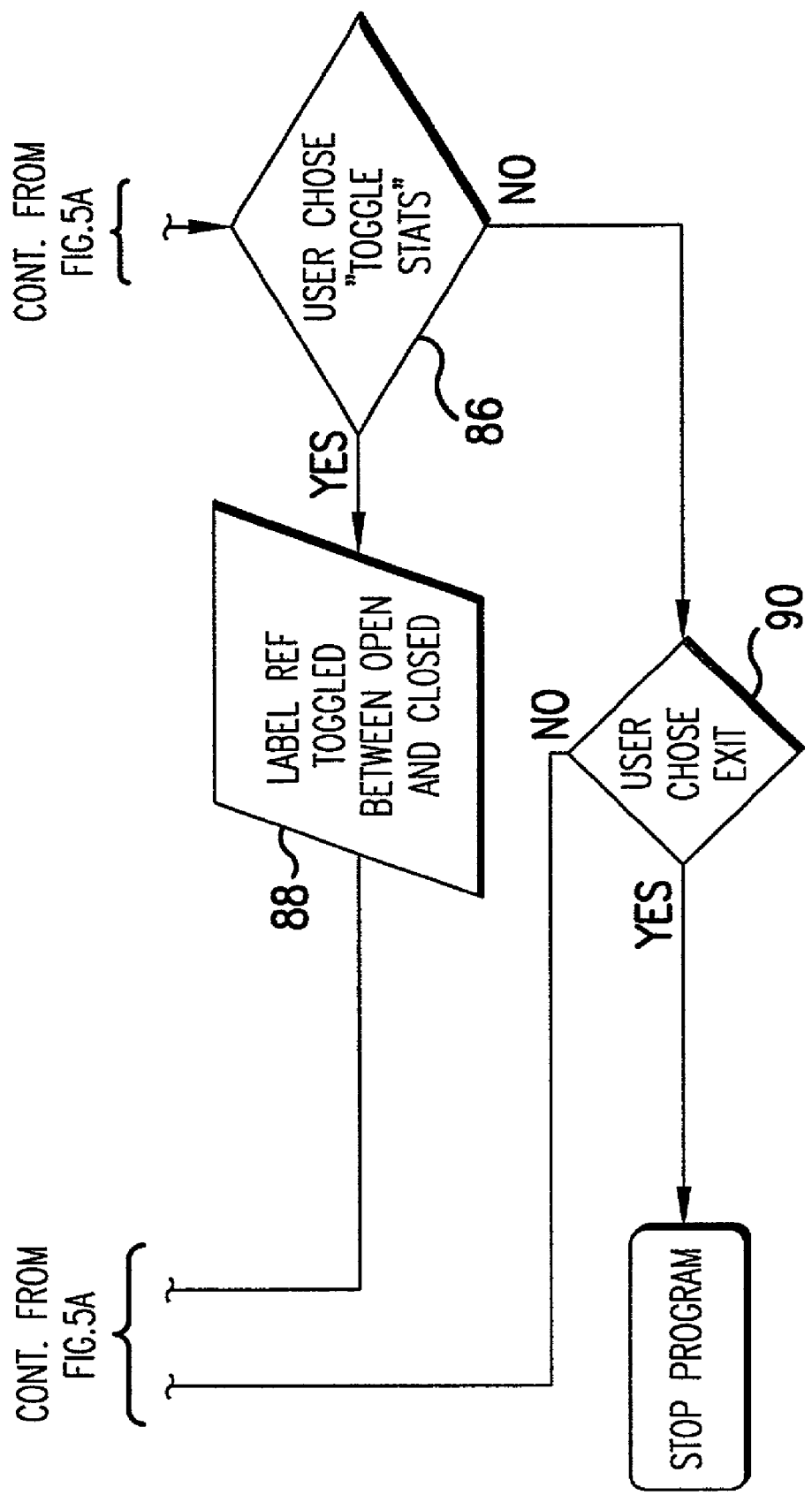
Figure 6:
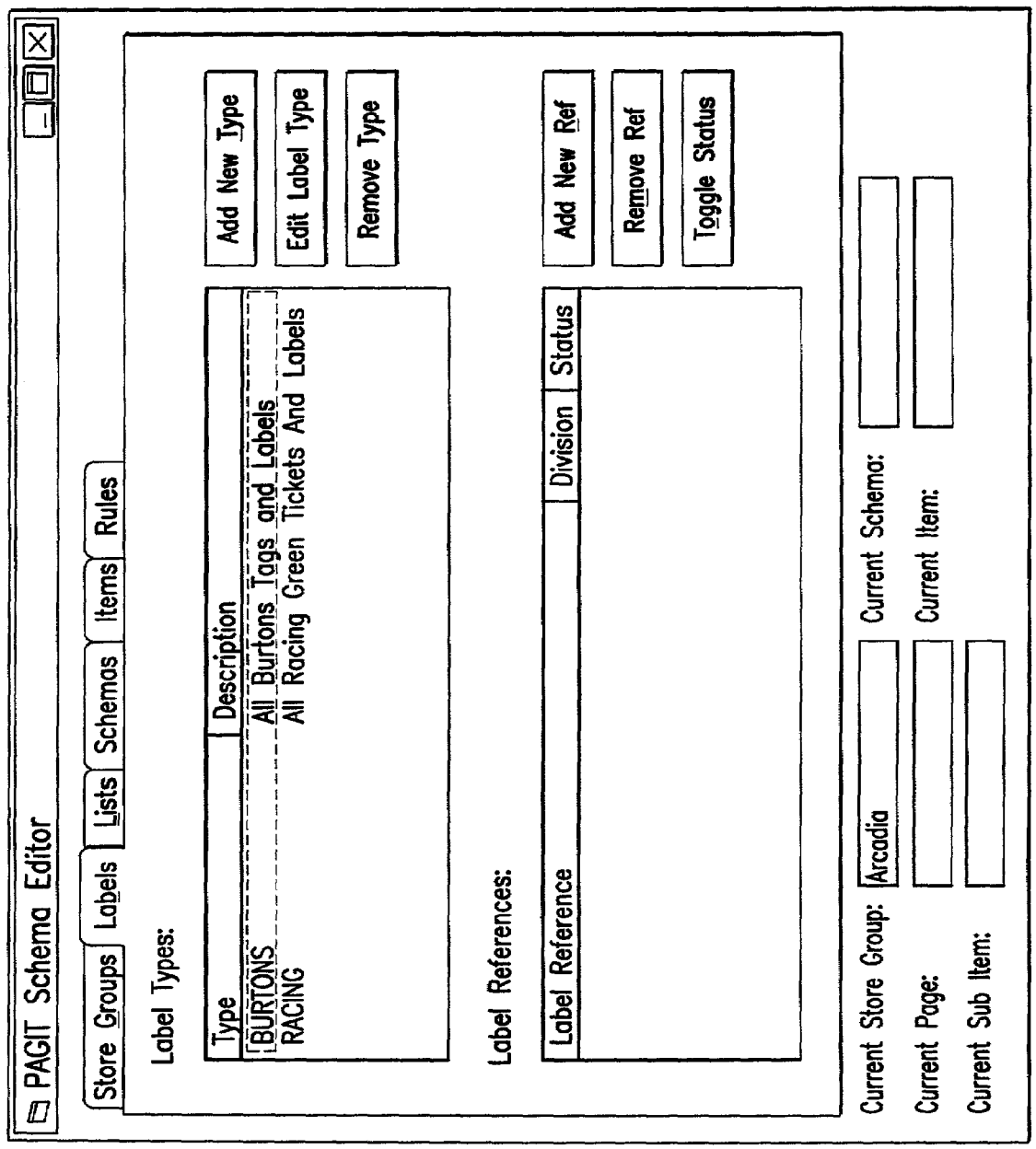
FIG. 6 is the screen associated with the flow chart of FIGS. 5A and 5B for labels.

FIG. 5 illustrates the configurator labels screen. This screen and routine allows label types to be defined. Individual label references are then added to the label type. For example, one label type, "care labels," can be defined and several individual care label references, i.e. label identification added to this label type. Care labels of the same type share the same field definition and order entry web page. From the screen depicted in FIG. 6, the user can choose the "Store Groups" tab as determined at block 72 in which case the routine will return to the store group routine depicted in FIG. 3. The user may also use the "Lists" tab as determined at block 74 in which case the routine proceeds to the routine depicted in FIG. 7. If the user chooses the "Schemas" tab as determined at block 76, the routine proceeds to the routine depicted in FIG. 9. If the user chooses to add, edit or remove a label type as determined at block 78, the configurator routine at block 80 creates a new label type, modifies an existing label type or deletes an existing label type. If the user chooses to add or remove a label reference as determined at block 82, the configurator routine at block 84 adds a new label reference or removes a label reference from the label type. If the user chooses to toggle label references between open and closed as determined at block 86, the configurator at block 88 will change an open label reference to closed or will change a closed label reference to open. Only open label references are able to be ordered via the internet 12. The user can also choose to exit the program as determined at block 90.

Figure 7A:
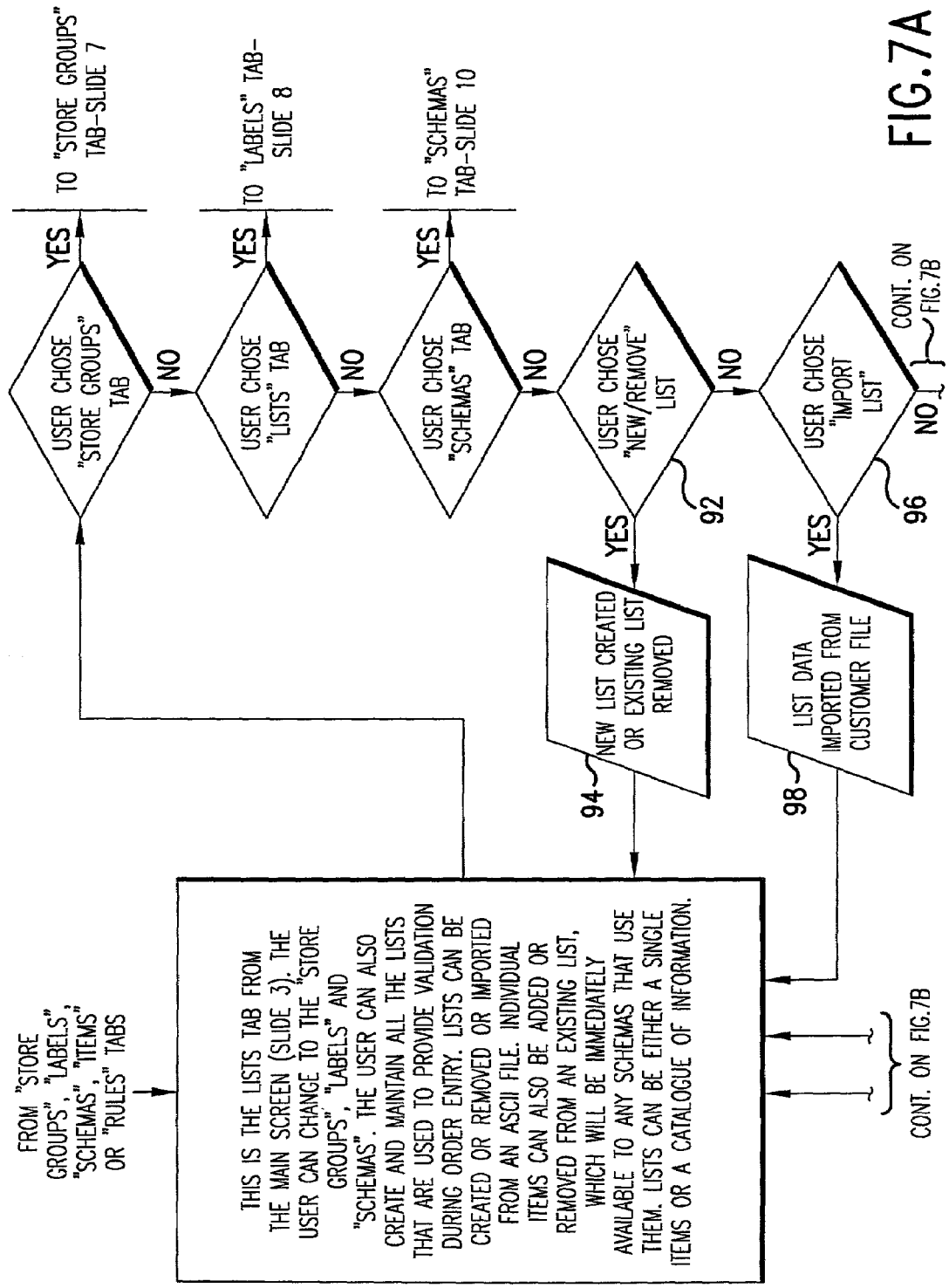
FIGS. 7A and 7B form a flow chart illustrating the configurator routine for lists.
Figure 7B:
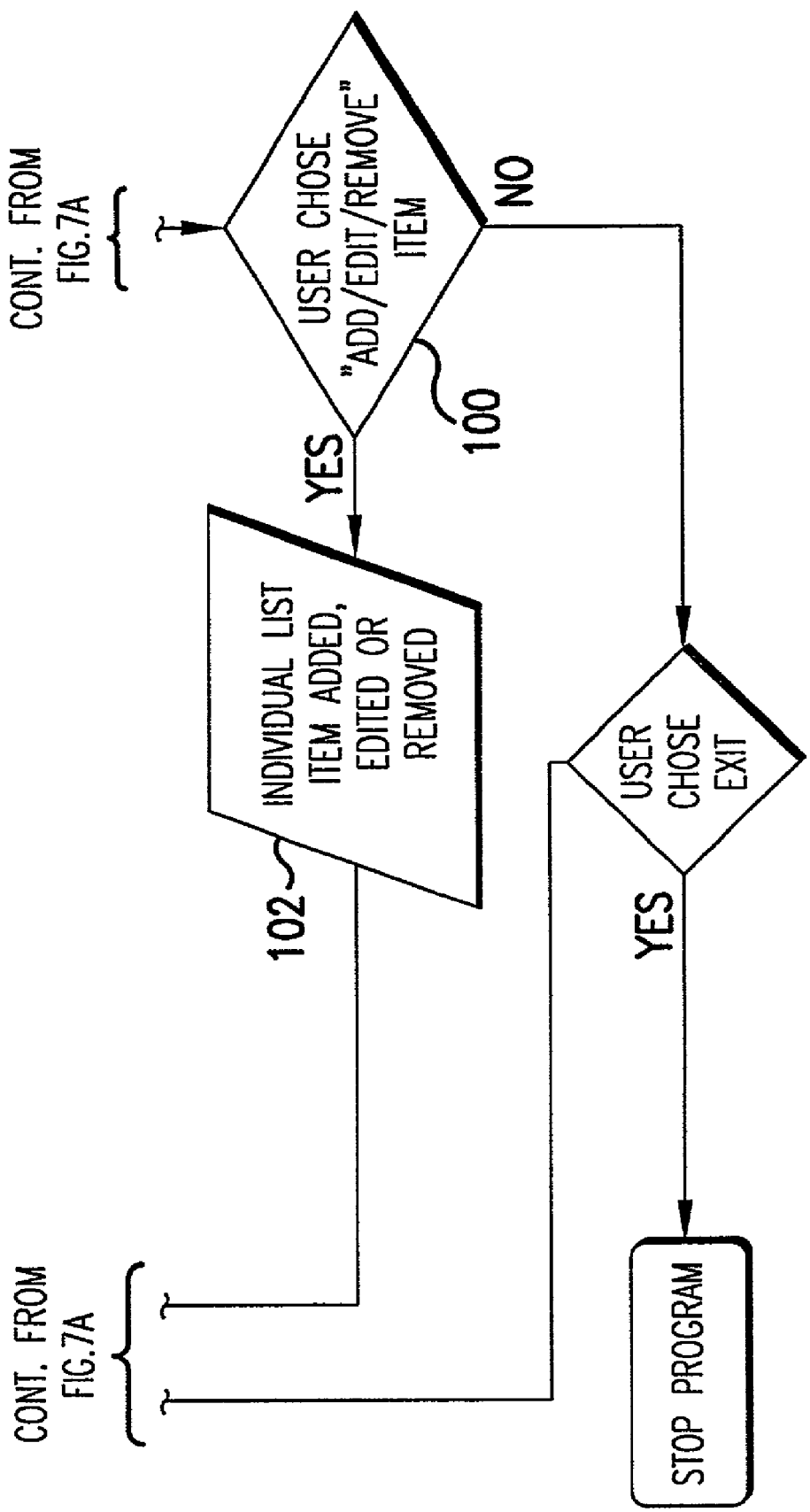
Figure 8:
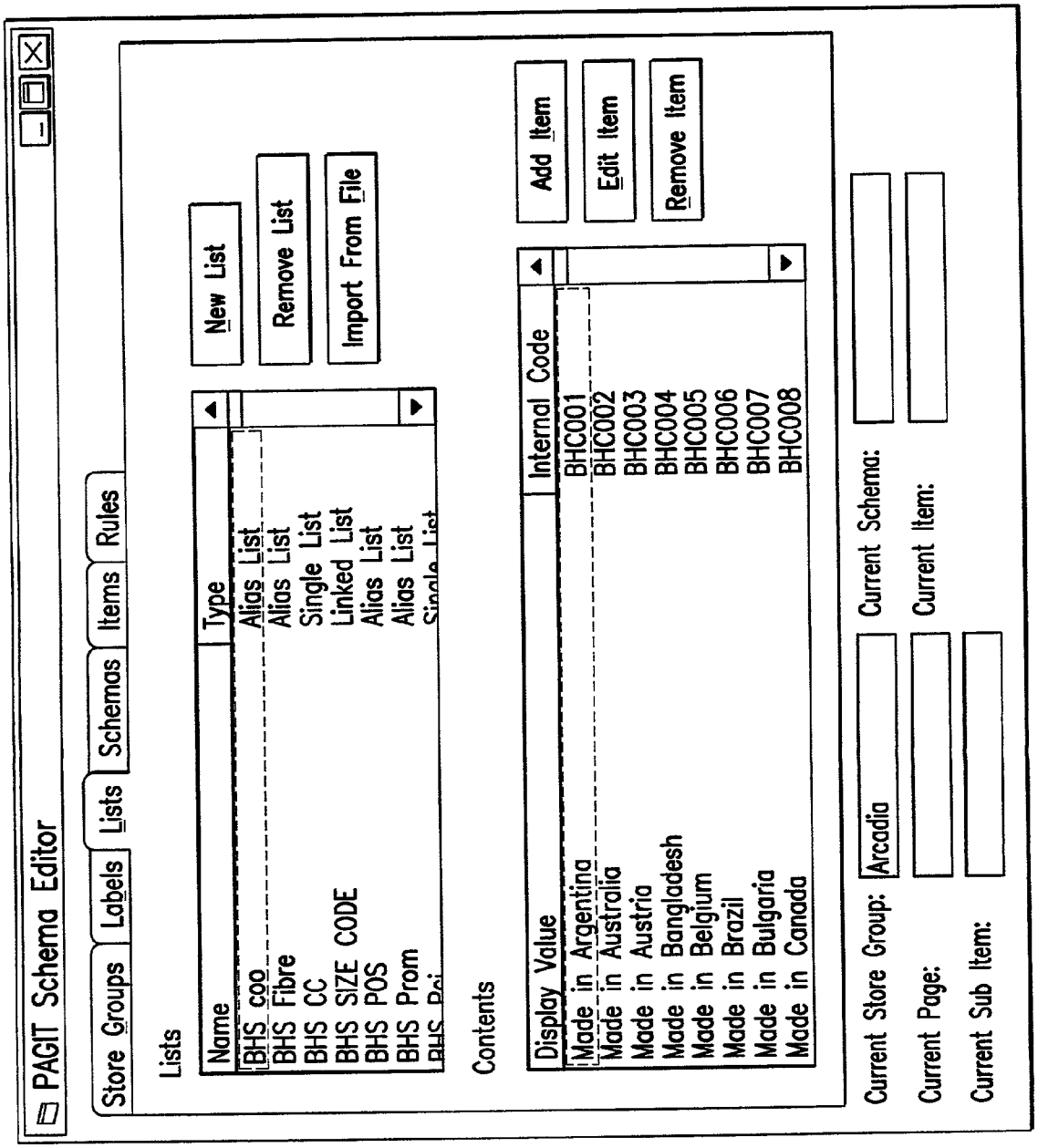
FIG. 8 is the screen associated with the flow chart of FIGS. 7A and 7B for lists.

FIGS. 7 and 8 respectively illustrate the configurator lists routine and associated screen. Through the "Lists" tab, validation lists are accessed. These lists are not necessarily associated with a store group, but they can be. This feature allows the system 10 to use generic lists of data which can be applied to multiple store groups. Alternatively, store groups can have specific, individual lists associated therewith. If a field is defined as a type "list," the server 14 uses one of the defined lists to validate the data. That is, the user can only enter or choose a value in the defined list. The list can be a simple list of values, or it can be a paired list of display values against internal codes. For example, 100% cotton may be internally stored as C100. It is noted that lists can also be made up of images rather than text. The configurator further allows a file to be imported if the list is maintained outside of the system 10, for example, by the customer. From the list screen of FIG. 8, if the user chooses New list or Remove list as determined at block 92, the routine of FIG. 7 at block 94 creates a new list or removes an existing list. If the user chooses to import a list as determined at block 96, the list data is imported from a customer file at block 98. If the user chooses to add, edit or remove an item as determined at block 100, the individual list item is added, edited or moved at block 102.

Figure 9B:
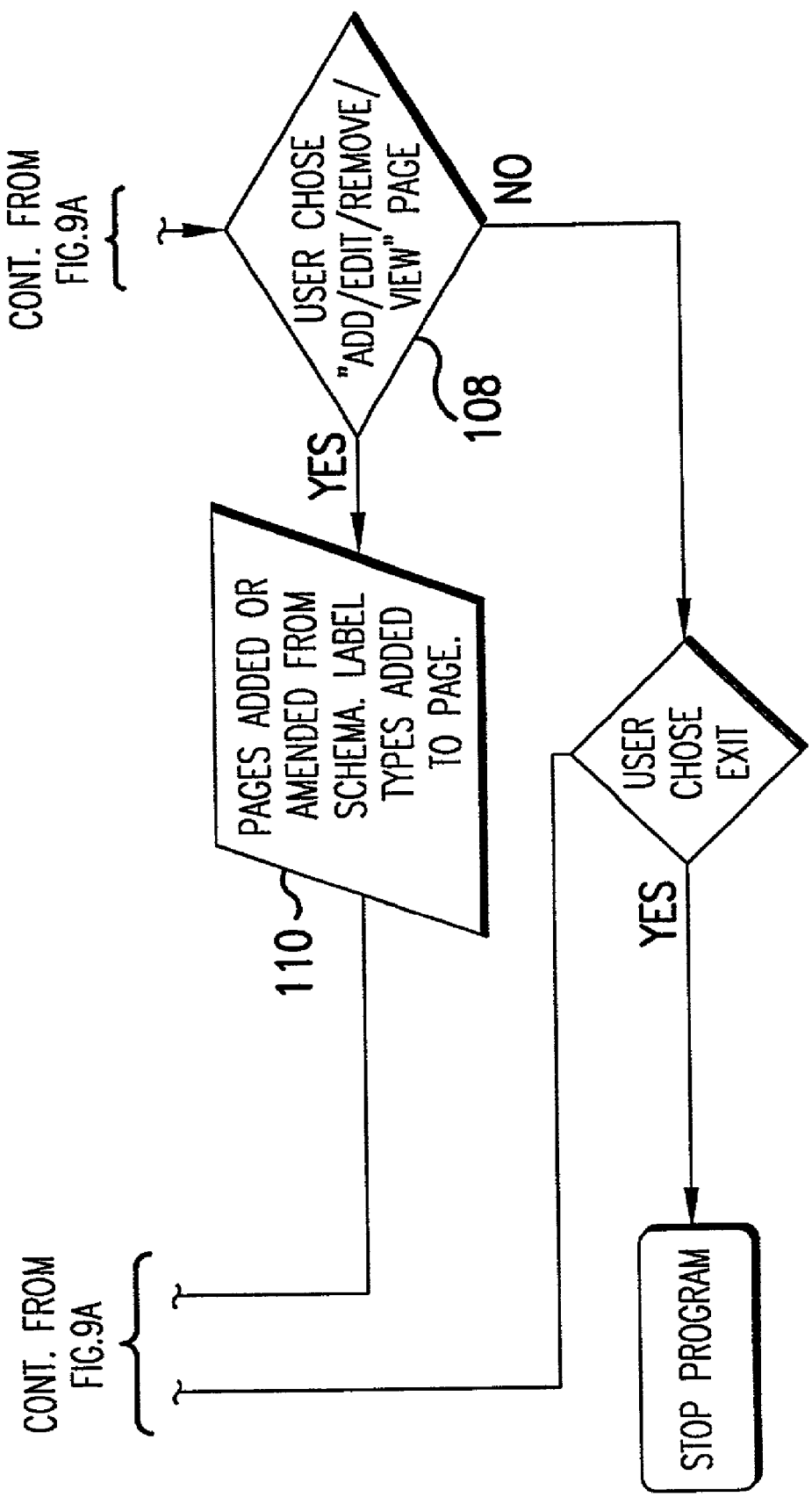
Figure 10:
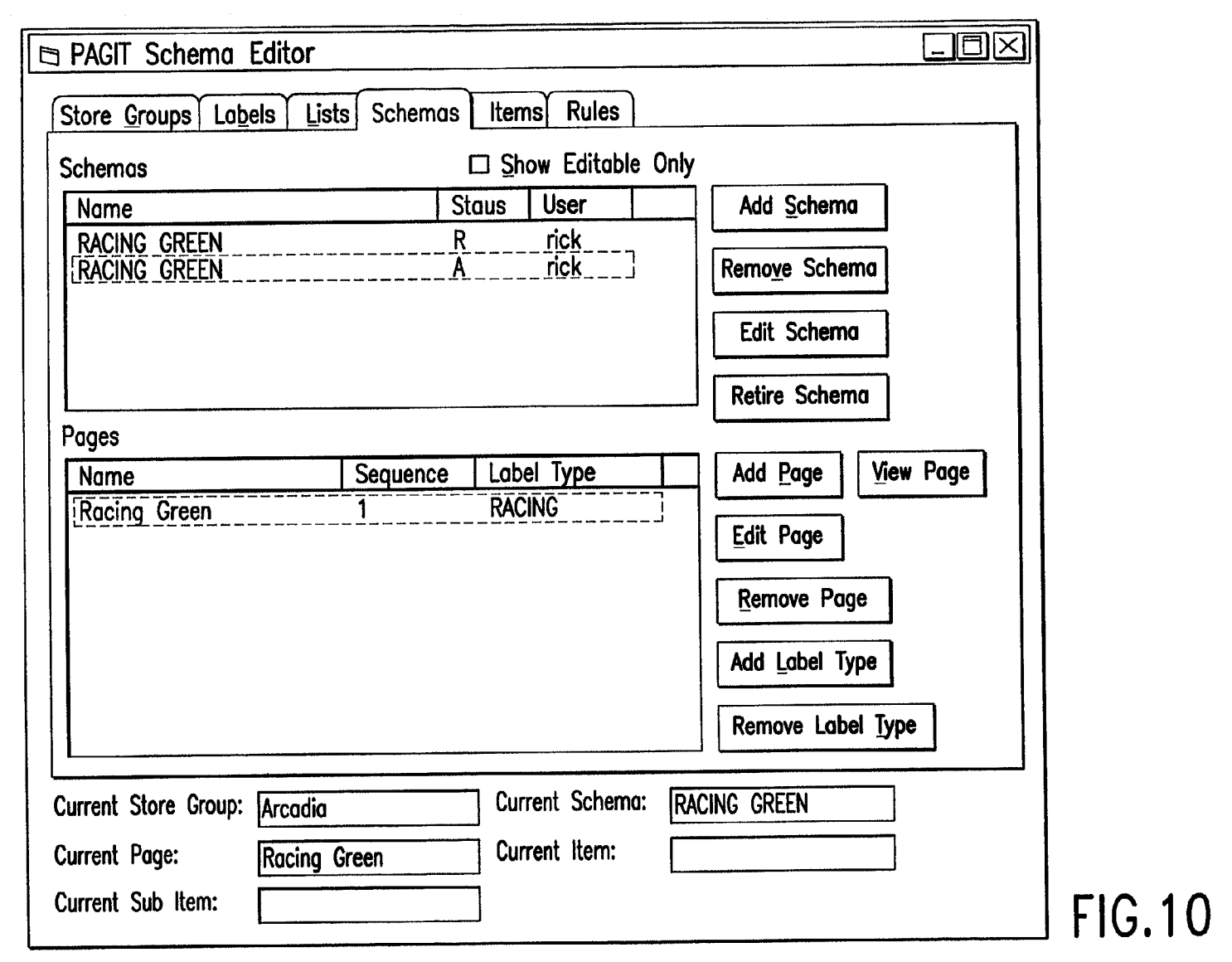
Figure 11A:
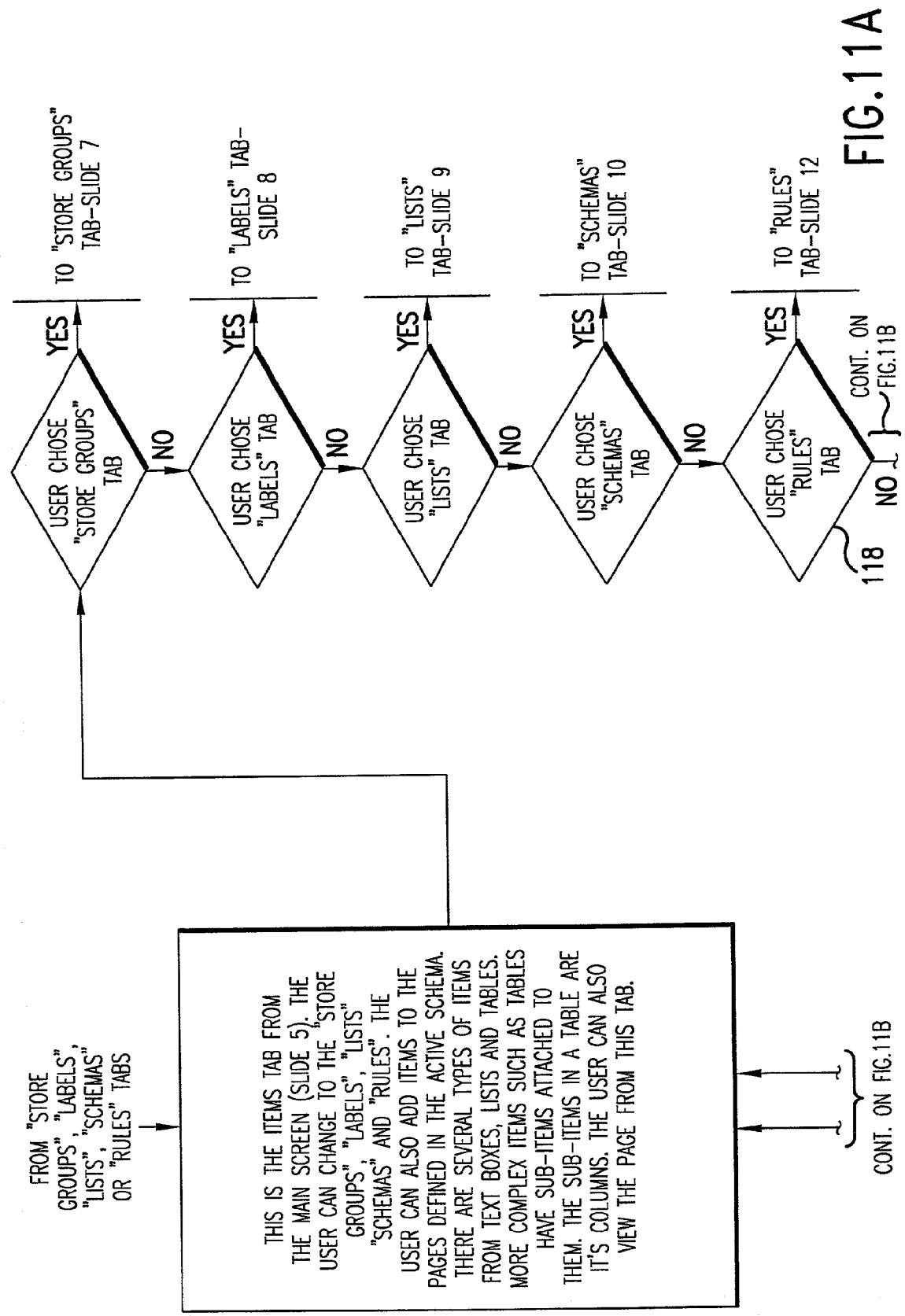
FIGS. 11A and 11B form a flow chart illustrating the configurator routine for items.
Figure 11B:
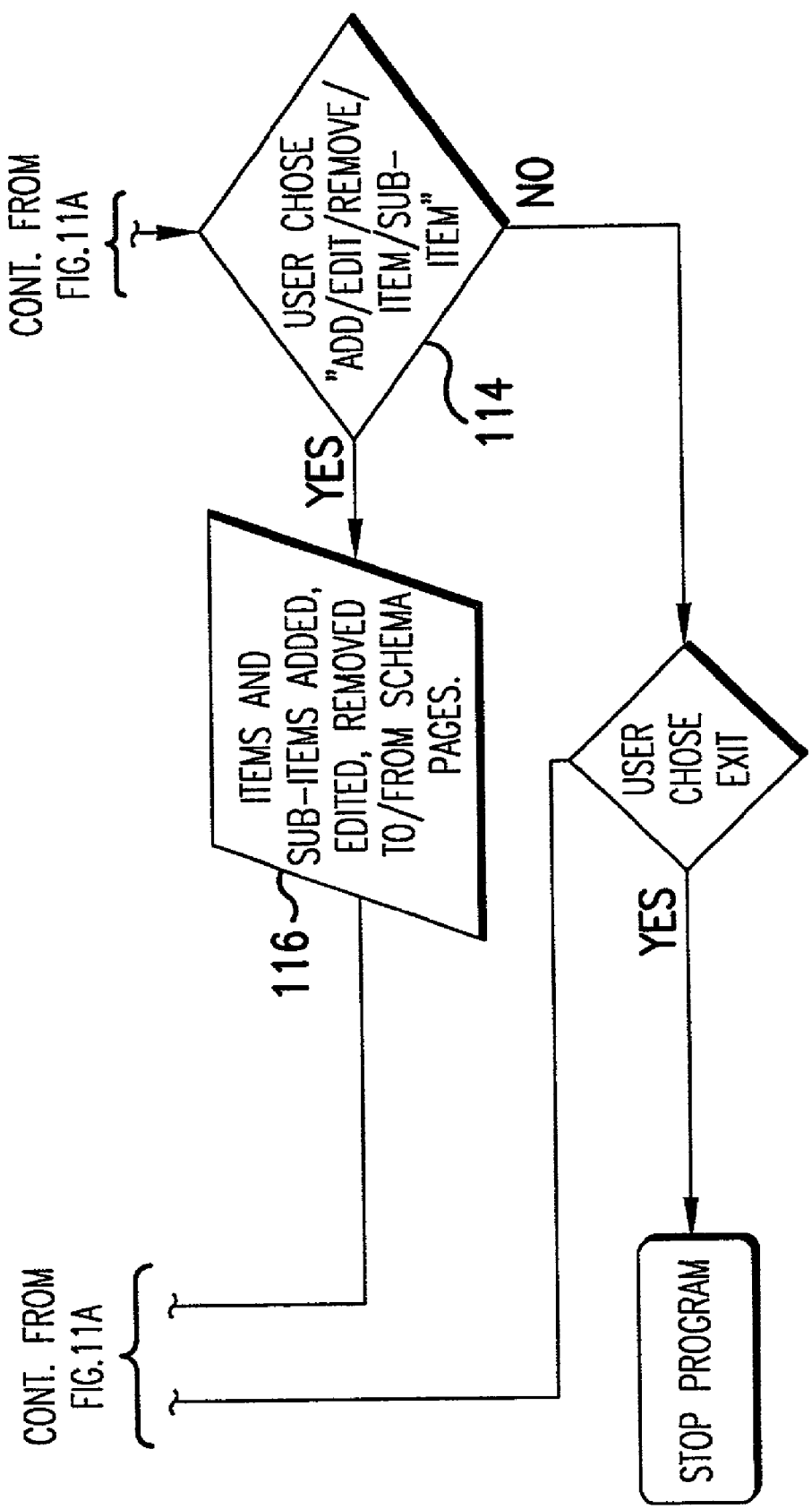
Figure 13B:
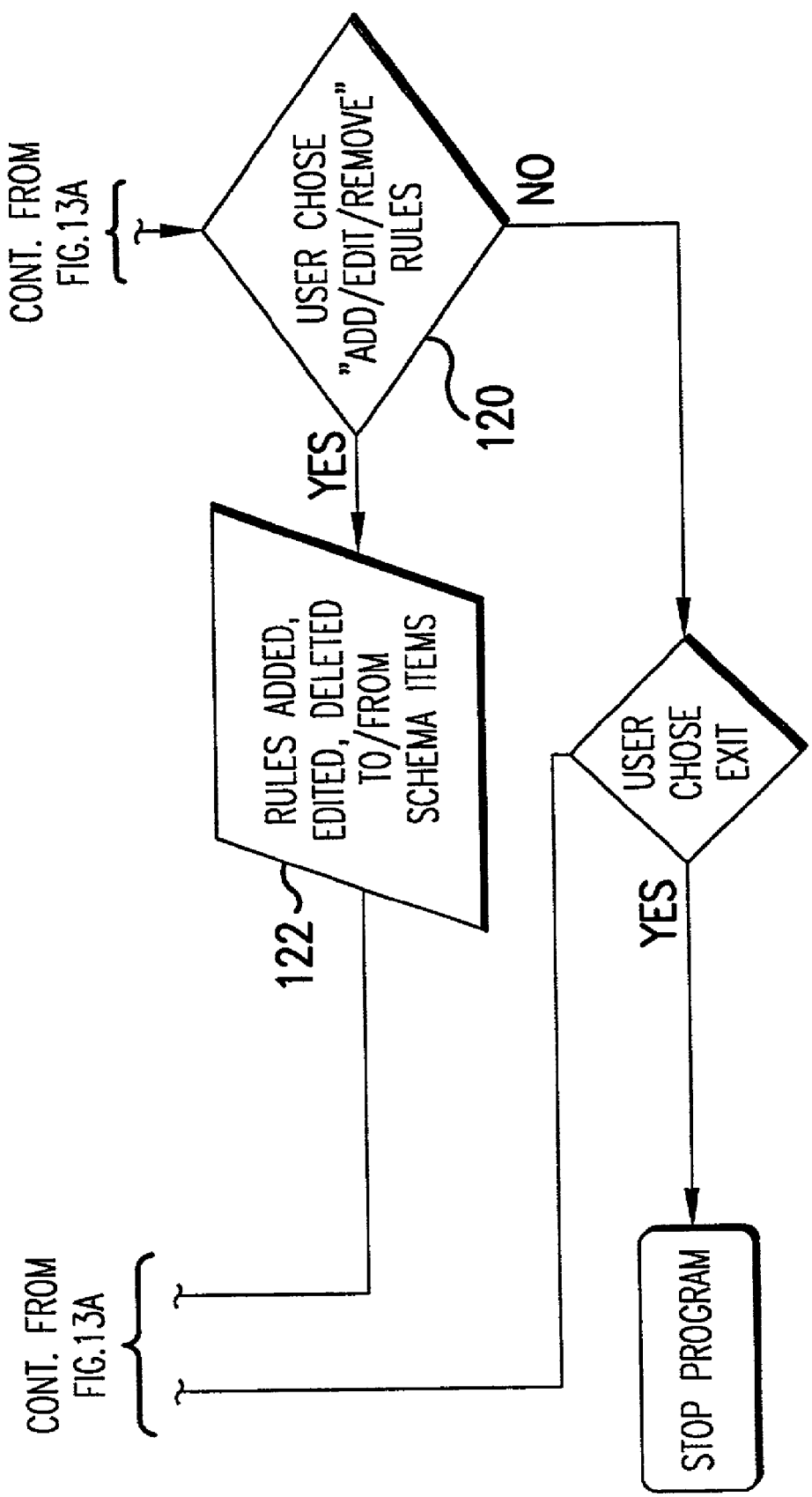

FIGS. 9 and 10 respectively illustrate the configurator, schemas routine and associated screen. As discussed above, a schema defines a collection of web pages for a particular store group. Each page within the schema can be associated with a different label type so that a schema can span several web pages. This allows a customer to order multiple types of labels in one sitting. Each page within a schema contains items which are the individual order entry fields. If a schema has multiple pages, the system 10 will choose the pages to display based upon the labels that the user chooses on the first screen. If for example, the user chooses a care label and a hand tag type of label, only two pages, one associated with these two label types will be displayed. From the screen of FIG. 10, if the user chooses to add, remove, edit or retire a schema as determined at block 104, the routine proceeds to block 106 to carry out the selected function. If the user chooses to add, edit, remove or view a page as determined at block 108, these functions are carried out at block 110. Adding a page to a schema defines a new order entry web page for a new label type, i.e. product. It is noted that web pages are created for label types, not individual label references. Each schema has an associated status which may be set to active, editable or retired. A schema must be editable to amend the schema in any way. Editable schemas cannot be active. If the user chooses the "Items" tab from the screen of FIG. 10 as determined at block 112, the routine proceeds to the configurator, items routine depicted in FIG. 11 with the associated items screen depicted in FIG. 12.

The items screen of FIG. 12 is used to define the specification for each page in a schema. Items are added to a schema page where each item has a display name, type and validation rules that determine how the item will be displayed. Items can be validated by either using one of the defined lists or by applying a validation rule to the item. From the screen of FIG. 12, if the user chooses to add, edit or remove an item or to attach sub-items as determined at block 114 of FIG. 11, the routine accomplishes the selected function at block 116. There are several types of items, from text boxes, lists and tables to more complex items such as tables which have sub-items attached thereto. If the user chooses the "Rules" tab as determined at block 118, the routine proceeds to the rules routine depicted in FIG. 13 with associated screen 14.

Figure 14:
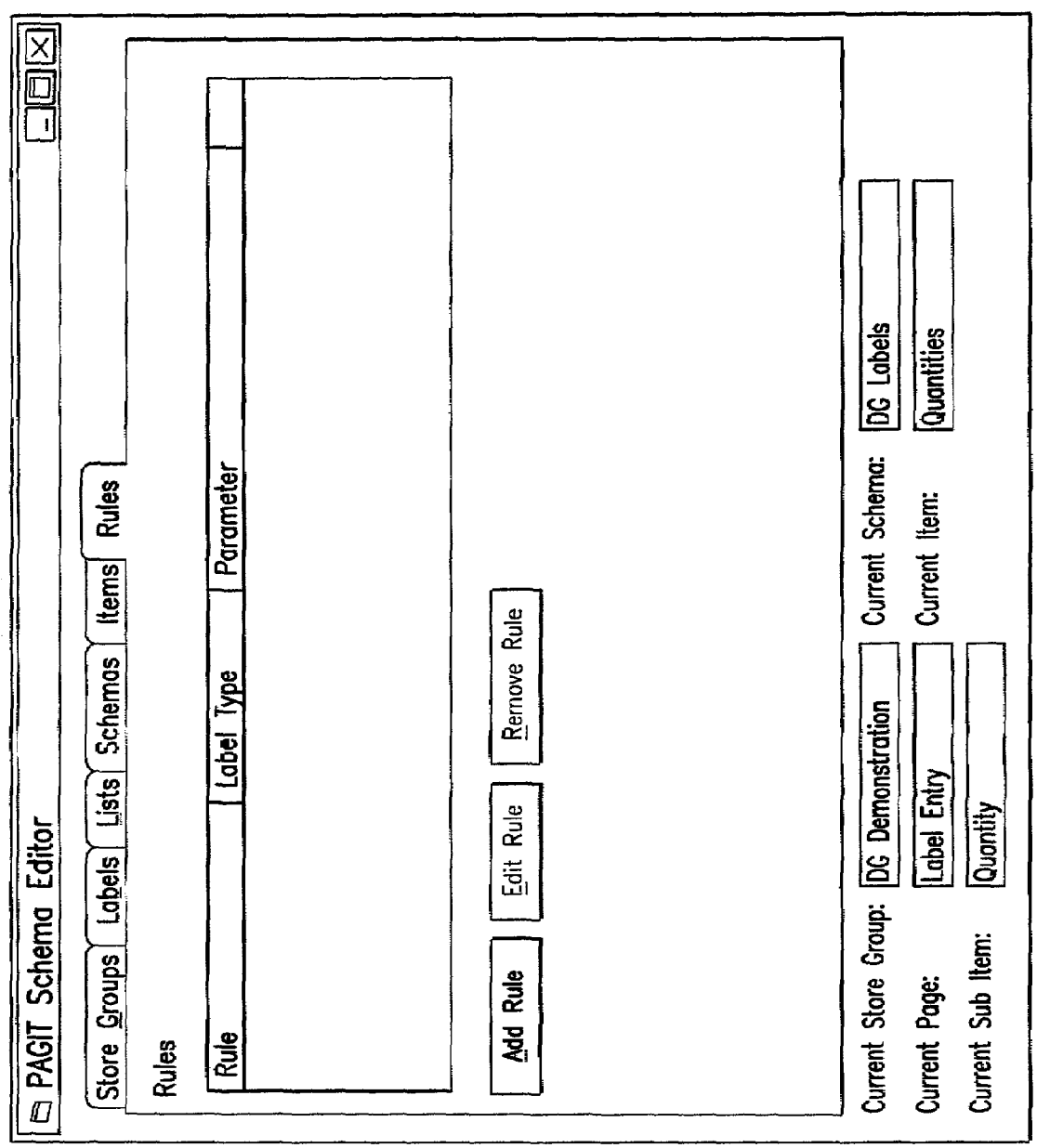
FIG. 14 is a screen associated with the flow chart of FIGS. 13A and 13B for validation rules.

The "Rules" screen of FIG. 14 is used for validation rules that are applied to items within a schema page. There are rules to determine maximum and minimum values for numeric fields, picture masks and barcode validation, etc. The "Rules" screen can also be used to identify a field as mandatory or optional. If the user chooses to add, edit or remove rules as determined at block 120, the selected function is carried out at block 122.

Figure 15:
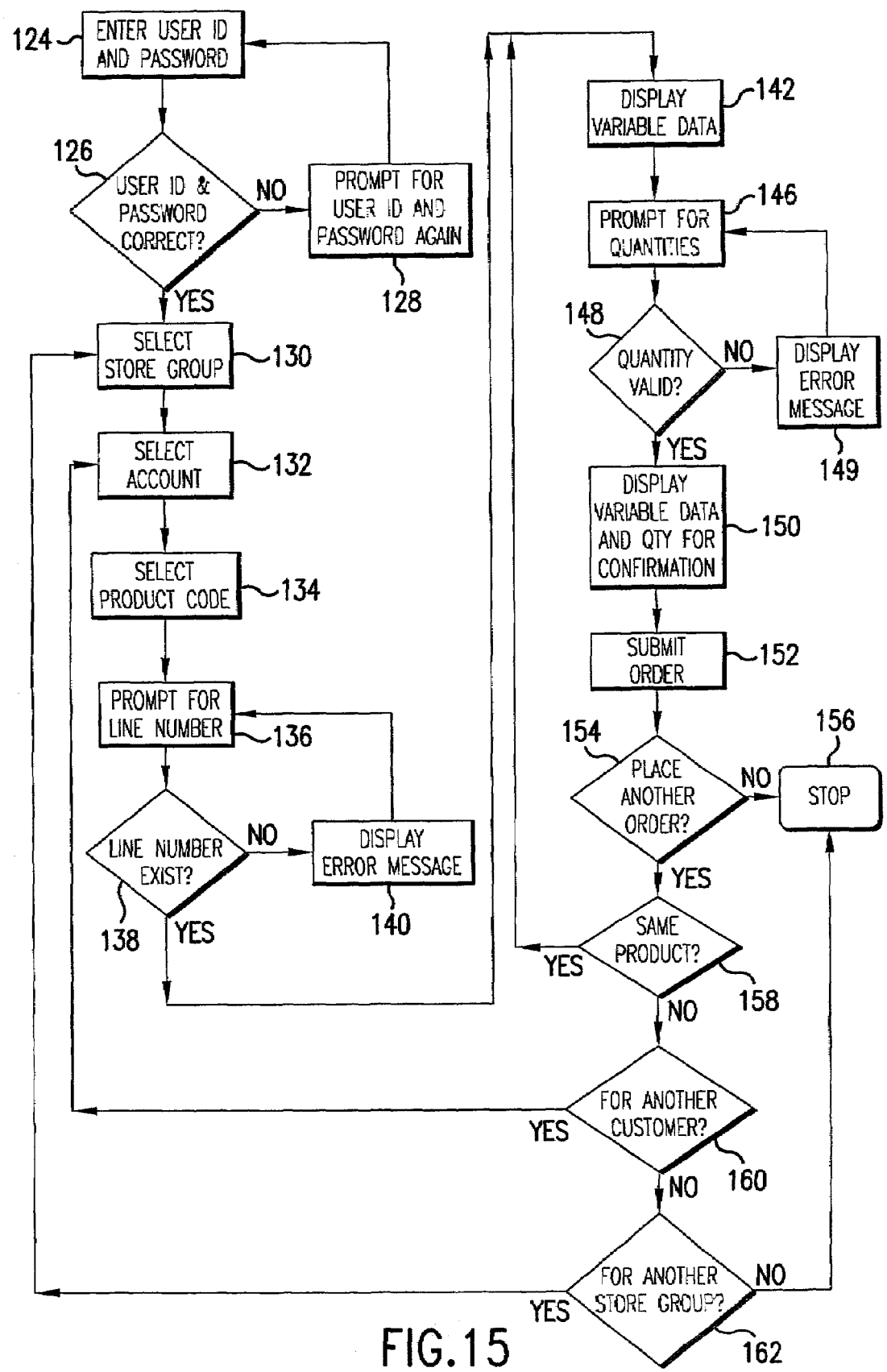
FIG. 15 is a flow chart illustrating the variable data order entry routine.
Figure 16:
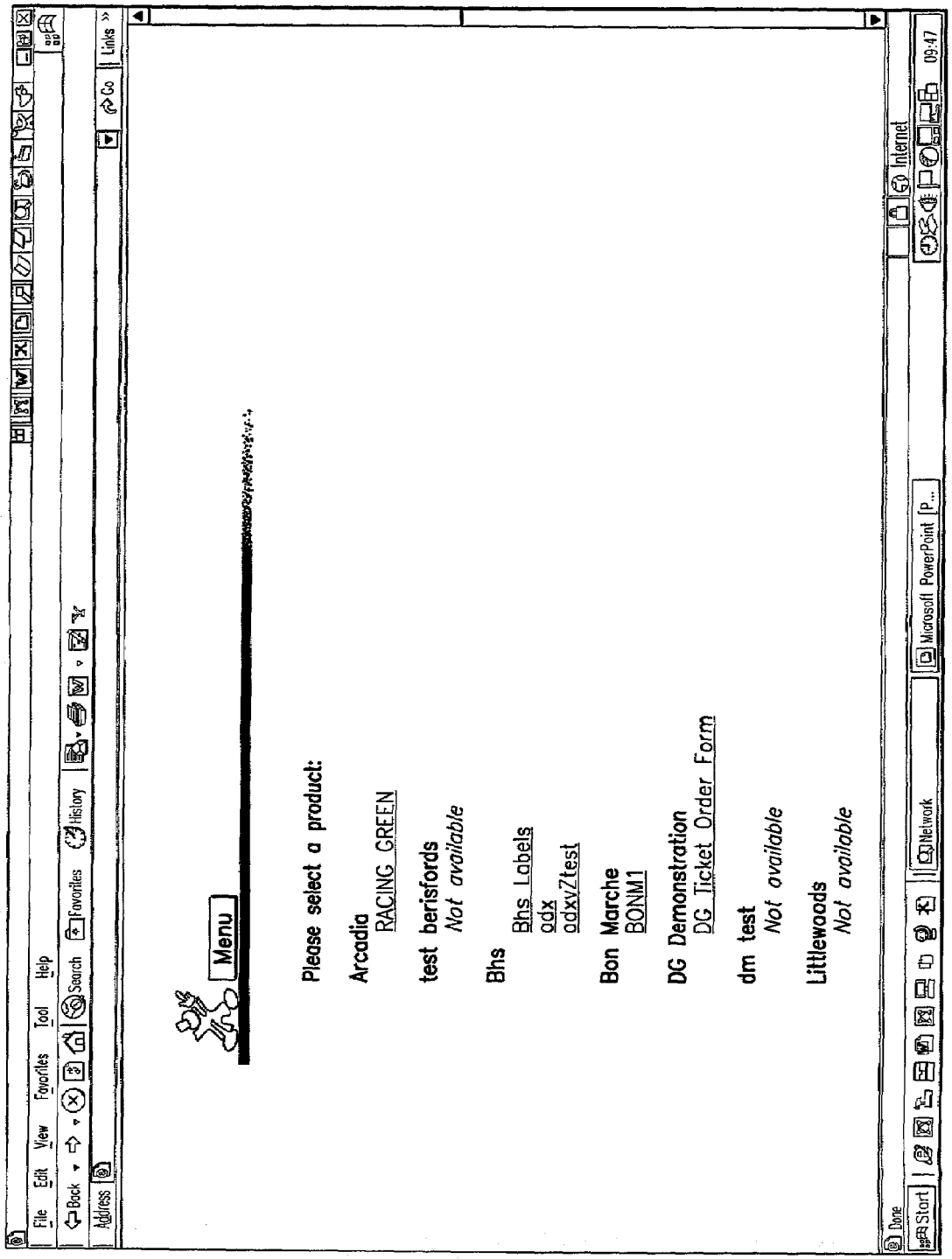
FIG. 16 is a product selection screen associated with the flow chart of FIG. 15.
Figure 17:
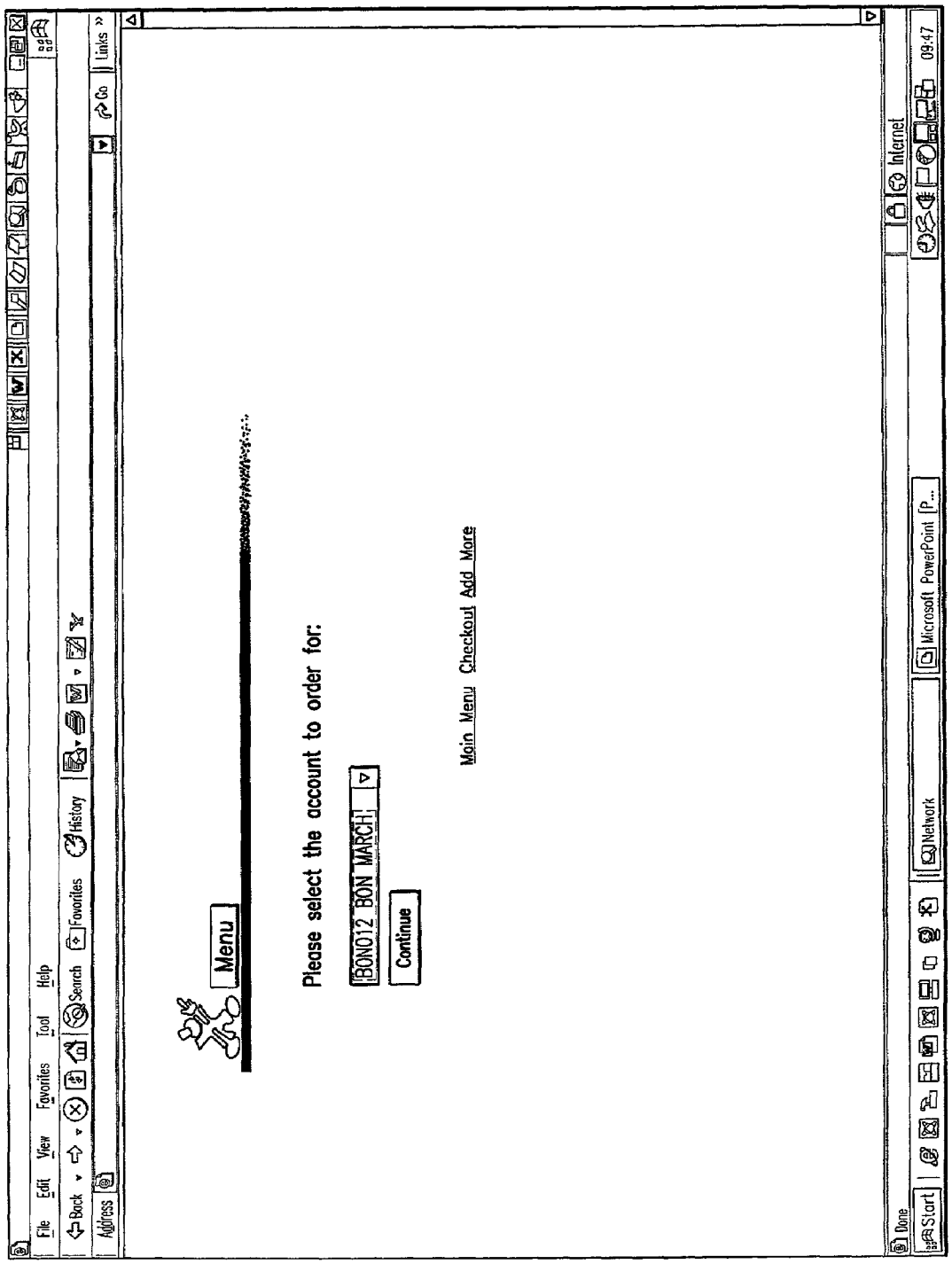
FIG. 17 is an account selection screen associated with the flow chart of FIG. 15.
Figure 18:
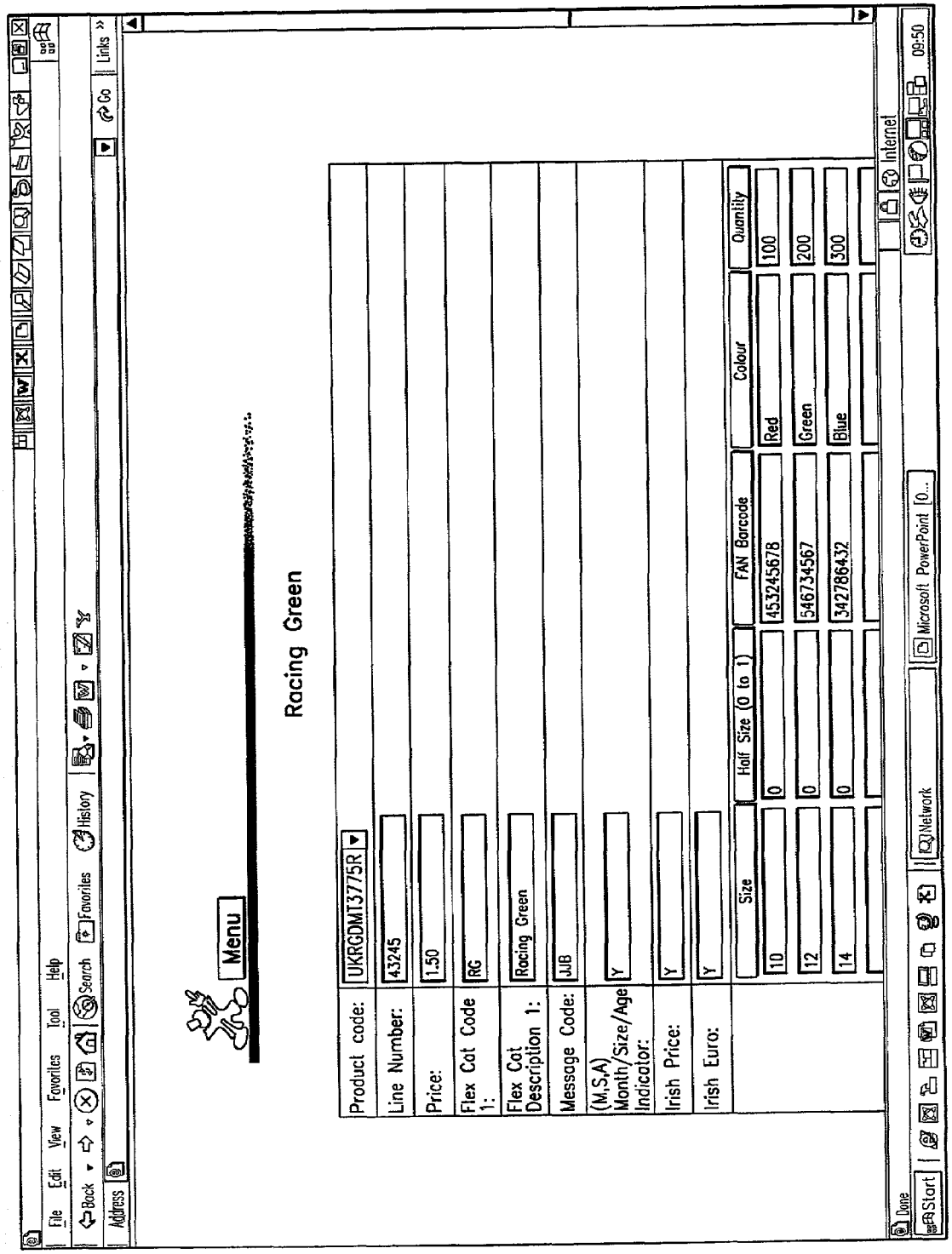
FIG. 18 is a product code screen associated with the flow chart of FIG. 15.
Figure 19:
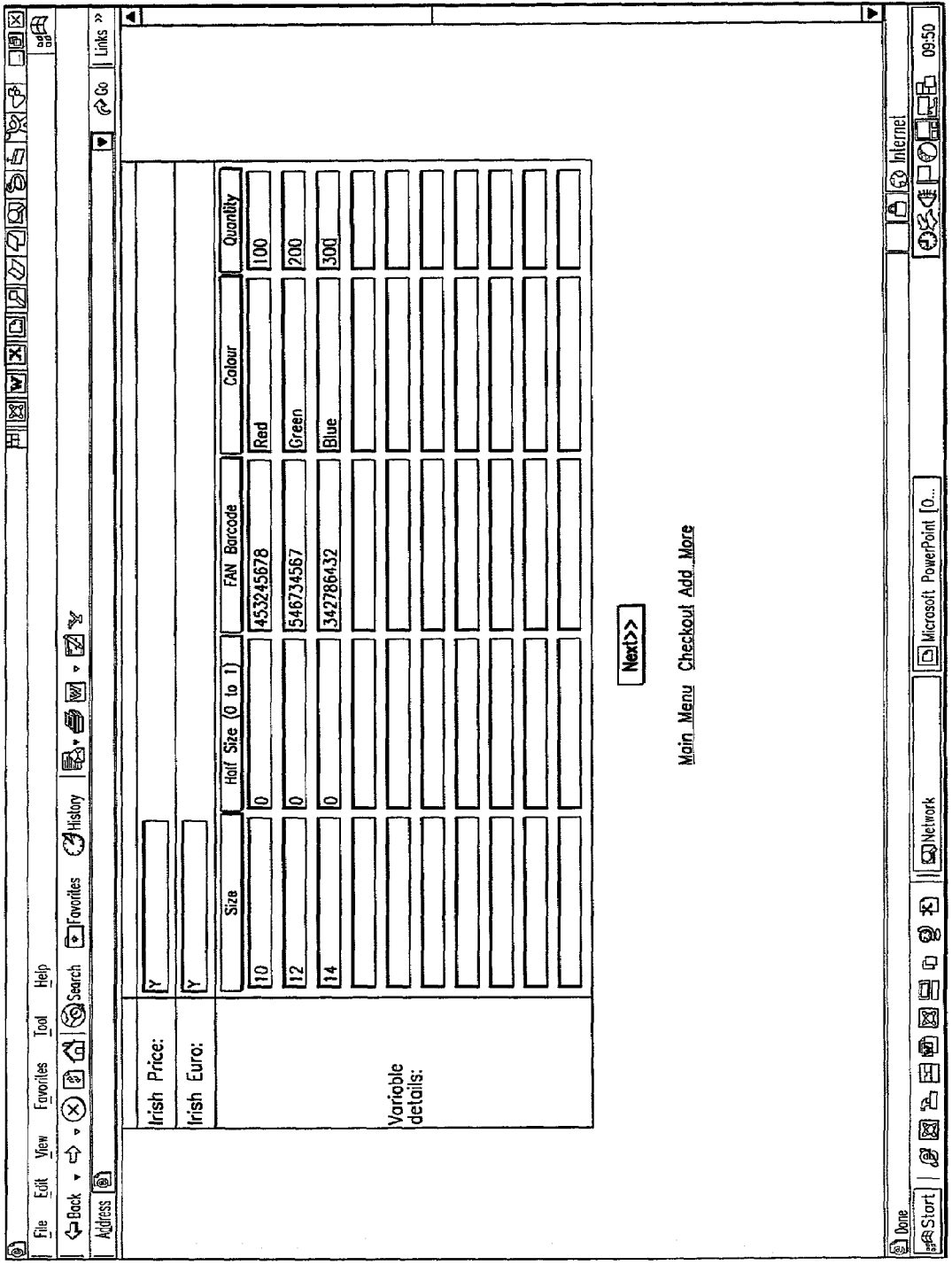
FIG. 19 is a quantity screen associated with the flow chart of FIG. 15.
Figure 21:
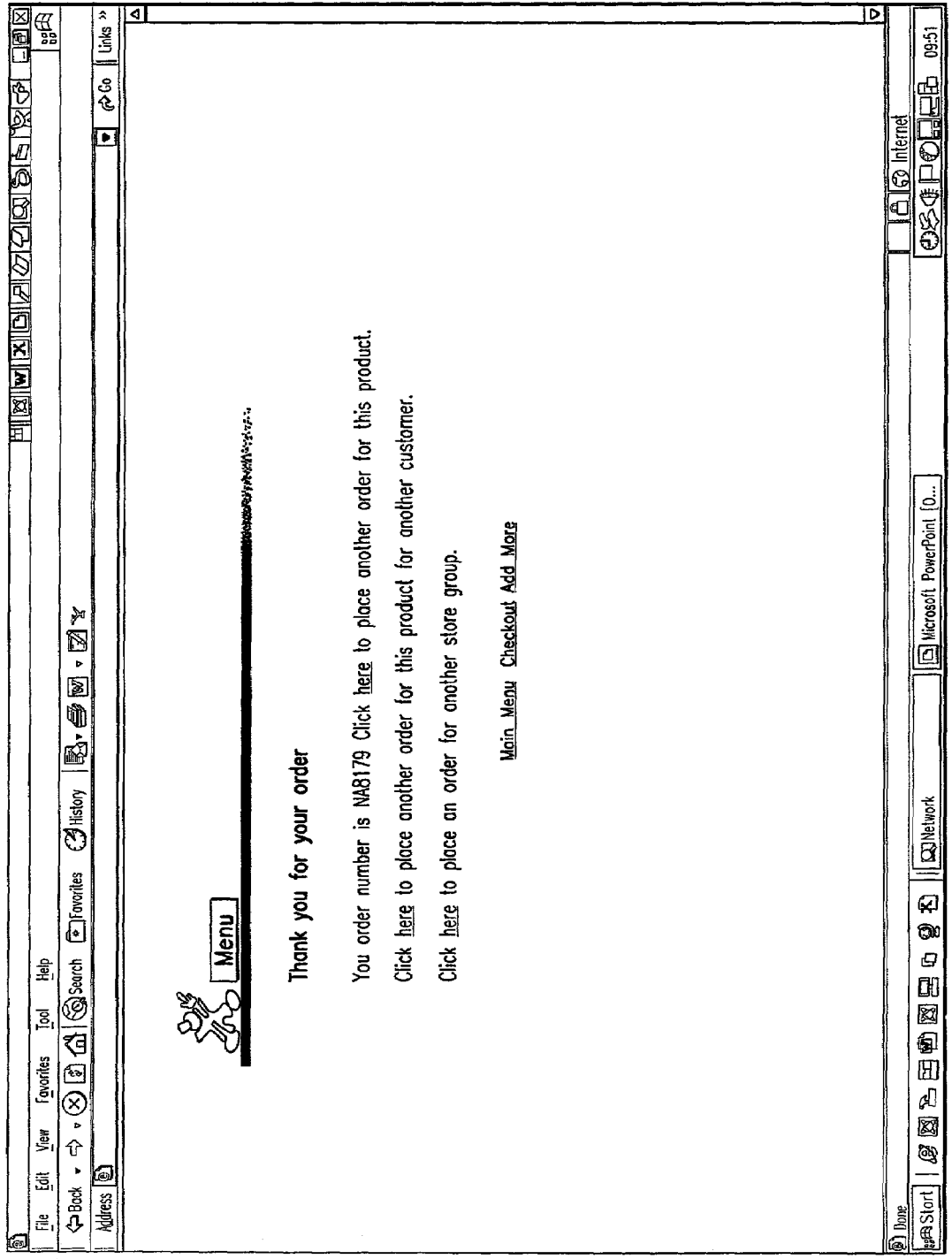
FIG. 21 is a screen confirming the submission of an order and is associated with the flow chart of FIG. 15.

The order entry routine of the present invention is depicted in FIG. 15 with the associated screens depicted in FIGS. 16–21. Upon entering the order entry website, the user enters a user ID and password at block 124. Thereafter, the order entry routine at block 126 determines whether the ID and password are correct. If not, the routine prompts the user at block 128 to enter his user ID and password again. If the ID and password entered are correct, the user is prompted to select a store group at block 130 from the screen depicted if FIG. 16. Thereafter, the user is prompted at block 132 to select the account to order for by the screen depicted in FIG. 17. At block 134, the user is prompted by the screen depicted in FIG. 18 to select a product code and at block 136 the user is prompted as depicted by the screens shown in FIGS. 18 and 19 to select a line number. At block 138, the routine determines whether the line number exists and if not, an error message is displayed at block 140 on the screen. If the line number does exist, the routine proceeds to block 142 to display variable data associated with the line number. At block 146, the user is prompted to enter the quantities to be order for a particular line number. At block 148, the routine determines whether the quantity entered by the user is valid and if not, an error message is displayed at block 149. If the quantity entered is valid, the routine proceeds to block 150 to display the variable data and entered quantity information for confirmation by the user as depicted in FIG. 20. If the user selects "Confirm," at block 152, the order is submitted, given an associated order number and stored in the central database 16. The screen depicted in FIG. 21 is displayed for the user to provide the user with the order number and to allow the user to place another order for the same product, to place another order for the same product but for a different customer, or to place an order for another store group. If the user selects to place another order for the same product, the routine proceeds from block 158 to block 142. If the user selects to place another order for the same product but for a different customer as determined at block 160, the routine proceeds to block 132. If the user selects to place an order for another store group as determined at block 162, the routine proceeds to block 130. If no other order is to be placed, the routine proceeds from block 154 to block 156 and stops.

Figure 43:
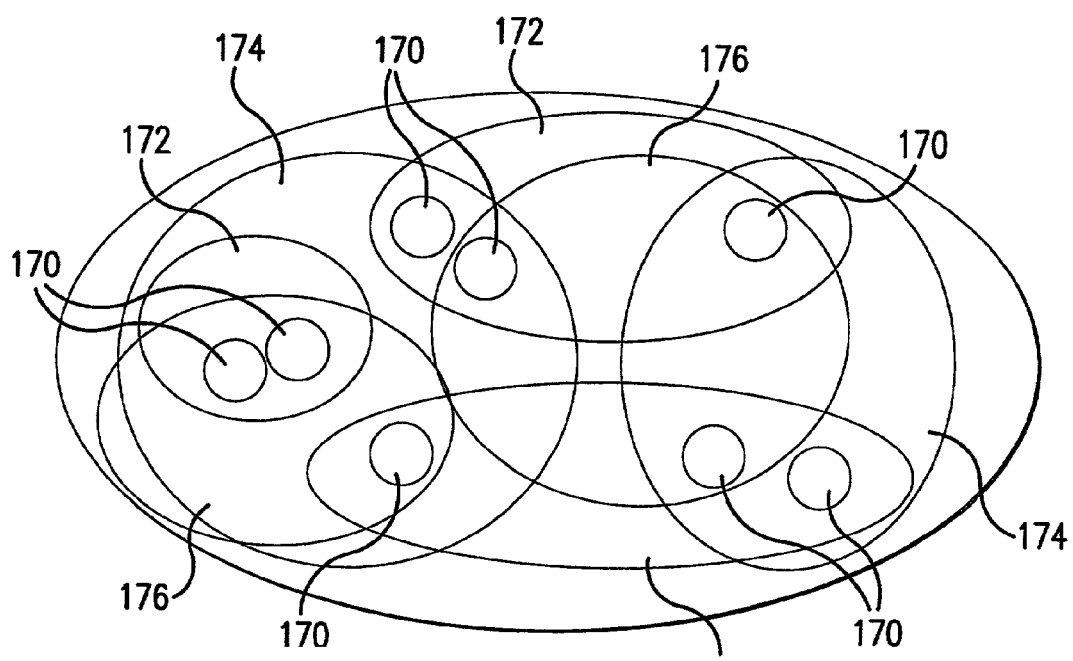
FIG. 43 is a diagram illustrating the relationship between production sites, products (label references), machines and machine types.

The diagram of FIG. 43 illustrates the relationship between manufacturing sites 172, products, i.e. label references 176, machines 170 and machine types 174. The same product or label reference 176 can be made at a number of different manufacturing sites 172 and by different machines 170 and different types 174 of machines. Every site 172 has its own machines 170 which fall within defined types 174 of machines. FIG. 43 shows three sites 172, each with its own machines 170. There are two machine types 174 in the system which encompass machines 170 from all of the sites. There are two products 176, one product made at two different sites 172 all on the same type 174 of machine and the other product 176 made at two different sites and on two different machine types 174 at one of those sites.

FIGS. 22–42 illustrate the various production routines and associated screens used to process one or more orders to create jobs and a production file associated with each job.

Figure 22B:
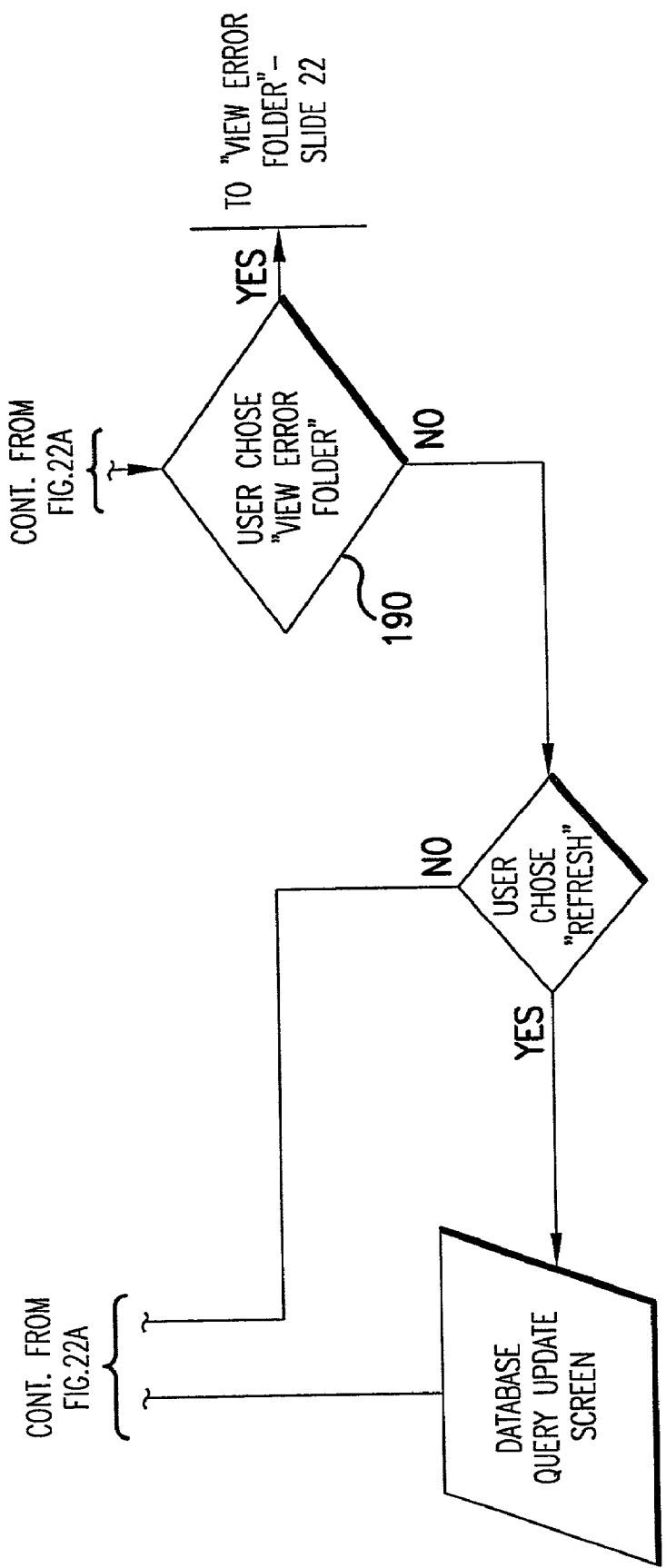
Figure 23:
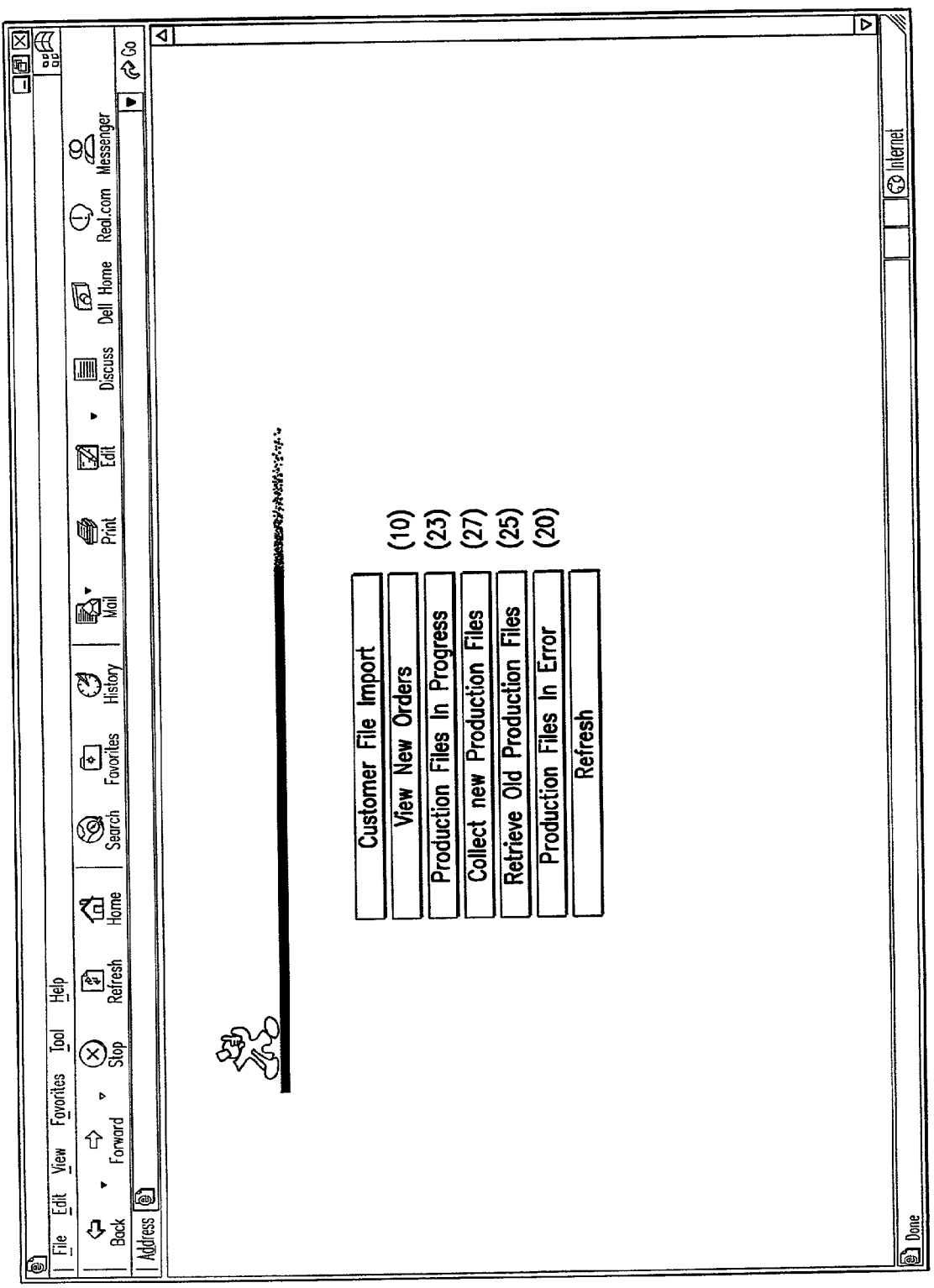
FIG. 23 is a screen associated with the flow chart of FIGS. 22A and 22B.

The flow chart of FIG. 22 and the screen of FIG. 23 illustrate the main production routine and menu. From the main screen, the user can go to import orders, view new orders, view in progress, collect new files, collect old files, view error folder or refresh the current screen. The main screen depicted in FIG. 23 also shows, in association with each selectable category, the number of orders that fall into that category. From the screen, the user can manage production of all outstanding orders as well as choose to run a file import or reprocess old orders. The user can also manage any import errors. If the user chooses to import new orders as determined at block 180, the routine proceeds to the routine depicted in FIG. 24. If the user chooses to view new orders as determined at block 182, the routine proceeds to the routine depicted in FIG. 26. When the user chooses to view production files in progress as determined at block 184, the routine proceeds to the routine depicted in FIG. 36. When the user chooses to collect new production files as determined at block 186, the routine proceeds to the routine depicted in FIG. 38. When the user chooses to retrieve old files as determined at block 188, the routine proceeds to the routine depicted in FIG. 40. When the user chooses to view production files in error as determined at block 190, the routine proceeds to the routine depicted in FIG. 42.

Figure 24:
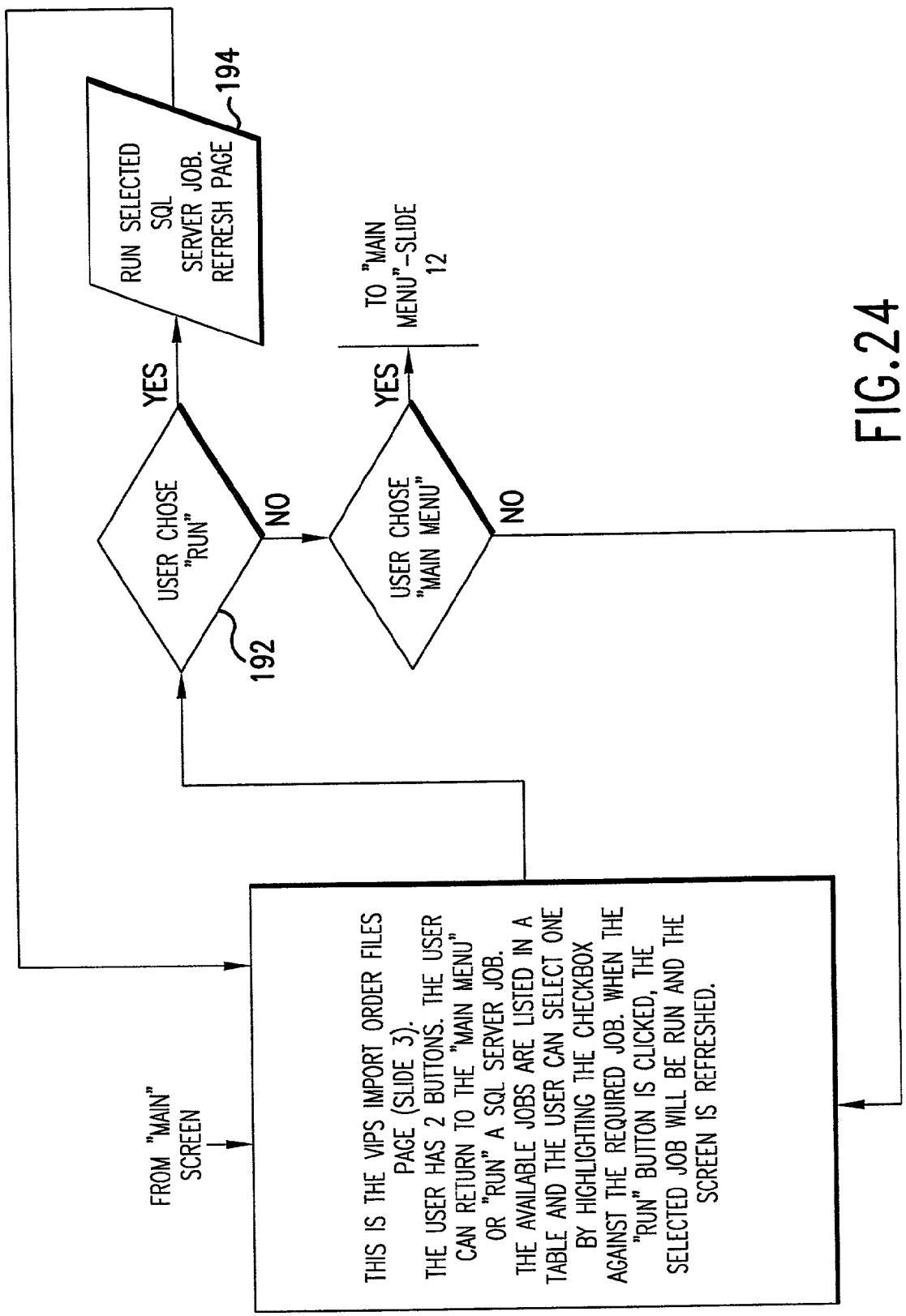
FIG. 24 is a flow chart for the production routine, customer order file import.
Figure 25:
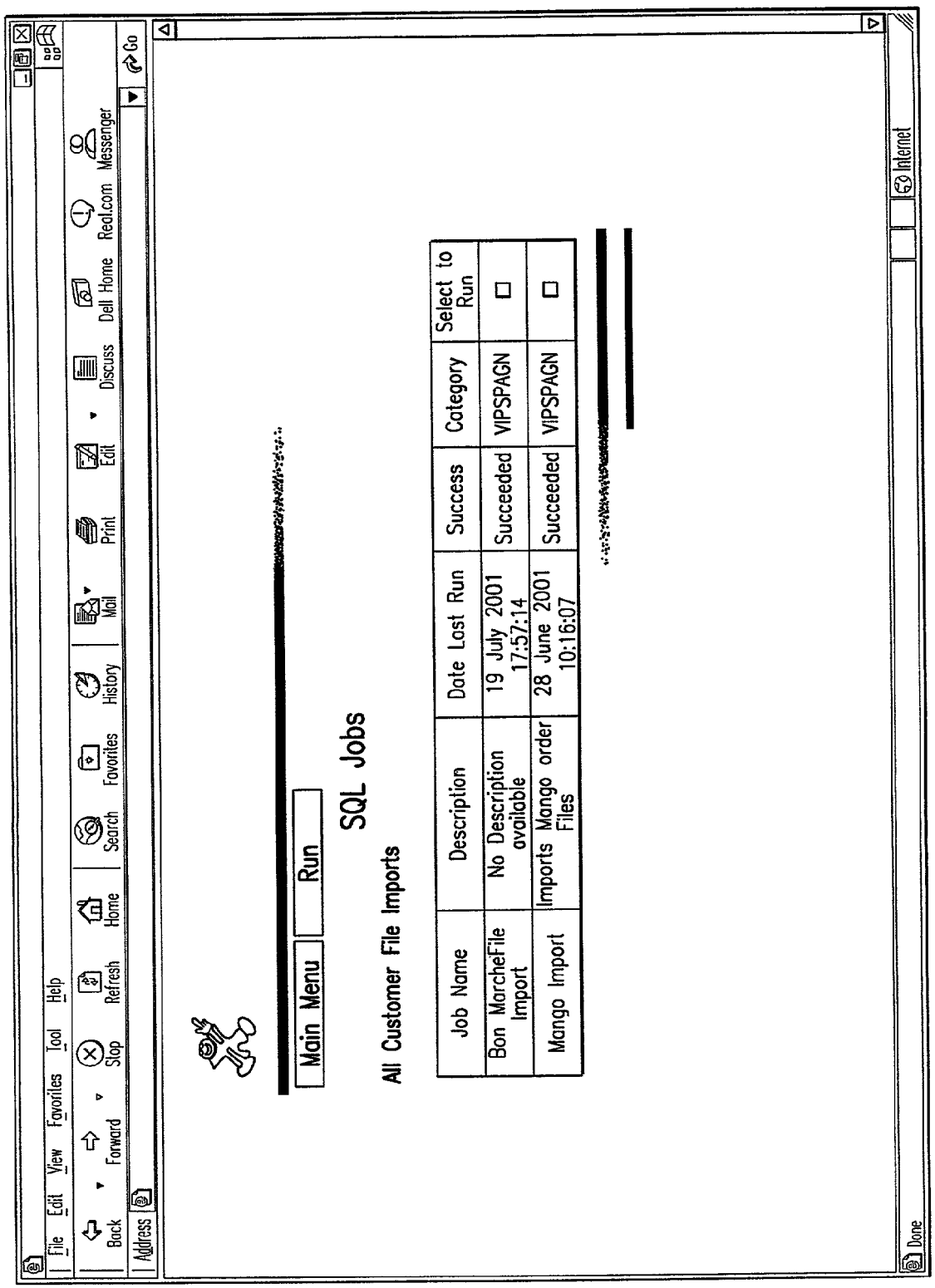
FIG. 25 is a screen associated with the flow chart of FIG. 24.

The production, customer order file import routine shown in FIG. 24 and the associated screen depicted in FIG. 25 allows the user to manually run at blocks 192 and 194 any file import routines that would happen on a scheduled basis. The feature allows a manufacturing location to manage any urgent orders that might arrive outside of the normal import window. The user has two choices, "Main Menu" or "Run." The available jobs are listed in a table depicted on the screen. The user can select a job and then select "Run" to process the selected job.

Figure 26:
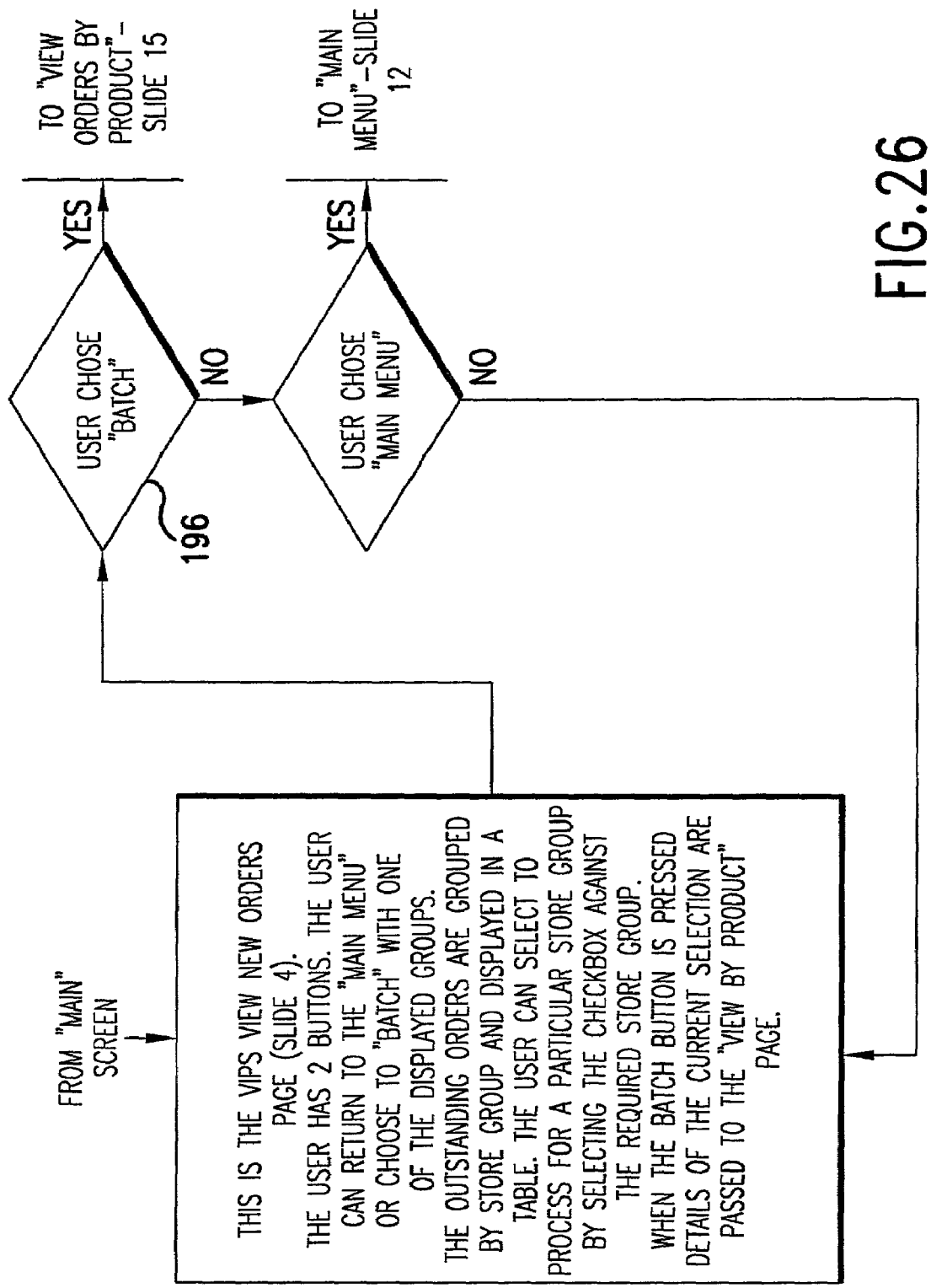
FIG. 26 is a flow chart for the production routine, view new orders-store groups.
Figure 27:
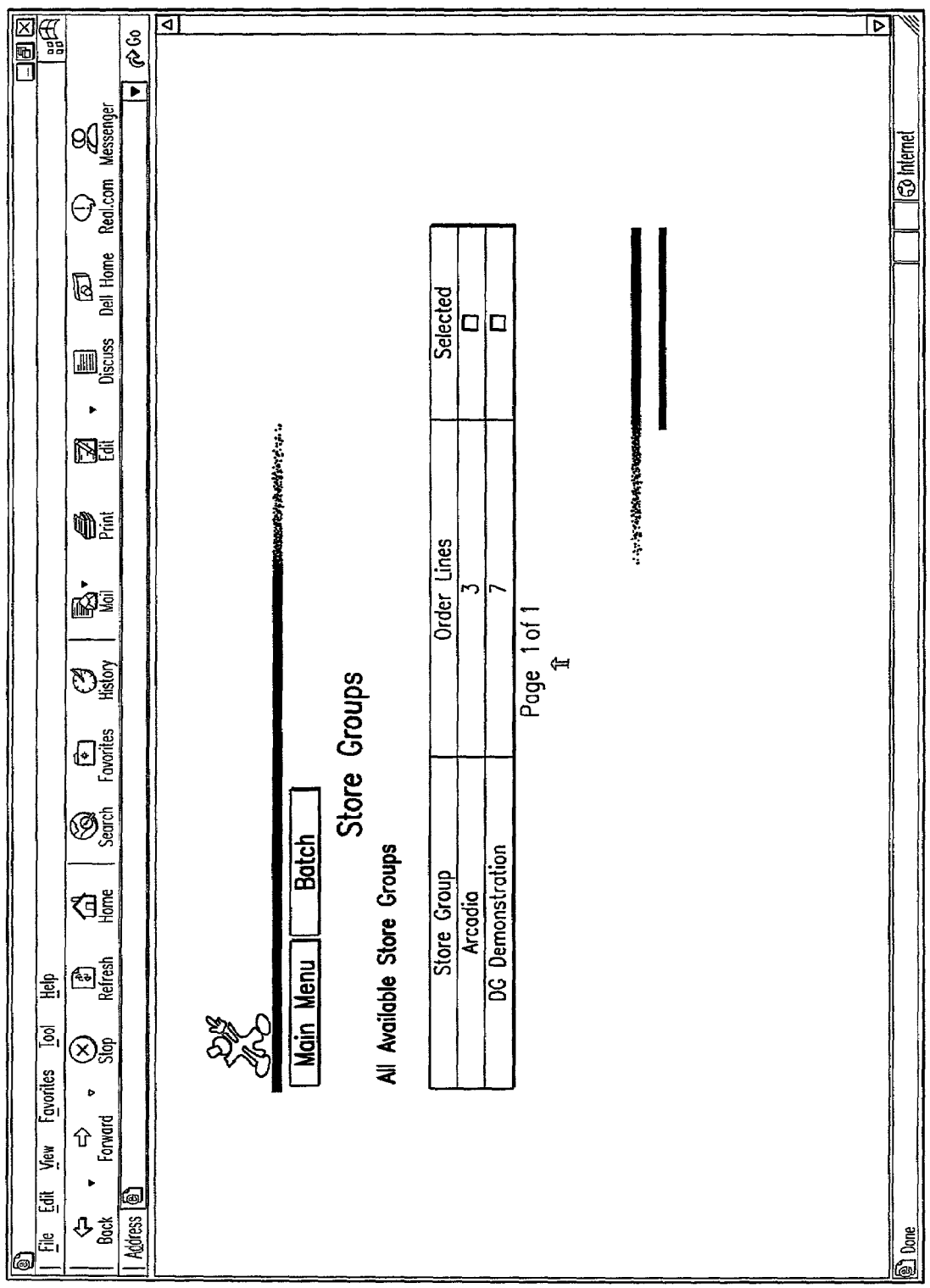
FIG. 27 is a screen associated with the flow chart of FIG. 26.
Figure 28:
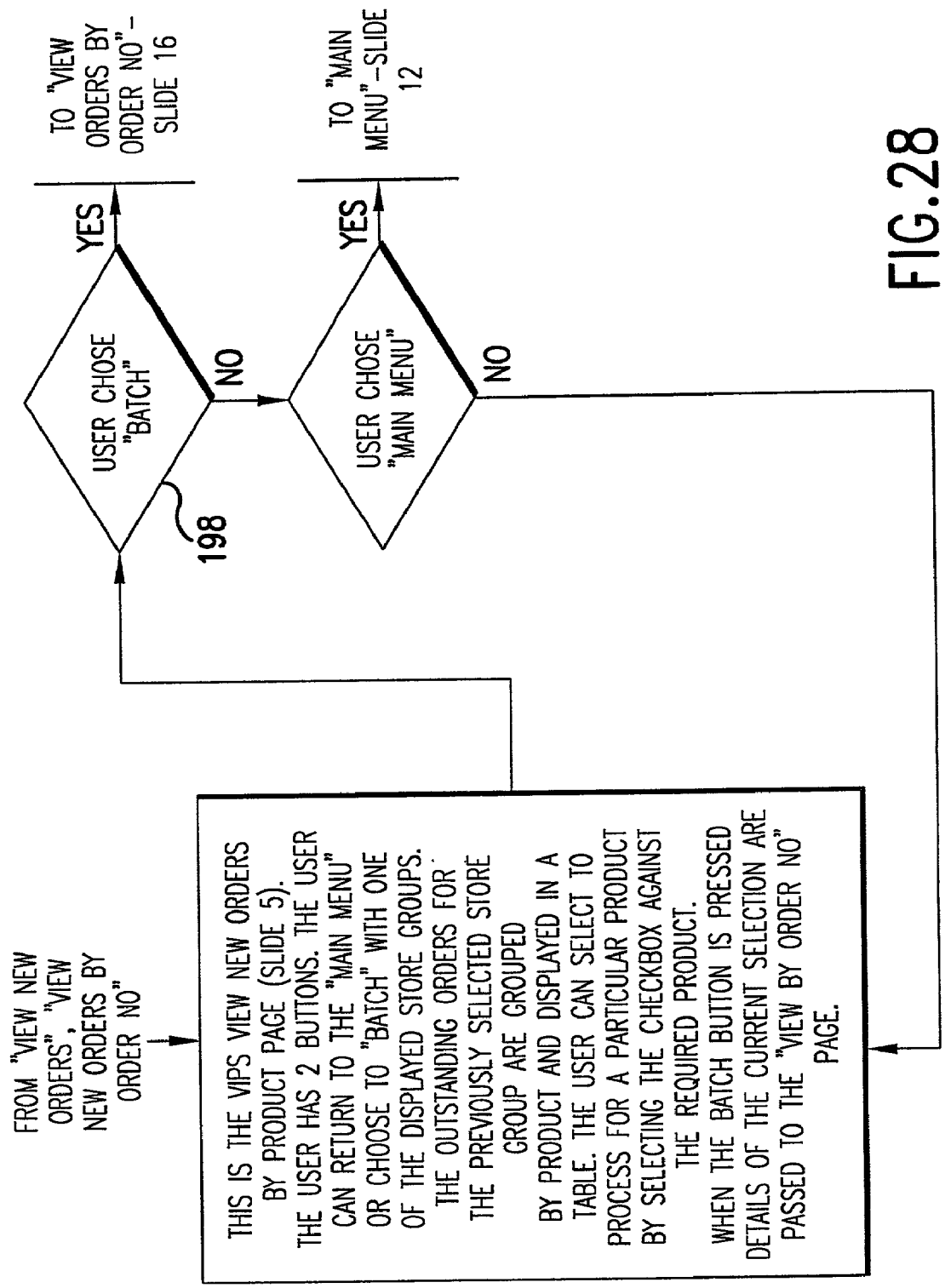
FIG. 28 is a flow chart for the production routine, view new orders-products.
Figure 29:
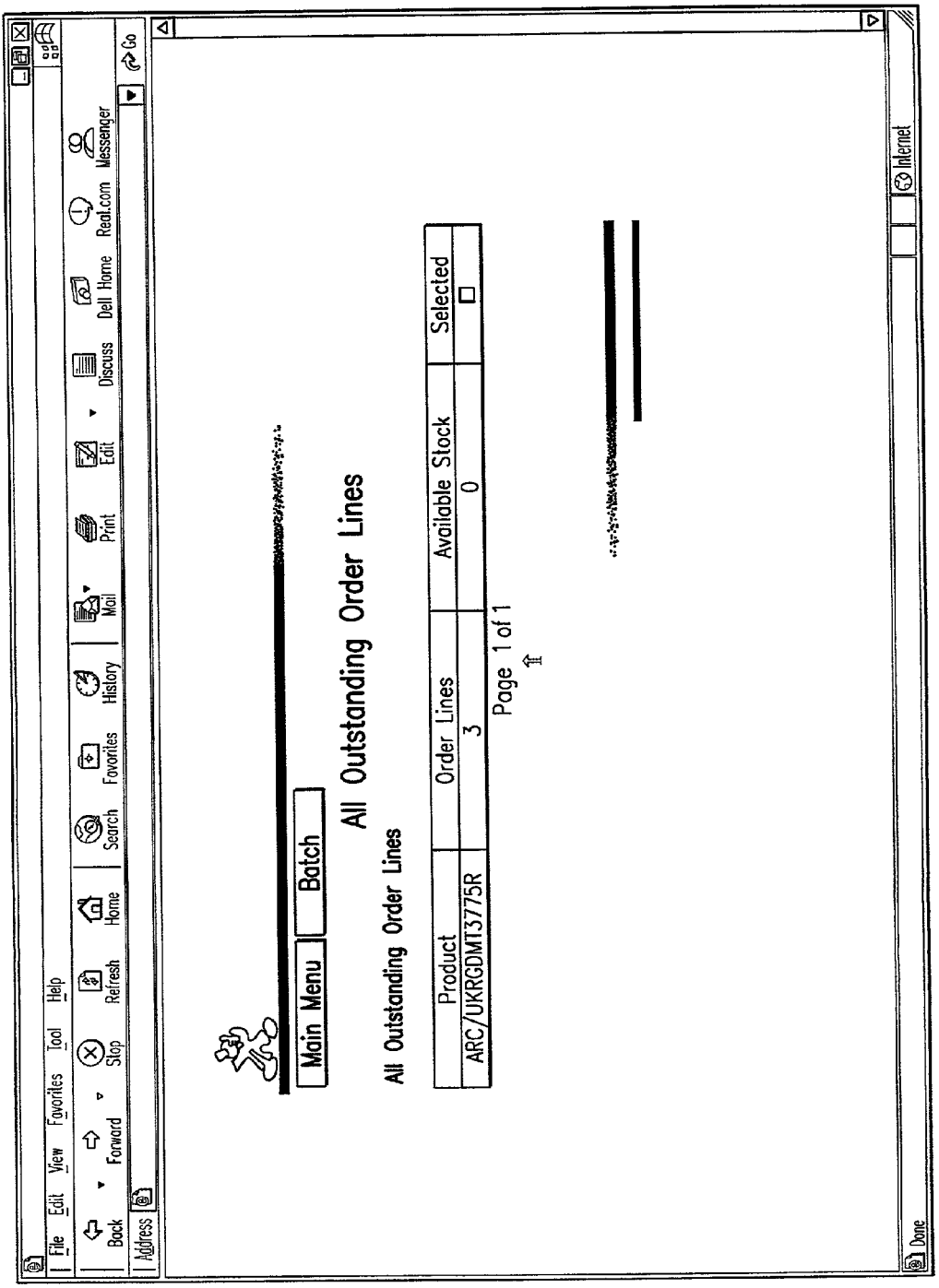
FIG. 29 is a screen associated with the flow chart of FIG. 28.
Figure 30:
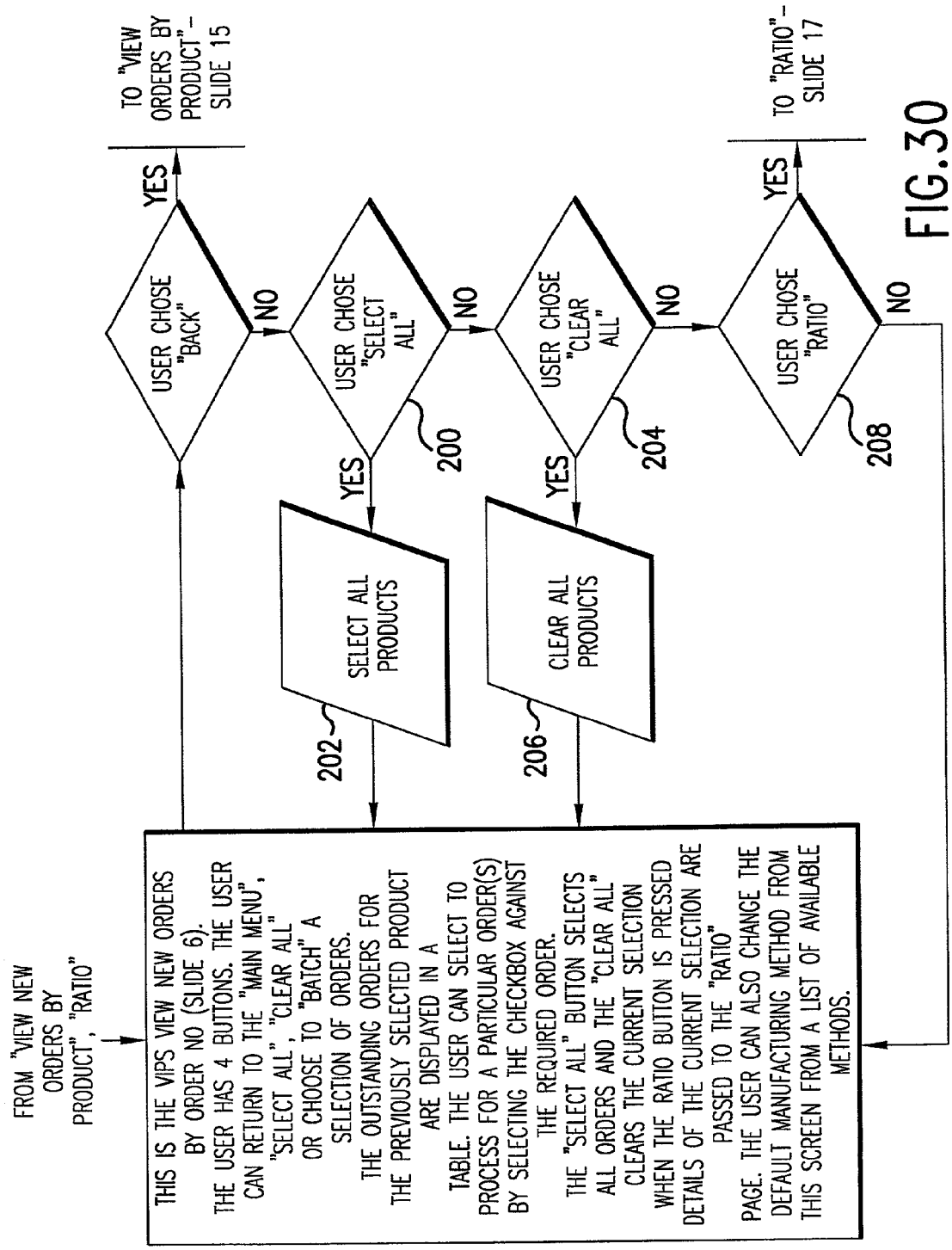
FIG. 30 is a flow chart for the production routine, view new orders-order data.
Figure 31:
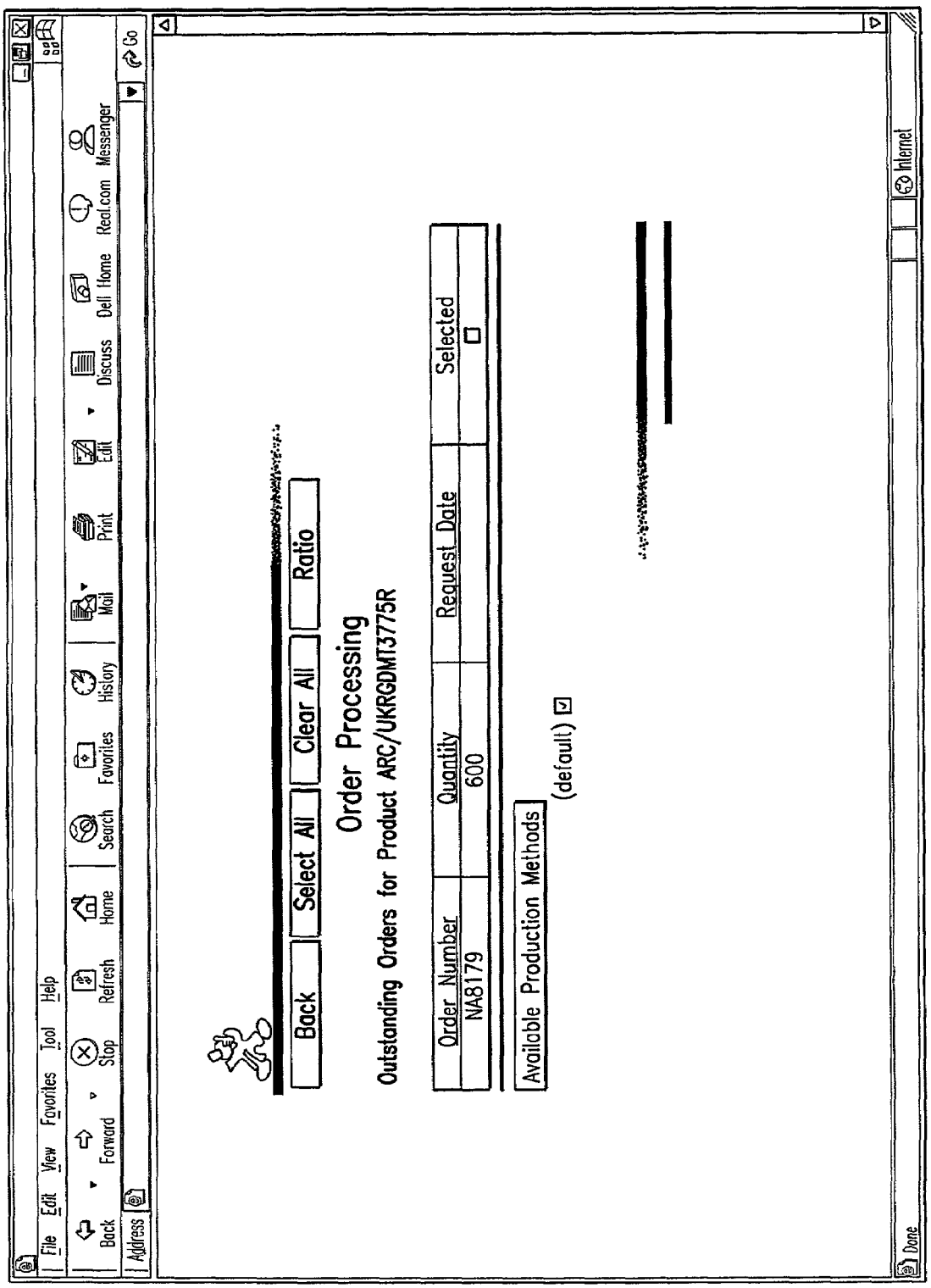
FIG. 31 is a screen associated with the flow chart of FIG. 30.
Figure 32:
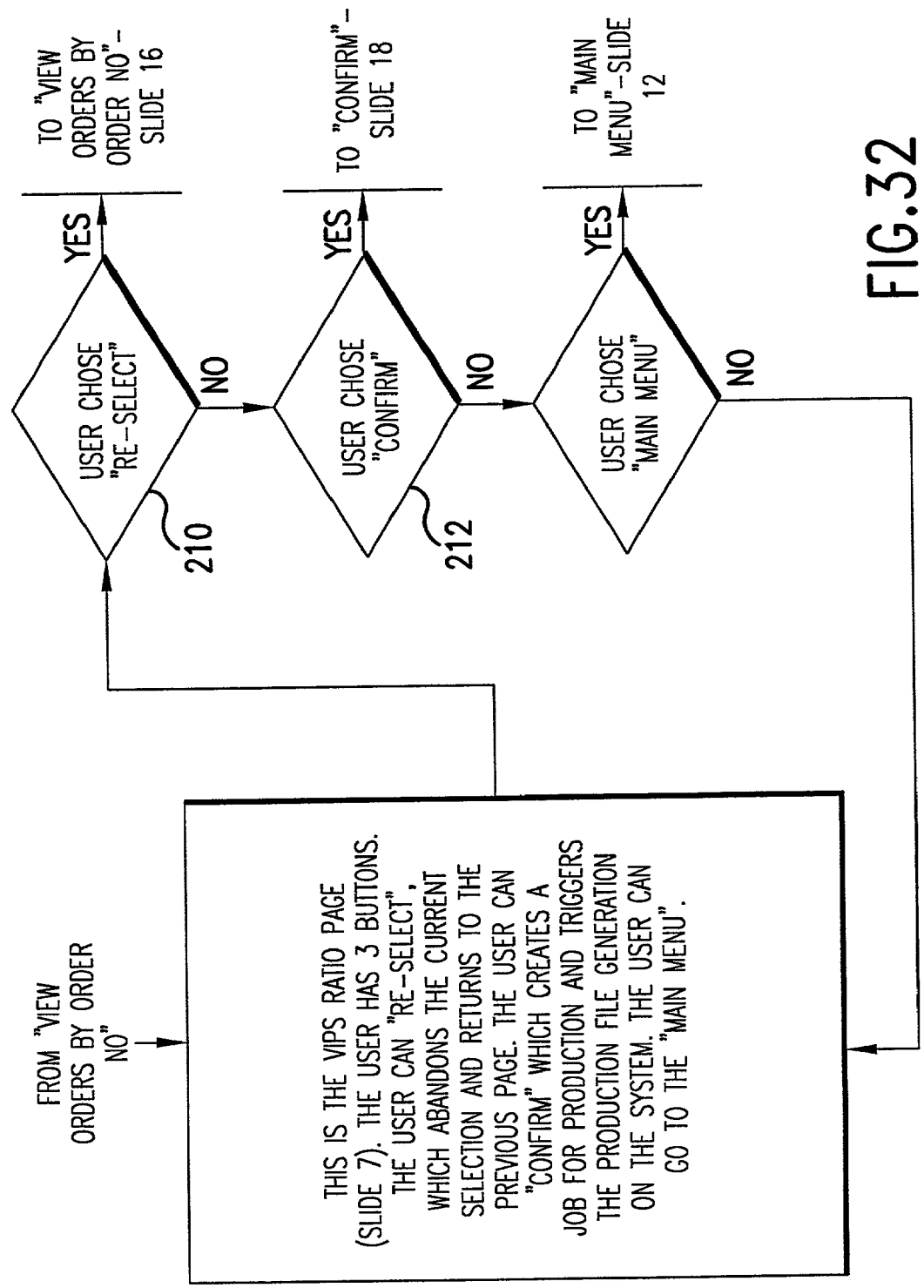
FIG. 32 is a flow chart illustrating production, view new orders-ratio.
Figure 33:
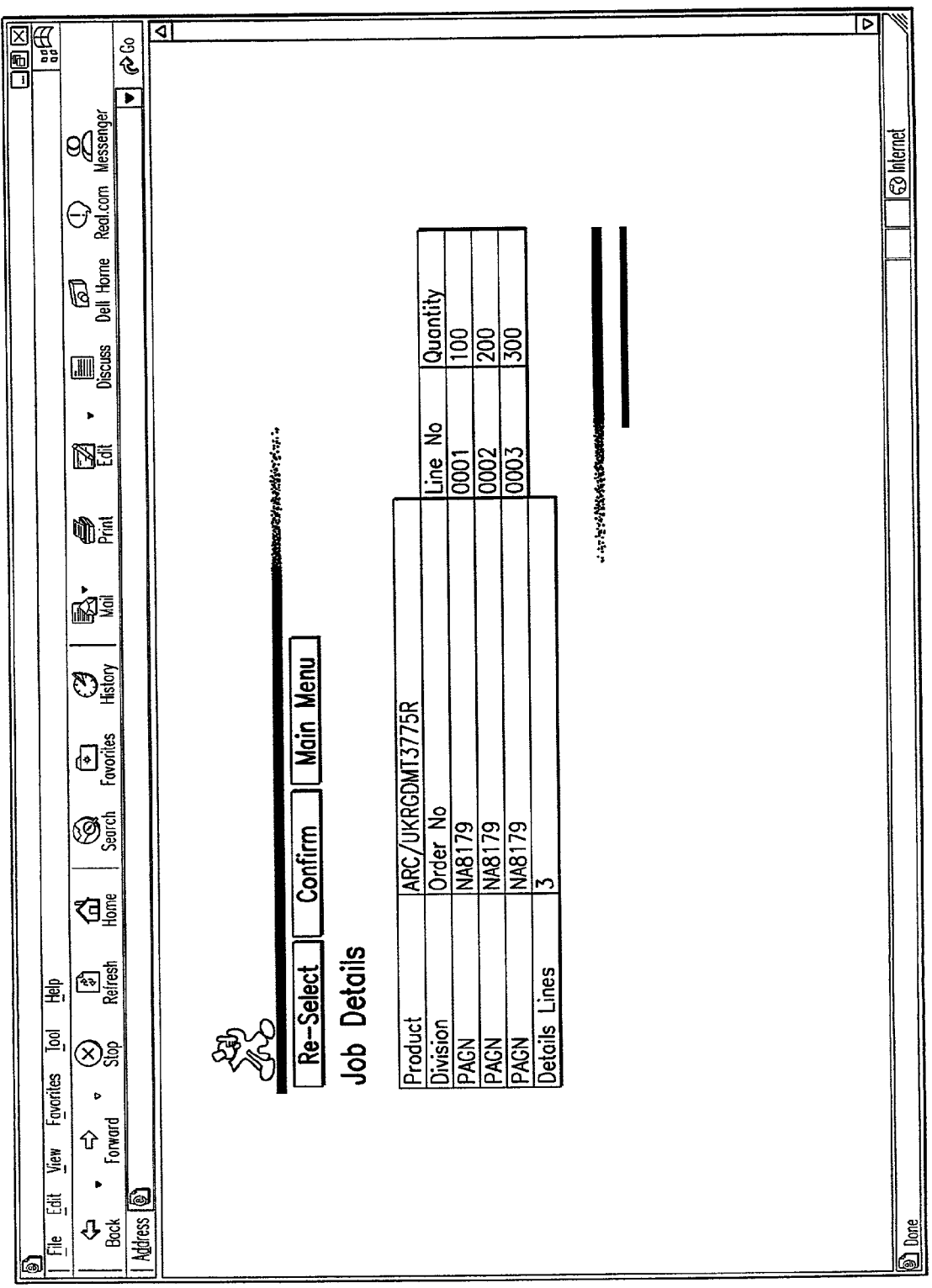
FIG. 33 is a screen associated with the flow chart of FIG. 32.
Figure 34:
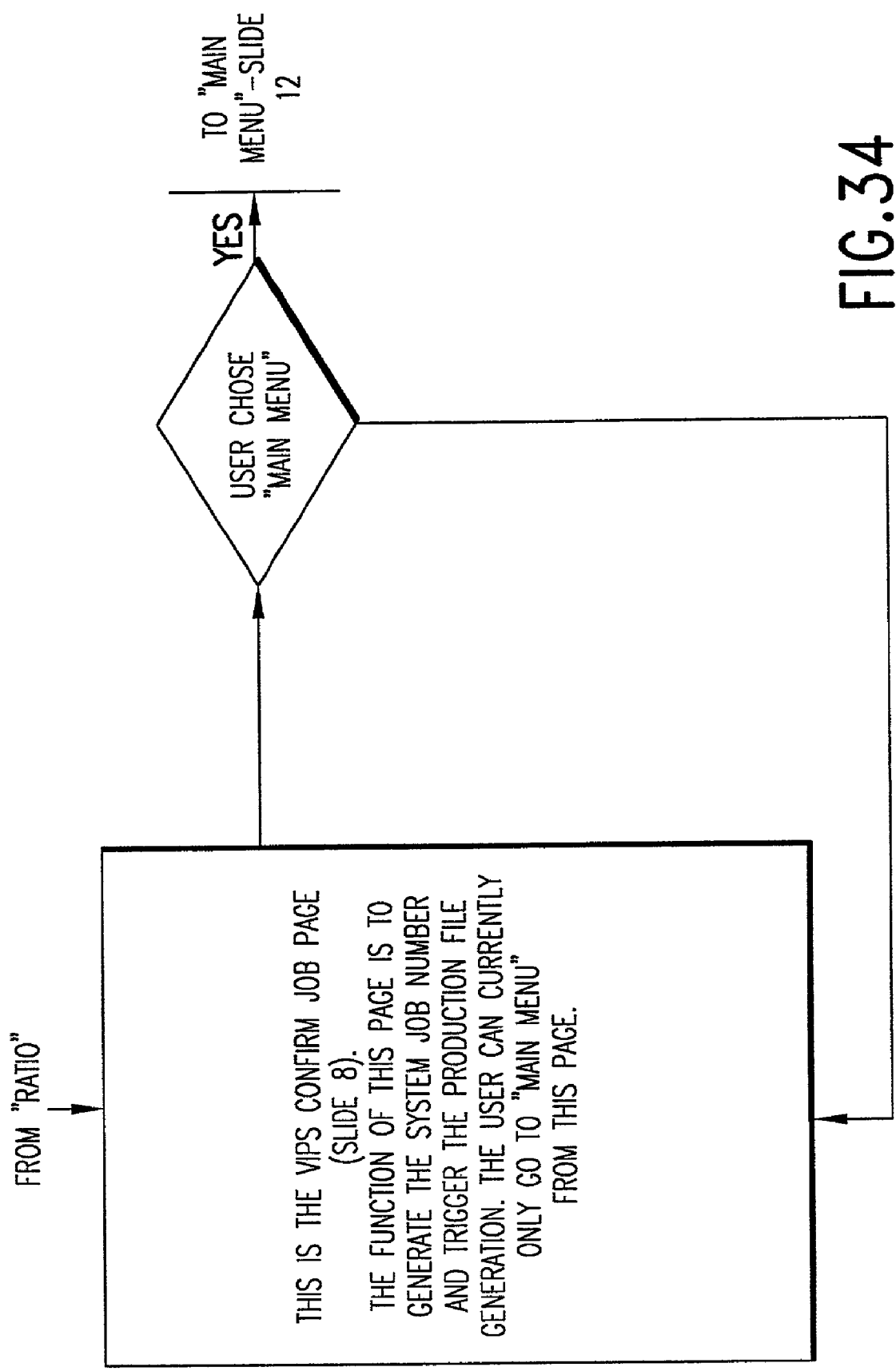
FIG. 34 is a flow chart illustrating production view new orders-confirm.
Figure 35:
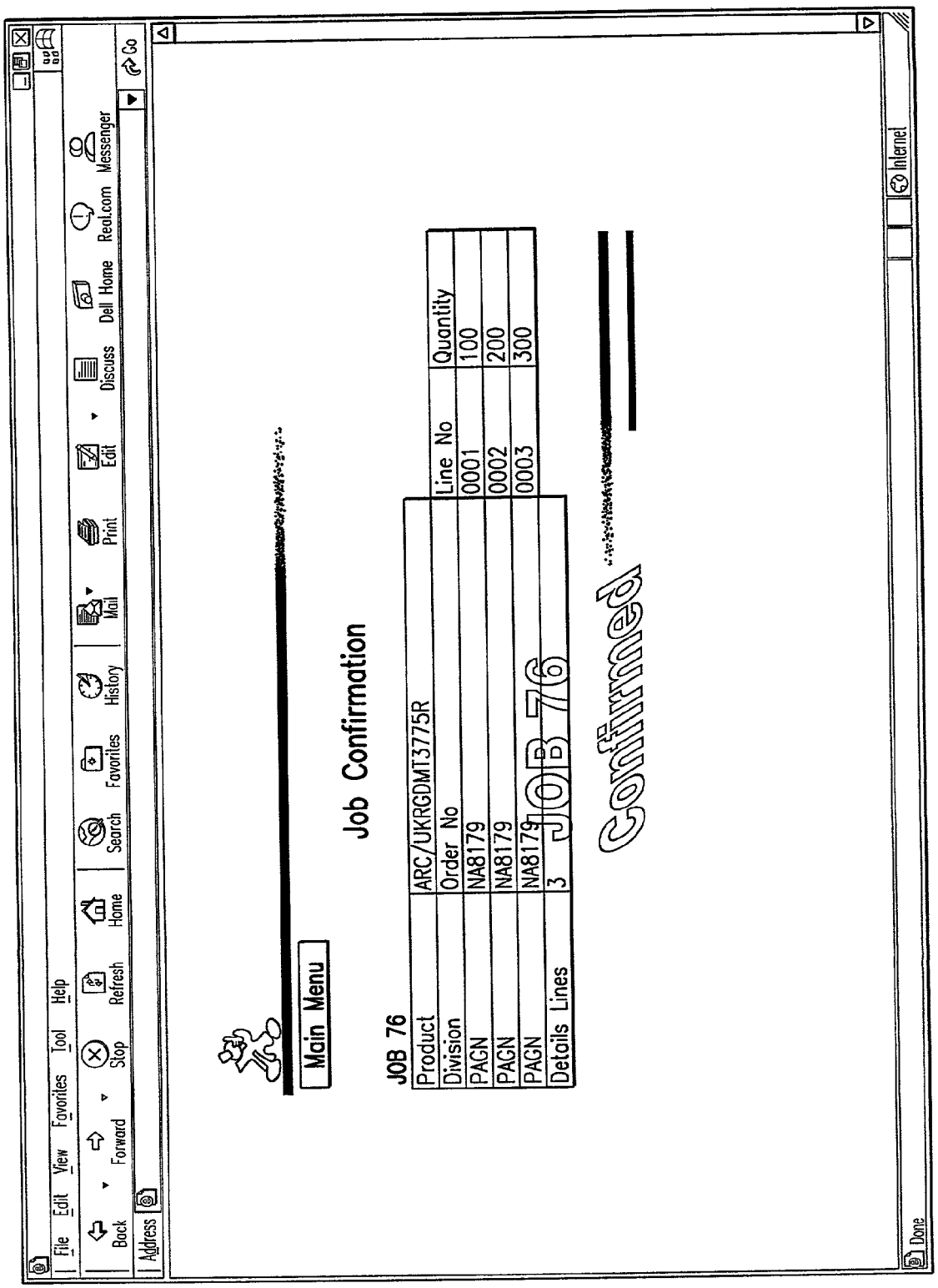
FIG. 35 is a screen associated with the flow chart of FIG. 34.

When the user wants to process orders, the user selects the view new orders choice from the main menu, the routine depicted in FIG. 26 is entered with the associated screen depicted in FIG. 27 displayed for the user. This screen shows a breakdown of the outstanding orders by store group. The user can choose a store group and then select "Batch" to view a breakdown of orders by product for the chosen store group. When the user selects "Batch" as determined at block 196 of FIG. 26, the routine proceeds to the routine depicted in FIG. 28 with the associated screen shown in FIG. 29. The screen of FIG. 29 shows the breakdown of orders by product for the previously selected store group. This screen also shows the available blank stock for the product which can be multiple blanks for some products. When a user chooses "Batch" from this screen, as determined at block 198 of FIG. 28, details of the current selection are passed to the routine depicted in FIG. 30 having an associated screen shown in FIG. 31. The screen of FIG. 31 shows all outstanding orders for the chosen store group and product. The user can choose to select all orders or can select individual or multiple orders from the table depicted in the screen. There is also the ability to sort by order number, request date and order quantity. The user can further modify the default production method. This option allows a manufacturing location to move the production from one type of machine to another type according to volumes or if a machine fails. If the user chooses to select all products to be put together in one job as determined at block 200, that function is carried out at block 202. Similarly, if the user chooses to clear all products at block 204, that function is carried out at block 206. The user can also select individual products to be put together in a job by selecting the checkbox associated with a given order. Once one or more orders have been selected, the system 10 will generate a production file based on the selected machine type. A lithographic printing job will be ratioed for the best fit on one or more plates for the most cost effective production whereas a thermal printing job will just be batched to directly produce a production file associated therewith. If the user chooses to ratio for a lithographic printing job as determined at block 208, the routine proceeds to the routine depicted in FIG. 32 with the associated screen shown in FIG. 33. The ratio screen provides detailed information about how the selected orders will be arranged on the plate for printing. The ratioing algorithm minimizes cost by placing orders with the same data on the same plate. From this screen, the user also has the option to reselect different orders to form the job or to confirm the selection of orders and create a job on the system 10.

The ratioing algorithm will be explained for a job that is to produce labels for garments with various sizes, for example, a job to print 100 labels for size 12; 200 labels for size 14; and 300 labels for size 16. Without ratioing, three plates would be used, one plate to print the size 12 labels, a second plate to print the size 14 labels and a third label to print the size 16 labels. Typically, a plate costs 100 times the cost of a sheet of paper. If, for example, the cost of a sheet of paper is $0.05, the cost of a plate is $5.00. Without ratioing, the cost of producing the job is equal to (3 plates×$5)+(101 sheets×$0.05)=$20.05. 101 sheets are needed assuming each plate can print six labels. Specifically, the size 12 labels require the quantity 100÷6=17 sheets; the size 14 labels require 200÷6=34 sheets and the size 16 labels require, 300÷6=50 sheets so that the total number of sheets is equal to 17+34+50=101. However, according to ratioing, the same job may be produced using one plate with six label positions wherein the plate is laid out so that one label position is used for the size 12 labels, two label positions are used for the size 14 labels and 3 label positions are used for the size 16 labels. By using the plate 100 times i.e. with 100 sheets, 100 size 12 labels are printed, 200 size 14 labels are printed and 300 size 16 labels are printed. The cost of producing the order by ratioing is calculated as (1 plate× $5)+(100 sheets×$0.05)=$10. This illustrates a 50% production cost saving using ratioing.

Ratioing is the method of determining the minimal number of plates that can be used to produce the labels with an associated layout of the labels on each of the plates; calculating an estimated production cost associated with the determined minimal number of plates; increasing the number of plates by one; determining a new layout of labels on the plates; and calculating an estimated production cost associated with the increased number of plates to determine if the increased number of plates results in lower estimated production costs. This process is repeated until the estimated production costs increase as opposed to decrease. Then the number of plates and associated label layouts with the lowest production cost is the output of the algorithm.

Figure 48:
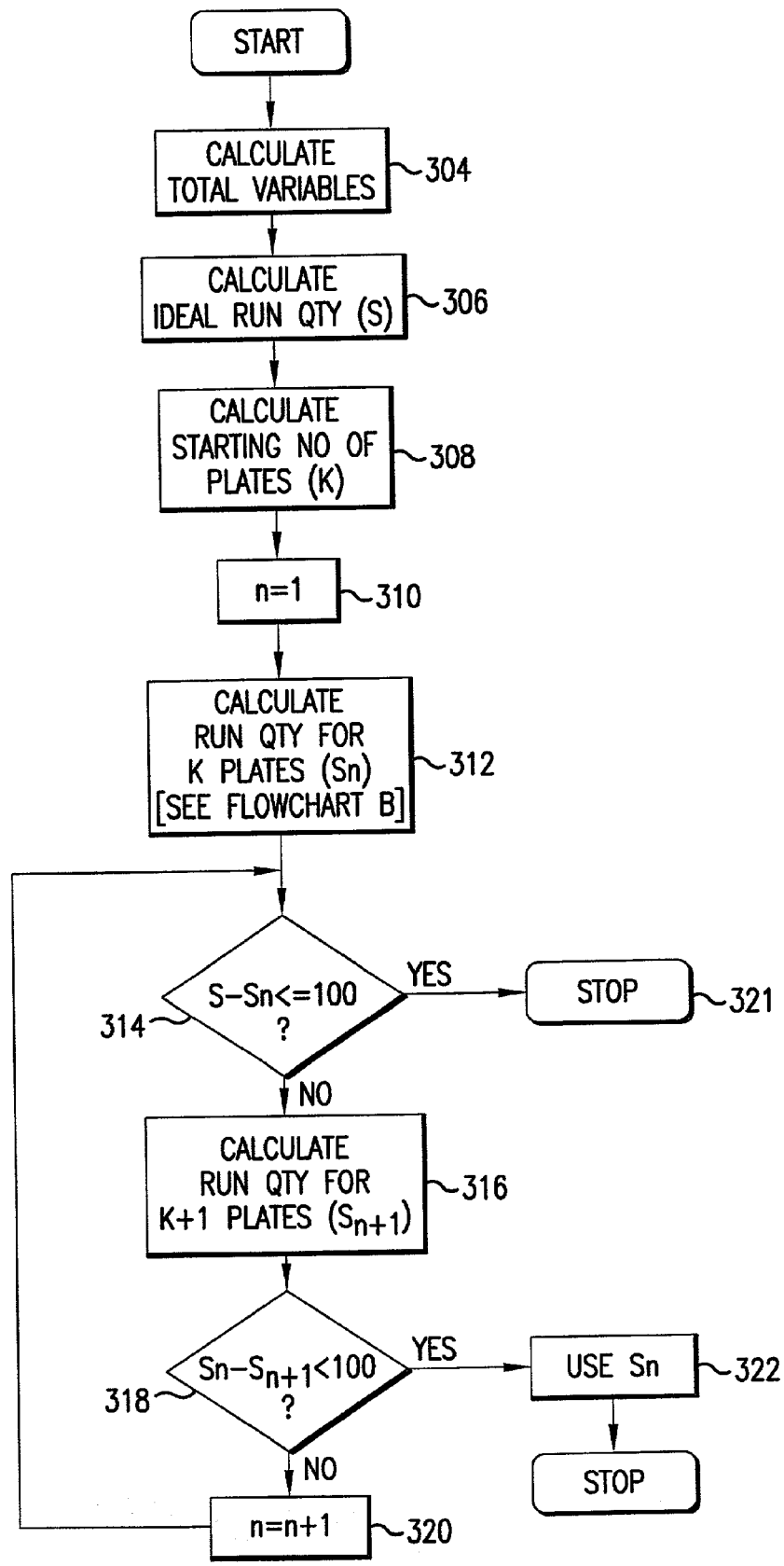
FIG. 48 is a flow chart illustrating the ratioing algorithm of the present invention.

The ratioing algorithm is shown in detail in FIGS. 48–49A–B and is described below for a job defined by the data in columns 300 and 302 of the chart of FIG. 50. The job illustrated in FIG. 50 includes 24 different labels to be printed, each different label being represented by a respective line of data numbered 1–24 in column 300. Column 302 represents the quantity of each different label type to be printed for the job. The total quantity of labels for the job is 16,580 which is the sum of the numbers in column 302. In this example, each plate, that will be used to print the job, has 16 label positions so that 16 labels can be simultaneously printed with one plate.

At the start of the ratioing algorithm, the total number of variables is calculated at block 304. Because there are 24 different label types to be printed for the job, the total number of variables is 24. As used herein with reference to the ratioing algorithm, labels of the same type have the same data printed thereon, whereas labels of different types have different data printed thereon. At block 306, the ideal run quantity S, is calculated. The ideal run quantity is equal to the total quantity of labels to be printed divided by the number of labels that can be printed by each plate, i.e. 16,580÷16 which equals 1054. At block 308, the starting number of plates, K, is calculated as the total number of variables, i.e. labels of different types, divided by the number of labels that can be printed by each plate, i.e. 24÷16, rounded up to give a starting plate number of 2. The starting number of plates represents the minimum number of plates required to print the labels of the job. Thereafter, at block 310, a variable n is set equal to 1. From block 310, the algorithm proceeds to block 312 to calculate a total run quantity $S_n$ for printing the labels of the job with K=2 plates in accordance with the subroutine depicted in FIGS. 49A–B discussed below. The run quantity $S_n$ represents the total or sum of the number of times that each of the K plates must be run to print the labels of the job. At blocks 314, 316, 318, 320 and 322, the algorithm determines the optimum number of plates to be used based on the total run quantity for K plates and a cost difference factor of 100 as discussed below.

Figure 49A:
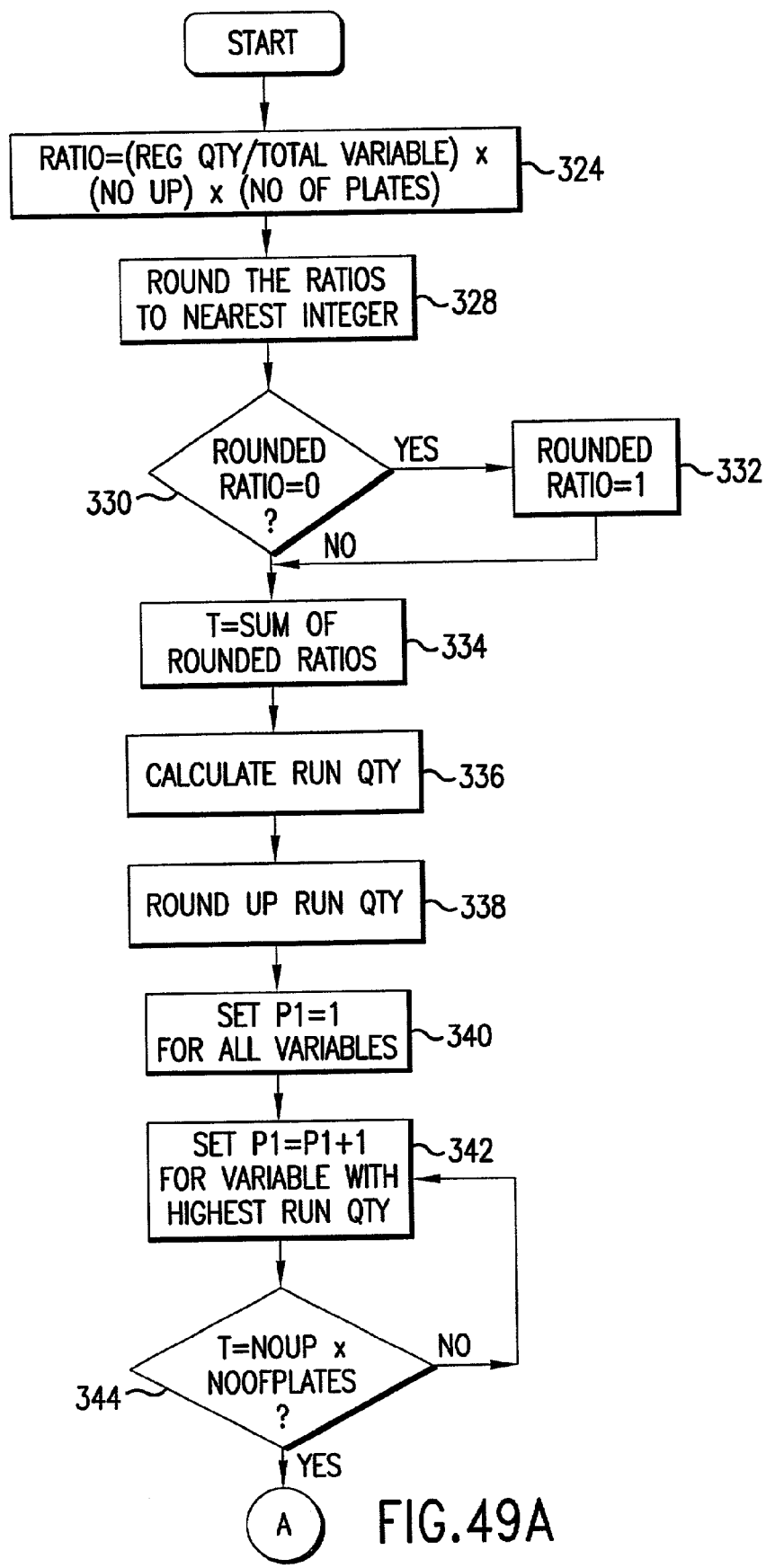
FIGS. 49A–B form a flow chart illustrating a Run Quantity subroutine of the ratioing algorithm of FIG. 48.
Figure 49B:
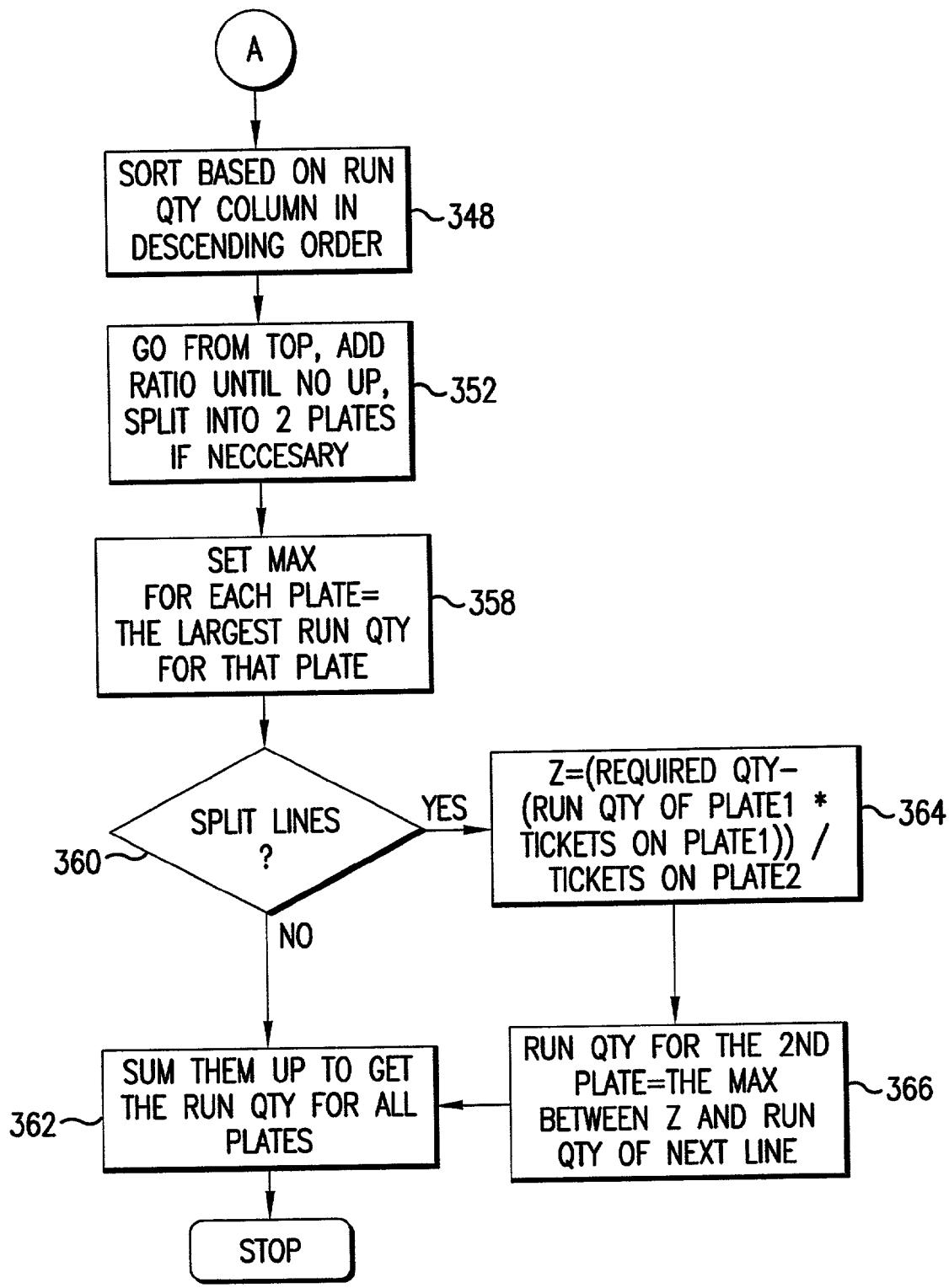

The subroutine of FIGS. 49A–B determines the layout of each of the K plates, i.e. the number of label positions on a plate that are to be used to print a given label type. At the start of this subroutine at a block 324, a ratio is calculated for each label type, i.e. for each line of data 1–24. The ratio for a given label type is equal to the number of labels that can be printed by each plate times the number of plates K times the required quantity for the given label type from column 302 divided by the total quantity of labels to be printed for the job. For example, the ratio for label type 1 is equal to 16×2×850/16850=1.61 as shown for line number 1 in column 326 of FIG. 50. After a ratio is calculated at block 324 for each of the 24 lines of data, the subroutine proceeds to block 328. At block 328, each of the ratios calculated at block 324 is rounded down to the next lowest integer. At block 330, if it is determined that the rounded ratio for any line of data is equal to 0, then at block 332, that rounded ratio is set equal to 1. At block 334, a value T is set equal to the sum of the 24 rounded ratios calculated at blocks 328, 330 and 332. A run quantity is then calculated at block 336 for each of the 24 different label types. The run quantity for a given line of data or label type is set equal to the required quantity for that label type as set forth in column 302 divided by the rounded ratio for that label type determined at block 328, 330 and 332. For example, for the label type 2, the run quantity is equal to 1600÷2 which equals 800 as shown in column 350 of FIG. 50. At block 338, the run quantity calculated at block 336 is rounded up to the nearest integer. Thereafter, at block 340, a variable P1, associated with plate 1, is set equal to 1 for each of the different label types. At block 342, a new value P1 is determined for the label type having the highest run quantity, the new P1 value being equal to that label type's rounded ratio plus one. Steps 334, 336, 338, 340 and 342 are repeated until the value T as determined at block 334 is equal to the number of labels that can be printed by each plate, referred to as the "number up," times the number of plates, K, as determined at block 334. When T=No Up×No Of Plates as determined at block 344, the subroutine proceeds to block 348.

Figure 50:
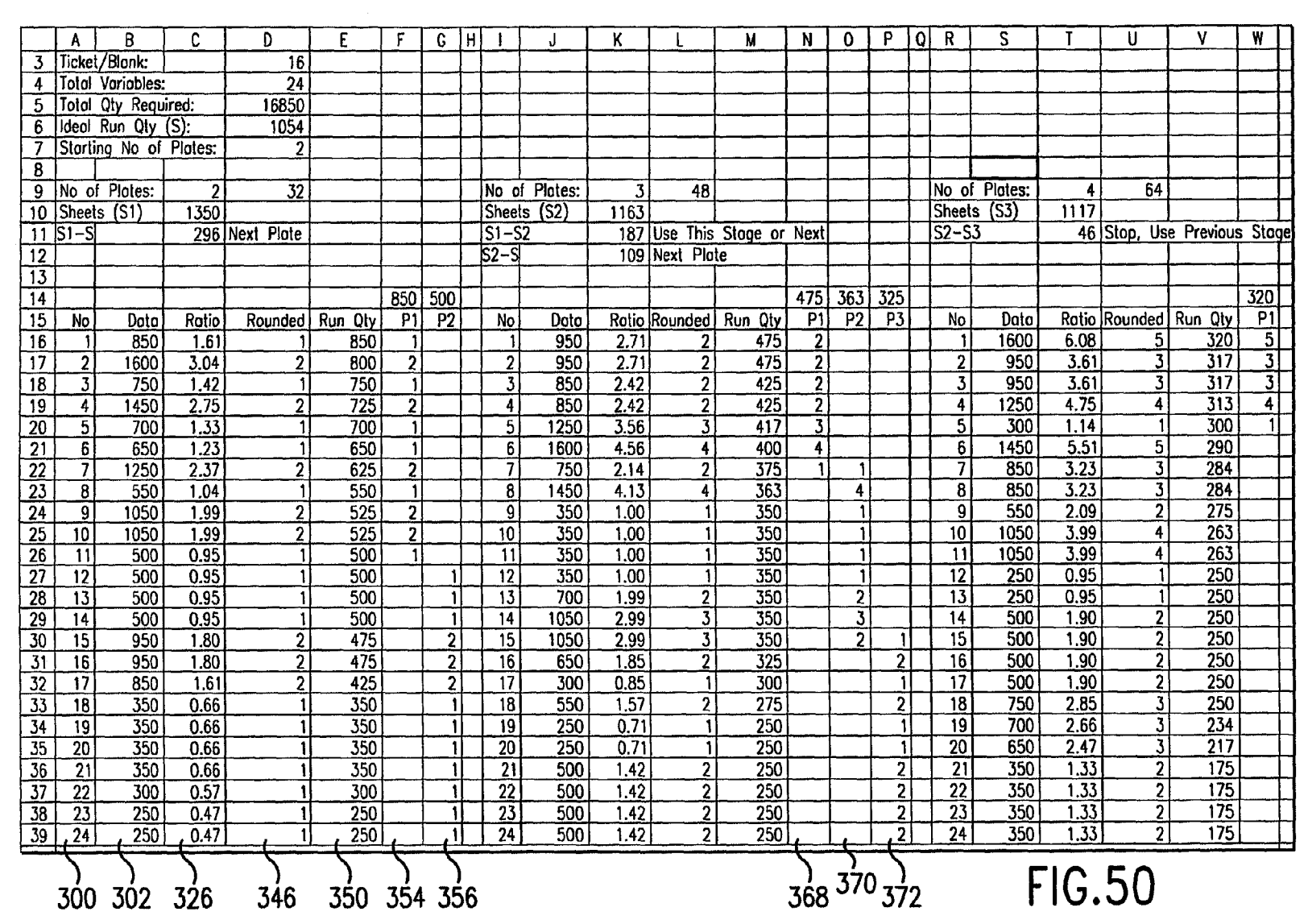

At block 348, the algorithm sorts the run quantity values in descending order so as to generate the sorted run quantity column depicted at 350 of FIG. 50. At block 352, the ratios associated with each of the sorted run quantities are added up until that sum is equal to the number up, i.e. the number of labels capable of being printed by a plate (16 in the present example). At that point, the labels of the job are split into 2 plates if necessary as shown in columns 354 and 356 of FIG. 50. Thereafter, at block 358, the maximum run quantity for each plate is set equal to the largest run quantity for the plate. In the present example, for plate 1 as shown in column 354, the largest run quantity for that plate is 850; whereas the largest run quantity for plate P2 is 500 as shown at column 356. At block 360, the routine determines whether there are any split lines. A split line occurs when a given label type is to be printed using more than one plate. If there are no split lines, as is illustrated by columns 354 and 356, the routine proceeds to block 362. At block 362, the routine sums the largest run quantity for each of the plates to calculate the total run quantity $S_n$. In the example illustrated at columns 350, 354 and 356, $S_n=850+500=1350$. From block 362, the algorithm proceeds to block 314 of FIG. 48.

At block 314, the algorithm determines whether the total run quantity $S_n$ for K plates is within a predetermined number, 100, of the ideal run quantity, S, calculated at block 306. Because $S_n=1350$ is not within 100 of $S=1054$, the routine proceeds to block 316. At block 316, the number of plates is increased by 1 and the total run quantity $S_{n+1}$ is calculated for the increased number of plates in accordance with the subroutine depicted in FIG. 49A–B. In the present example, when the number of plates is increased to 3, and the ratio, rounded ratio, run quantities, etc. for each of the different label types is recalculated, it is seen at columns 368, 370 and 372 that the label type number 7 is a split line such that the required quantity of 750 is printed using one label position on each of two plates P1 and P2. Similarly, the label type 15 is printed using two label positions on plate P2 and one label position on plate P3. These split lines are determined at blocks 364 and 366 of FIG. 49B. In particular, at block 364, a value Z is set equal to the required quantity minus the product of the run quantity of plate 1 times the number of labels on plate 1 divided by the number of labels on plate 2. Thereafter, at block 366 the run quantity for the second plate is set equal to the maximum between the value Z calculated at block 364 and the run quantity of the next line. From block 366, the routine proceeds to block 362 as discussed above.

From block 316, the algorithm proceeds to block 318 to determine whether $S_n-S_{n+1}$ is less than the predetermined number, 100. If not, at block 320, n is set equal to n+1 and the algorithm proceeds back to block 314. However, if the difference between $S_n$ and $S_{n+1}$ is less than the predetermined number, 100, the algorithm proceeds from block 318 to 322 to go back one state. In the example illustrated by the chart of FIG. 50, the sum of the largest run quantities for 3 plates=475+363+325=1163=$S_{n+1}$ which is not within 100 of $S_n=1350$. Because the sum of the largest run quantities for 4 plates will be within 100 of the ideal run quantity, at block 322, the algorithm determines that the optimum number of plates to use to print this job is 3 plates with the layout of each plate determined by the columns 368, 370 and 372 wherein two label positions of plate 1 are used to print labels of type 1; two label positions of plate P1 are used to print the labels of type 2, etc. It should be appreciated that, the sum of the run quantities, i.e. the total run quantity $S_n$ represents an estimated production cost wherein the cost of a plate is approximately 100 times the cost of a sheet of paper or other label material. That is, the range, 100, used in steps 314 and 318, represents an approximate cost of a plate relative to an approximate cost of a sheet of paper. Step 318 determines whether the estimated production costs increase or decrease with an increased number of plates. The number of plates and associated label layout with the lowest productions cost is determined at block 321 or 322.

Referring back to FIGS. 32 and 33, if the user chooses "Re-select" as determined at block 210, the routine will abandon the current selection and return to FIG. 30 and associated screen as shown in FIG. 31. If the user chooses to confirm as determined at block 212, a job file is created for production. This triggers the generation of the production file. From block 212, in response to the selection of "confirm," the routine proceeds to the routine depicted in FIG. 34 with the associated screen shown in FIG. 35 which depicts a job number in association with the confirmed job. When production file generation is triggered by the confirm operation, the routines depicted in FIGS. 44–47 are implemented as discussed in detail below.

Figure 36:
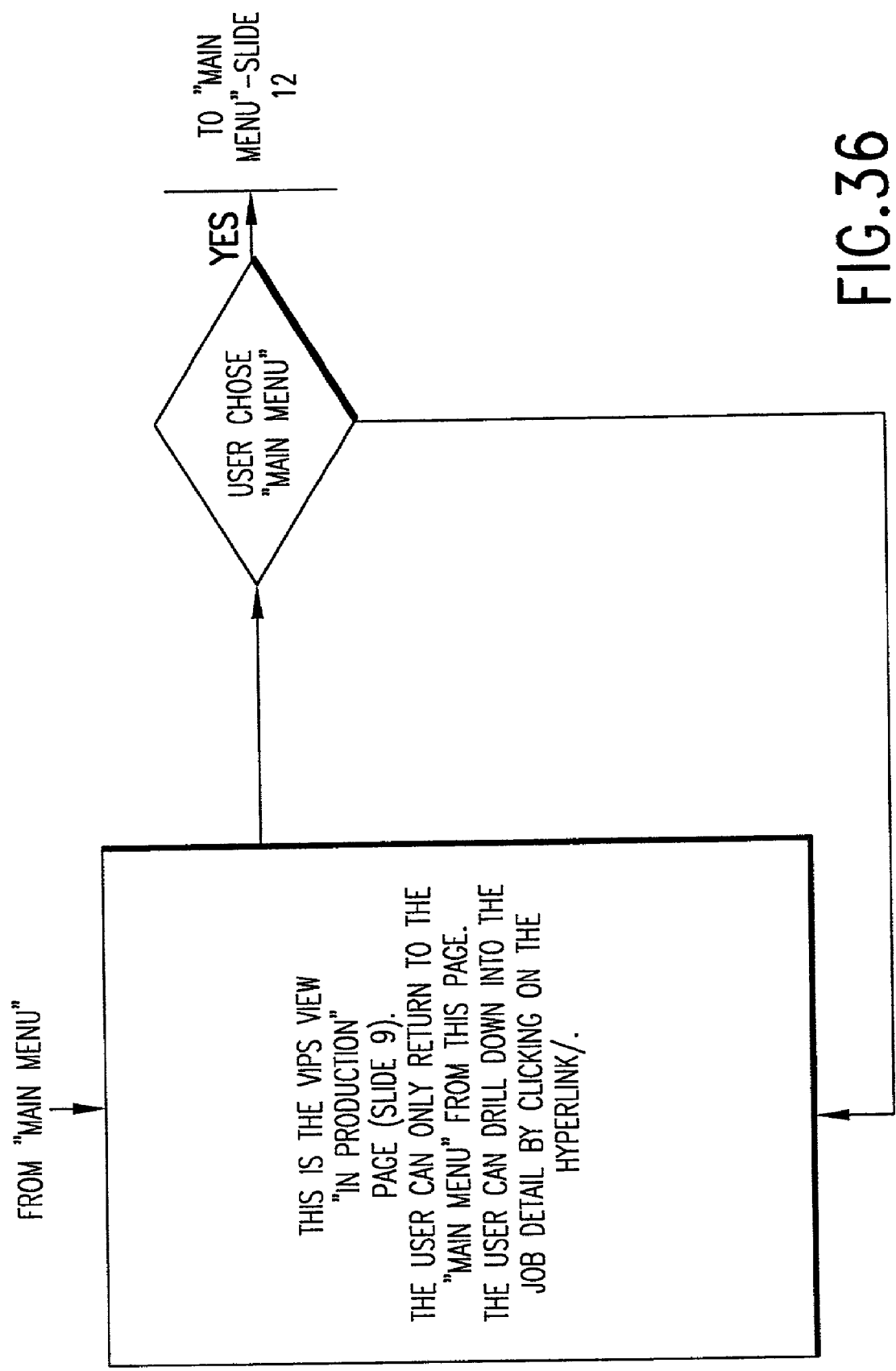
FIG. 36 is a flow chart for the production routine, files in progress.
Figure 37:
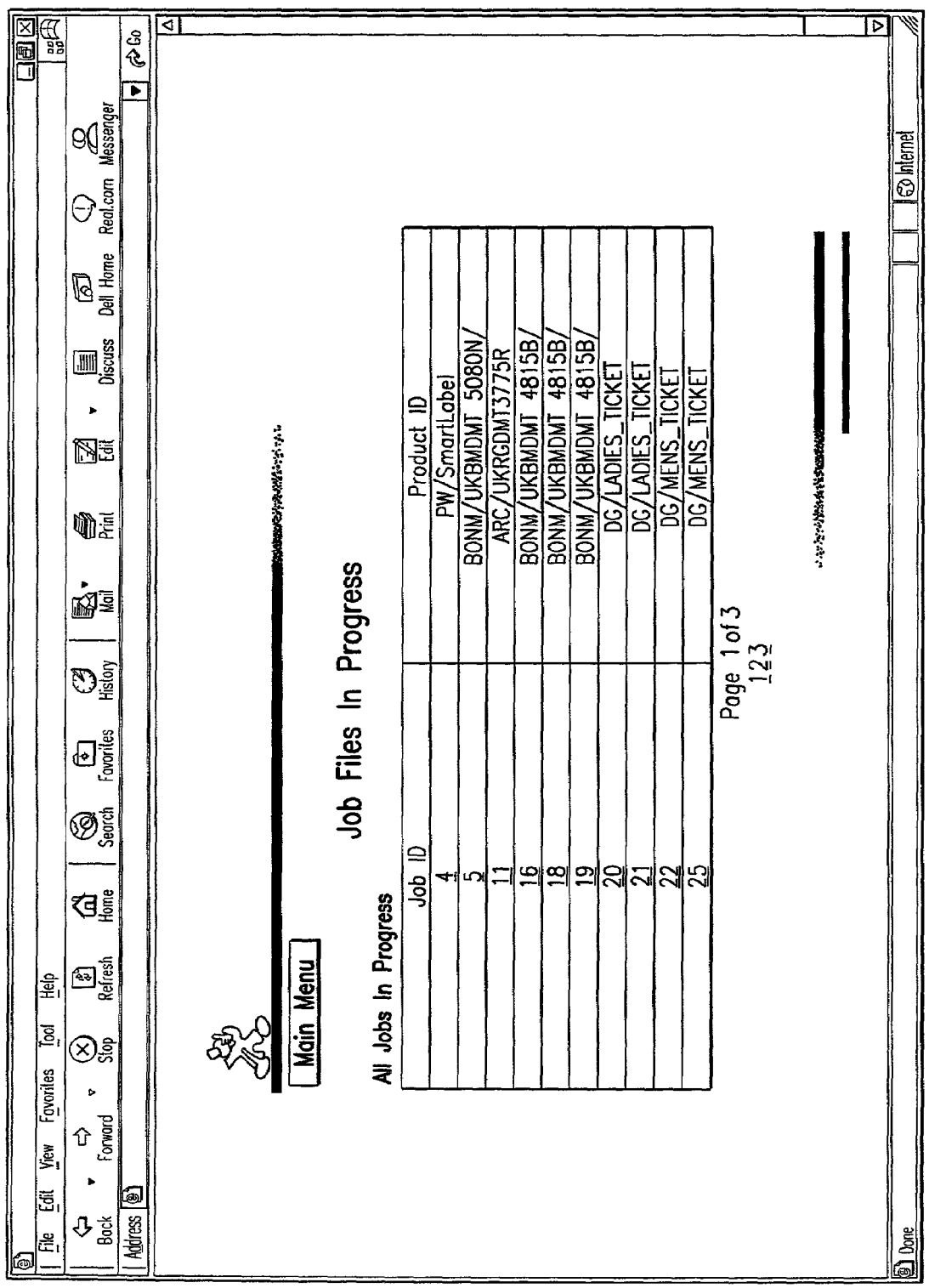
FIG. 37 is a screen associated with the flow chart of FIG. 36.

When the user makes the selection of "Production Files In Progress" from the main menu, the routine of FIG. 36 is implemented with the associated screen depicted in FIG. 37. The screen of FIG. 37 displays the jobs that are currently in progress. A job in progress means that the user has confirmed a job, but the production files have not yet been generated and stored in the central database 16. Typically, jobs appear on this screen only for a few minutes.

Figure 38:
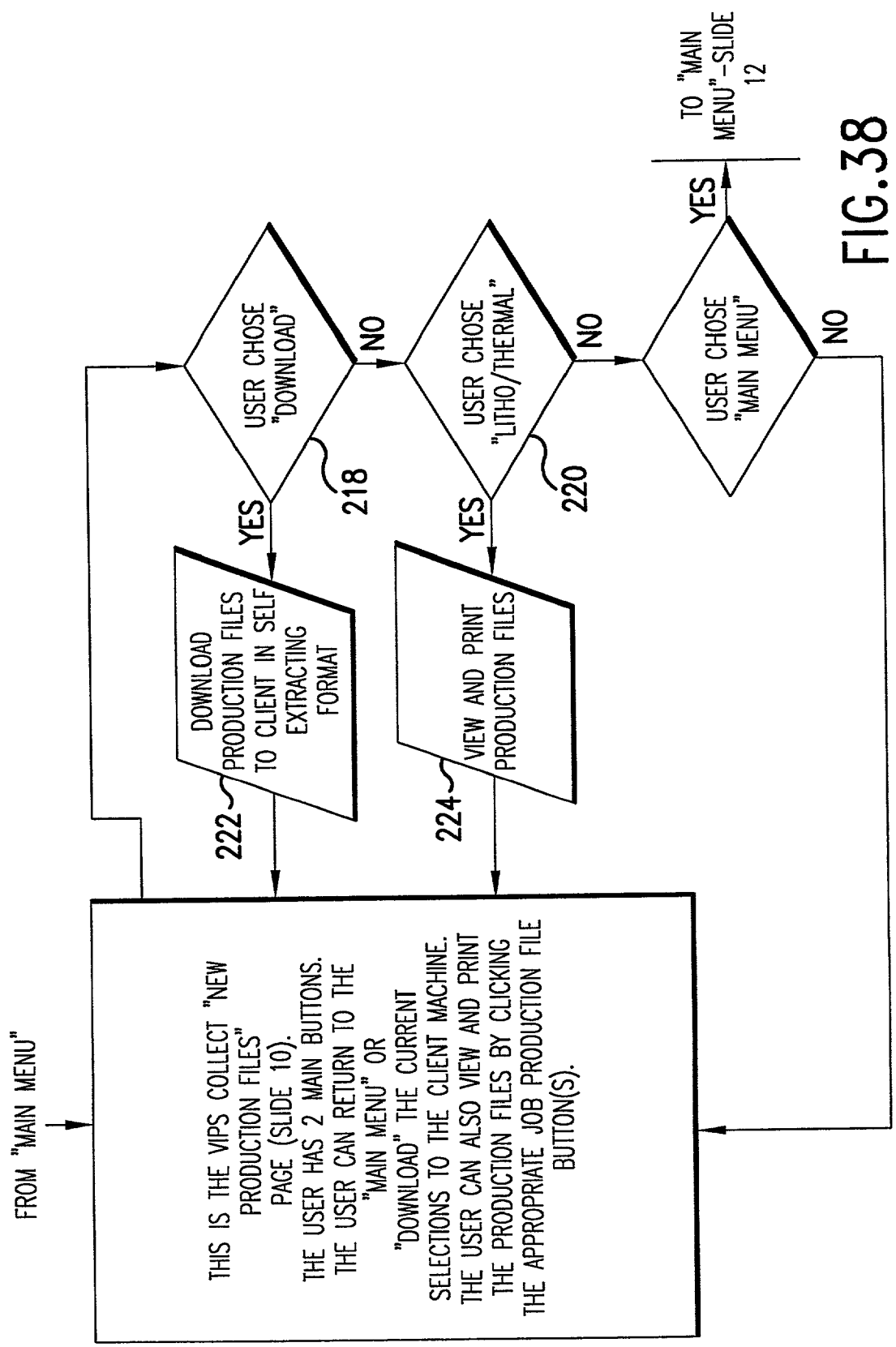
FIG. 38 is a flow chart for the production routine, collect new production files.
Figure 39:
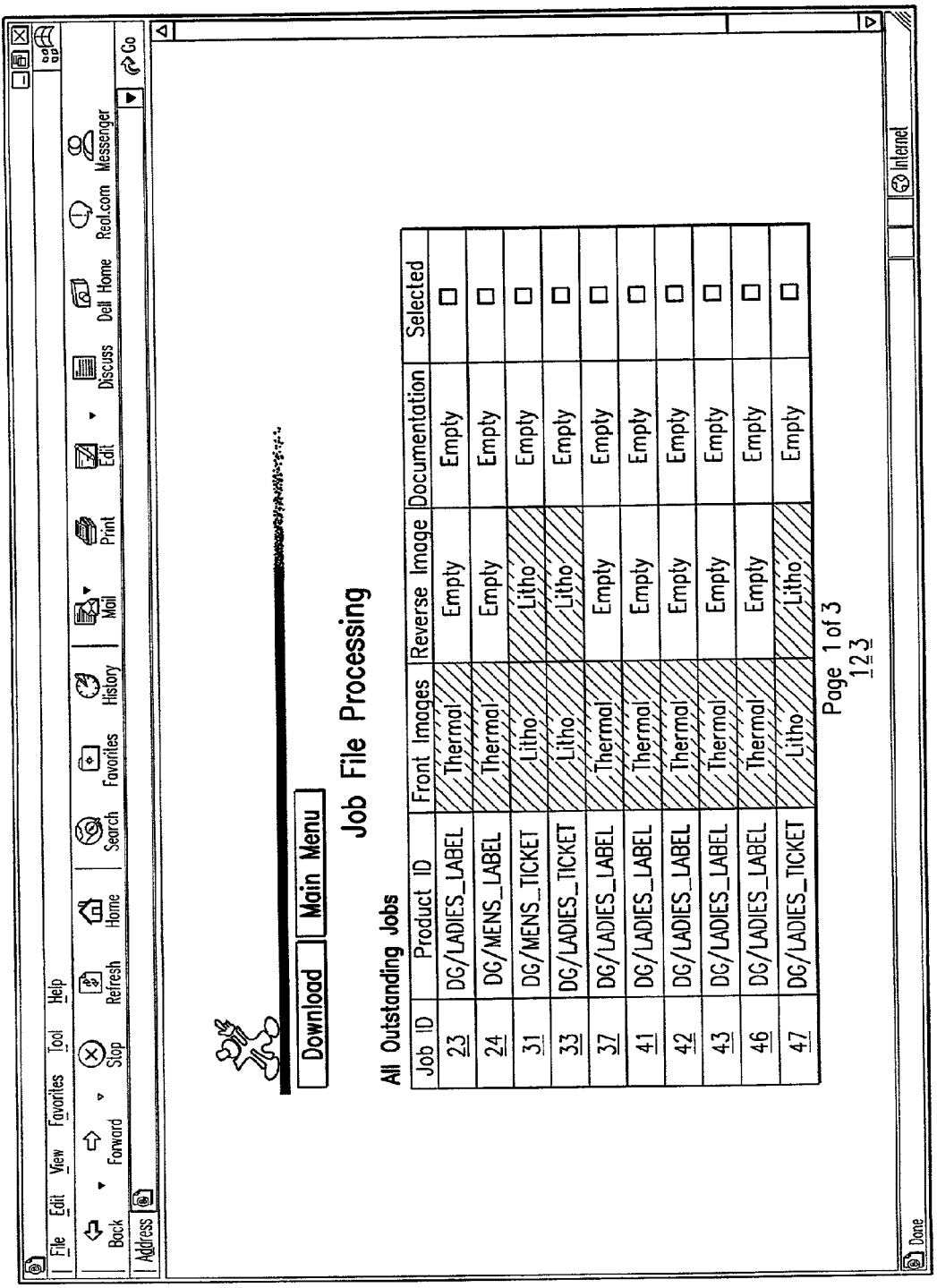
FIG. 39 is a screen associated with the flow chart of FIG. 38.

When a user chooses to collect new production files from the main menu, the routine proceeds to the routine depicted in FIG. 38 with the associated screen of FIG. 39. The screen of FIG. 39 displays jobs that have been completed. A job is considered completed when all of the necessary production files for the job have been created as discussed below. The jobs are listed in order of date. The selection buttons associated with each job indicate the type of production file generated so as to indicate the production method or machine type to be employed to produce the labels of a job with the production file. By selecting one of these buttons, the user is either shown the plate image for lithographic printing or is taken to an on-line printing screen if the job is for a thermal printer. Multiple jobs can also be selected and downloaded to a customer machine for printing at a later date. This is accomplished when the routine determines at block 218 that the user has chosen "Download" and at block 222 the server 14 downloads production files from the database 16 to the customer in a self-extracting format. If the user chooses litho or thermal as determined at block 220, at block 224, the plate image for a lithographic production file is depicted on the user's display and for thermal printing, the data in the production file can be printed by a thermal printer 32 coupled to the user's P.C.

If the main menu selection was "Retrieve Old Production Files," the routine depicted in FIG. 40 is implemented with the screen depicted in FIG. 41. This screen provides the user with the ability to retrieve old jobs, that is, jobs that have already been printed. For example, if there is a problem during the printing process, this feature can be selected to produce extra labels. If the user selects "Download" as determined at block 222, at block 224 the production files are downloaded to the customer in a self-extracting format. If the user chooses a lithographic or thermal printing job as determined at block 226, the image for the lithographic plate can be viewed by the user or a thermal printer production file processed, i.e. printed on a thermal printer 32. It is noted, for a lithographic plate, when the image is viewed, the production file for the plate can be coupled from the user's P.C. to a plate maker 34 for the automatic production of the plate for the job as well.

If the user selects "Production Files In Error" from the main menu, the routine of FIG. 42 is implemented which causes a screen, not shown, to list all of the file import errors that have occurred in the system 10. This feature allows users to see what files have errored and provides clues as to what the error was. The problem can then be resolved and the file reprocessed.

FIGS. 44–47 illustrate the routines and screens associated with the typesetting job controller implemented by the server 30. When a job is confirmed via the production screen as discussed above, the job controller as depicted in FIG. 44B is automatically started so that the routine proceeds from block 230 to block 232. When the new job files are received at block 232, the routine proceeds to FIG. 45B. If the job is for lithographic production, the controller at block 234 loads commercially available Quark imaging software and at block 236 loads the template specified for the job in the job file. From block 236, the routine proceeds to block 238 of FIG. 46B. After the template is loaded, the server 30 queries the server 14 for the required variable data. The server 30 then places each field of data in the corresponding location or position on the template at block 240. After all of the data fields have been placed on the template at block 240, at block 242, a Postscript file is generated as depicted on the left side of the screen shown in FIG. 46C. After the variable data is merged with the template and the Postscript file is created at block 242, the server opens a commercially available routine called Acrobat Distiller and passes the name of the Postscript file so as to convert at block 246 the Postscript files to the production files in PDF format. At block 248, the PDF production files are uploaded to the server 14 and at block 250 those production files are stored as binary large images (BLOB) in the central database 16. It is noted that the creation of the production files for other printing methods follows similar process. The format of the production file will vary with the label production method specified for a job so that the production file created can preferably be used directly by the production machine as discussed above.

Figure 44A:
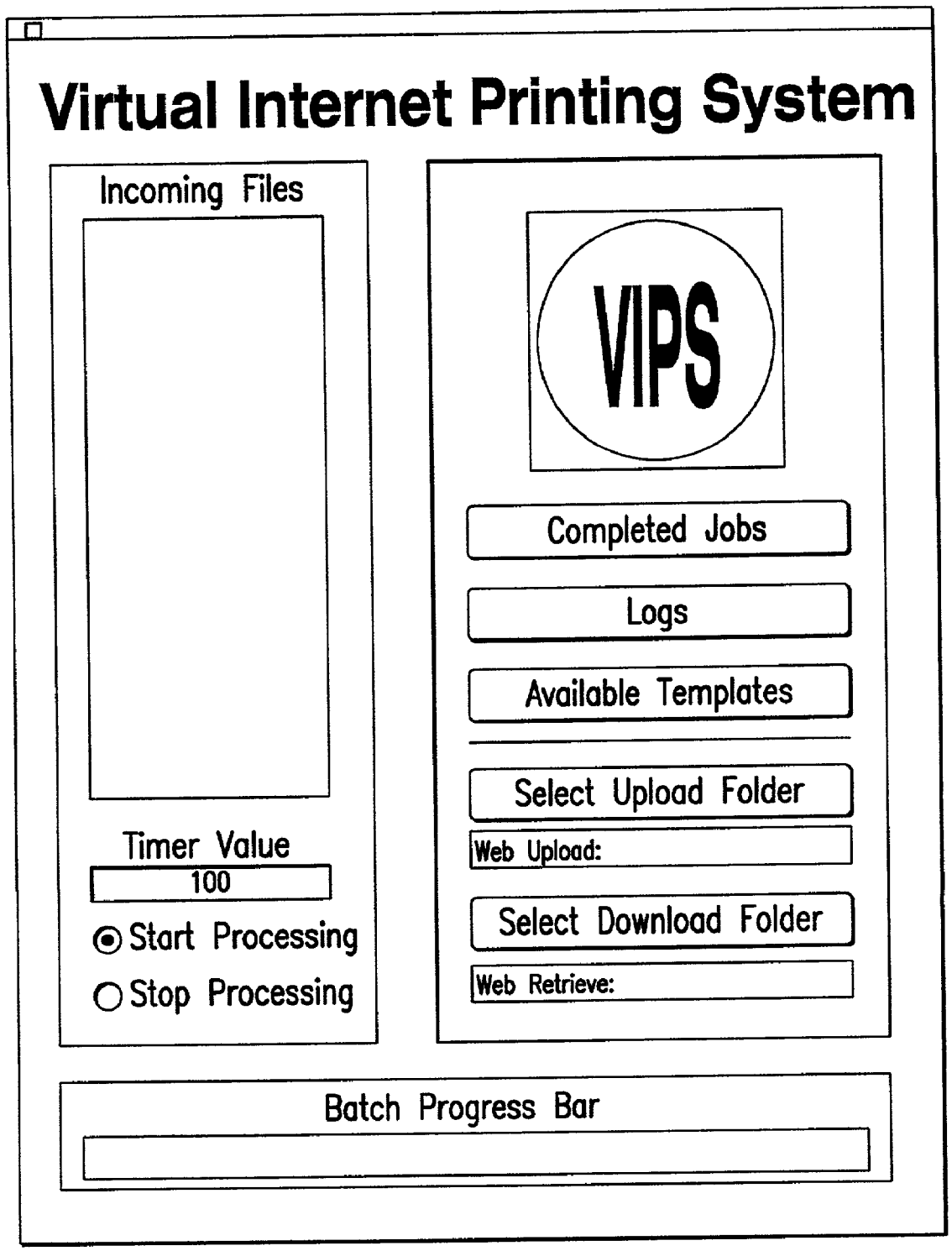
Figures 1, 44B:
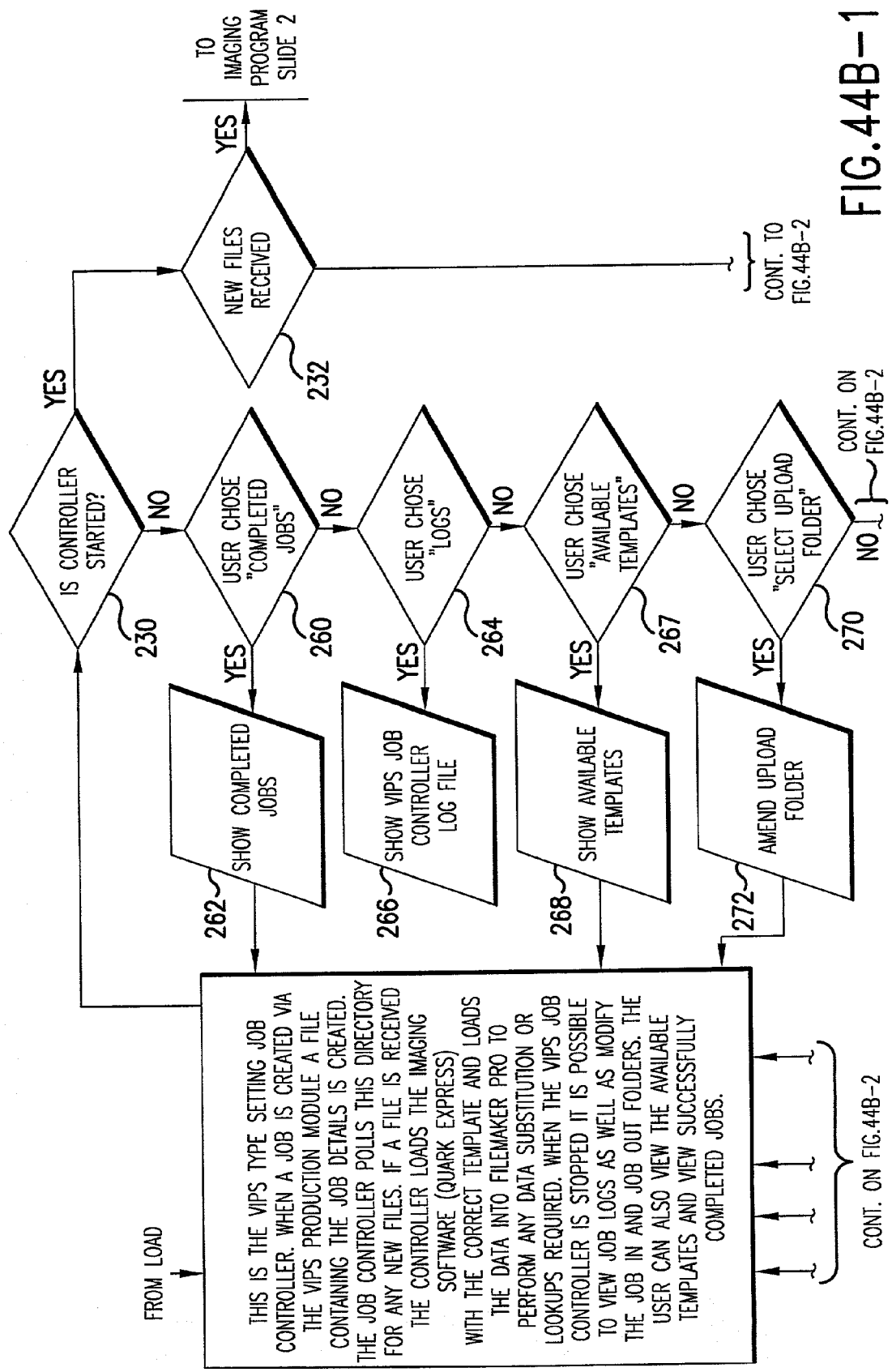
Figure 45A:
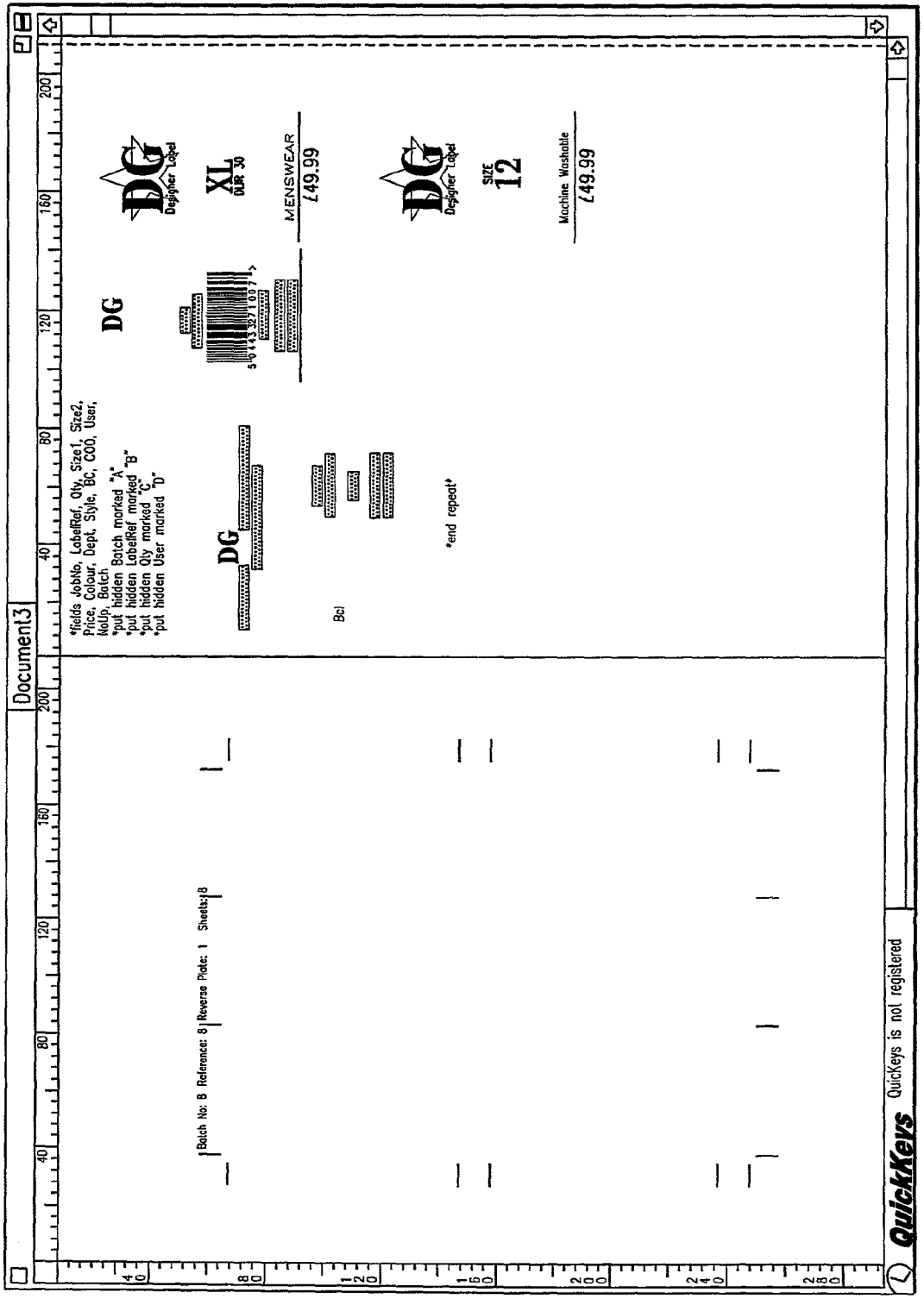
FIGS. 45A–B illustrate a screen and associated flow chart for the typesetting routine, load template.
Figure 45B:
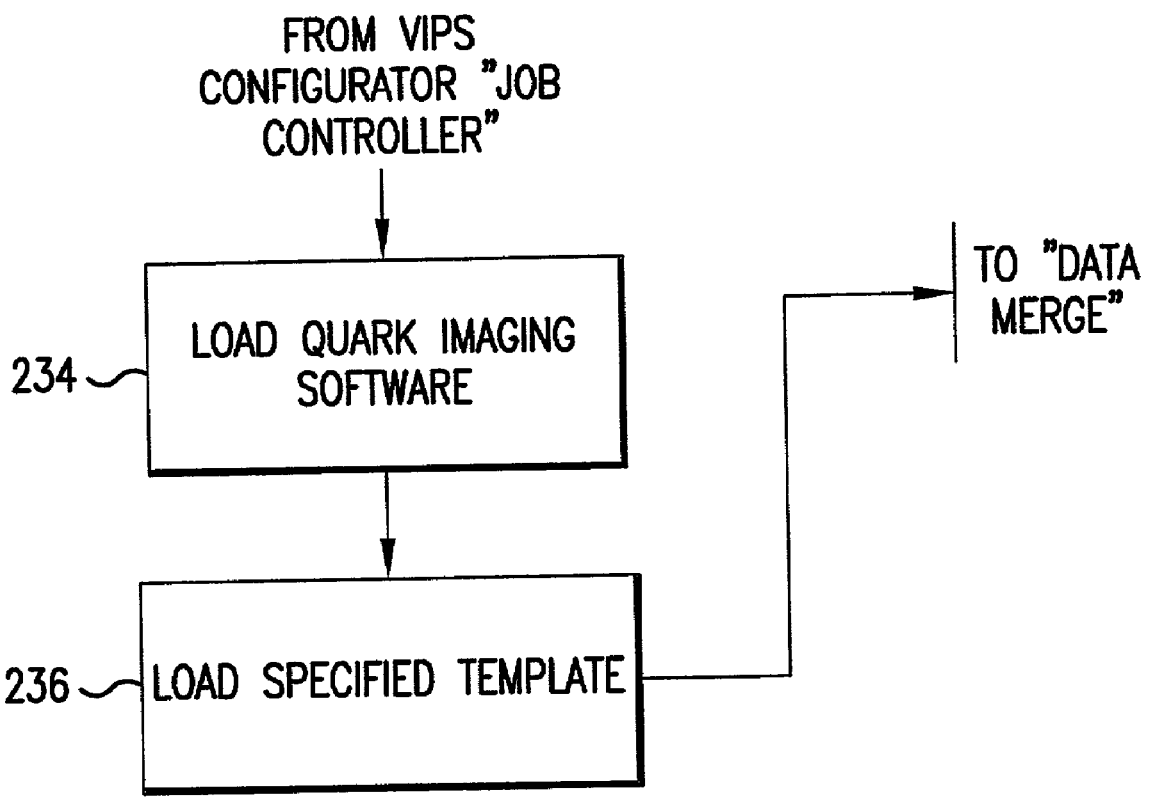
Figure 46B:
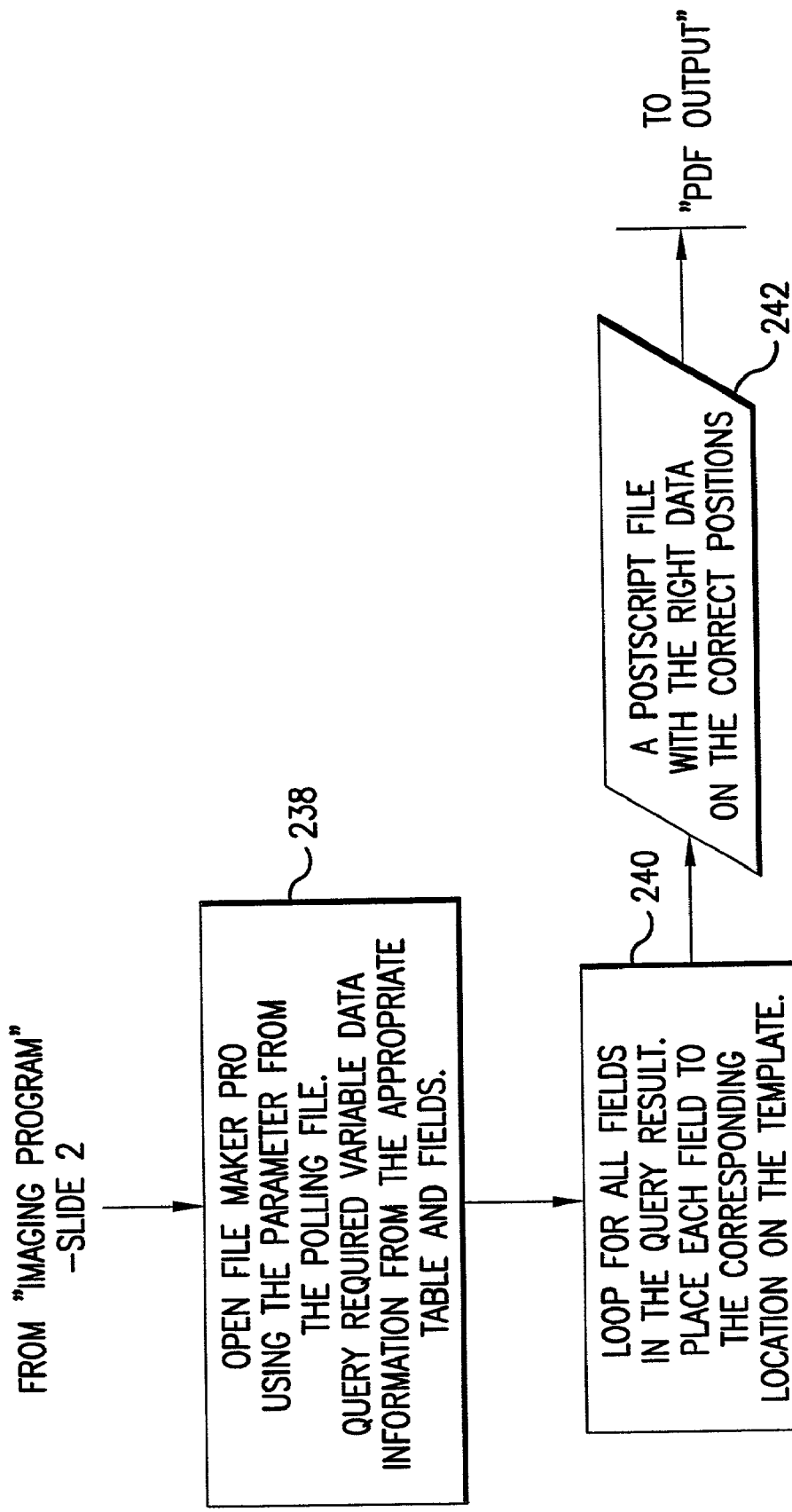
Figure 46C:
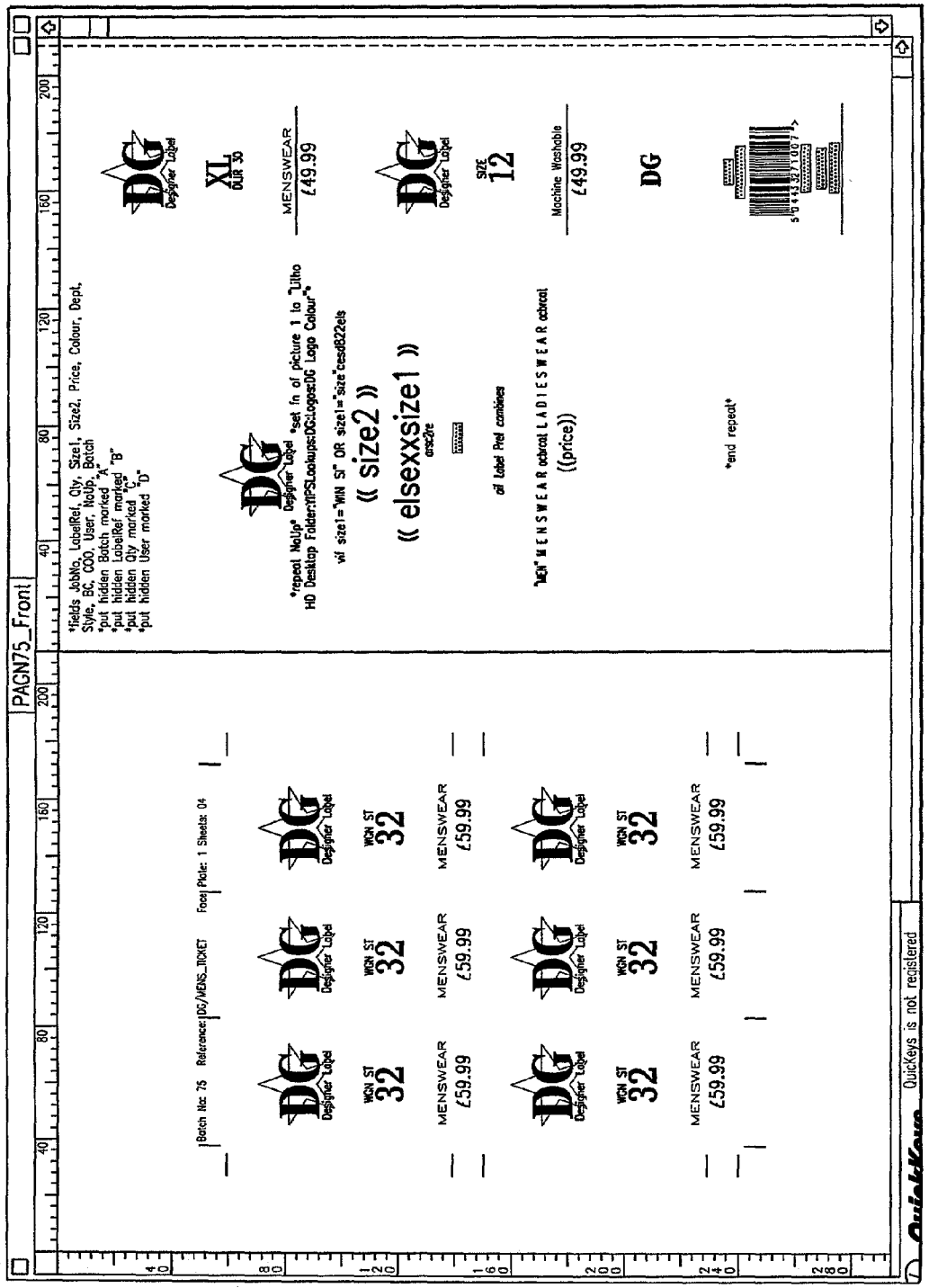
Figure 47A:
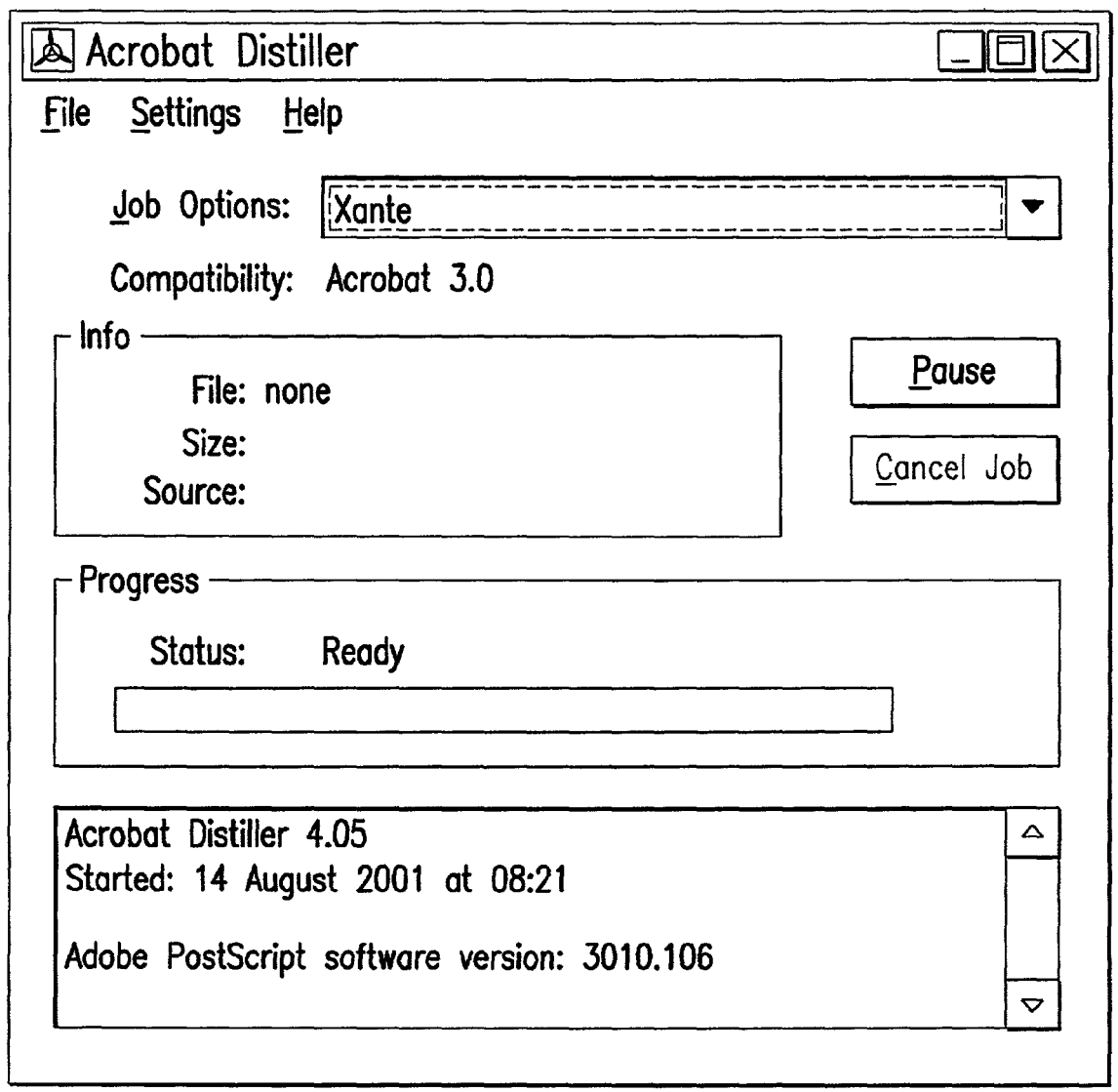
Figure 47B:
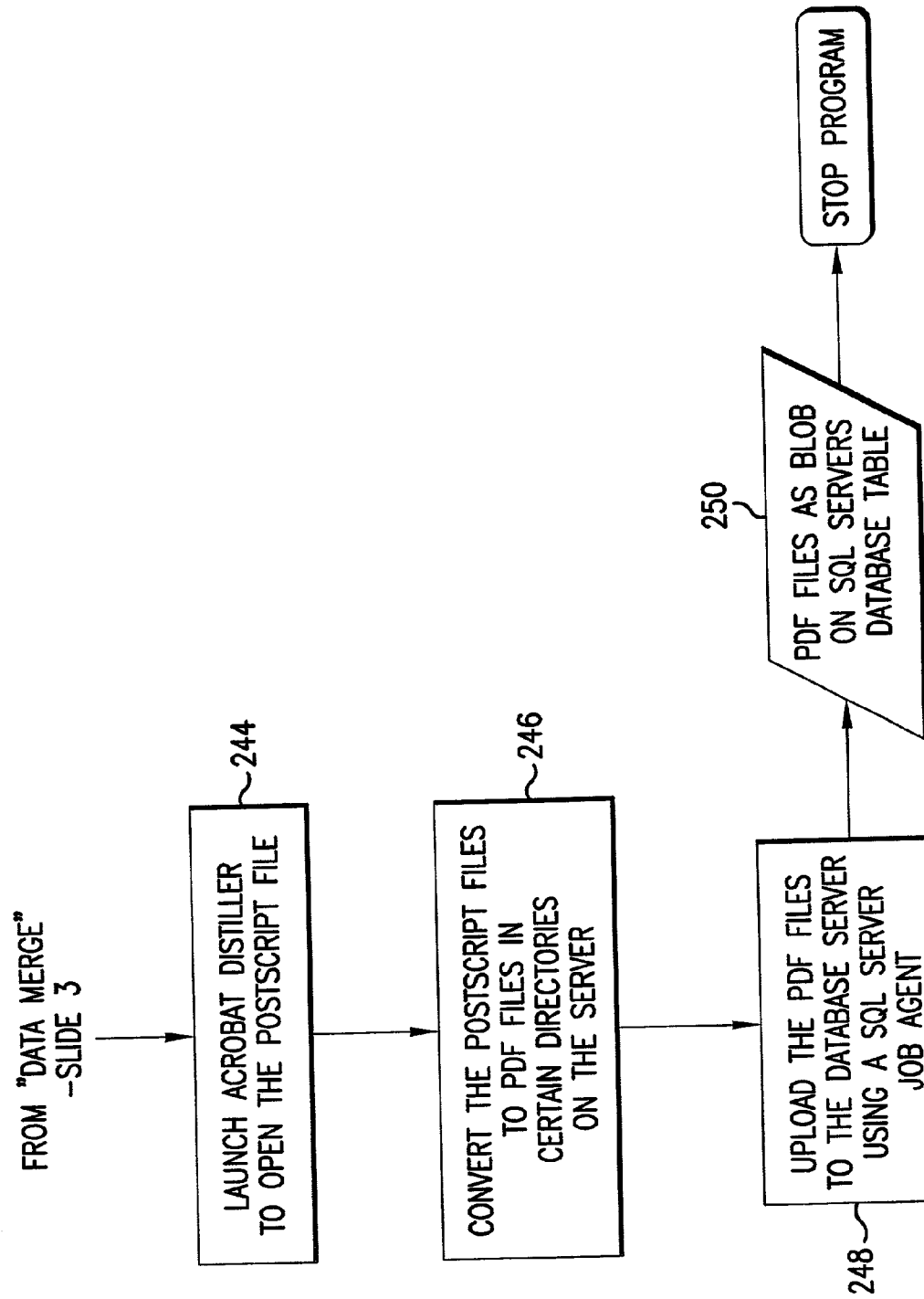
Figure 47D:
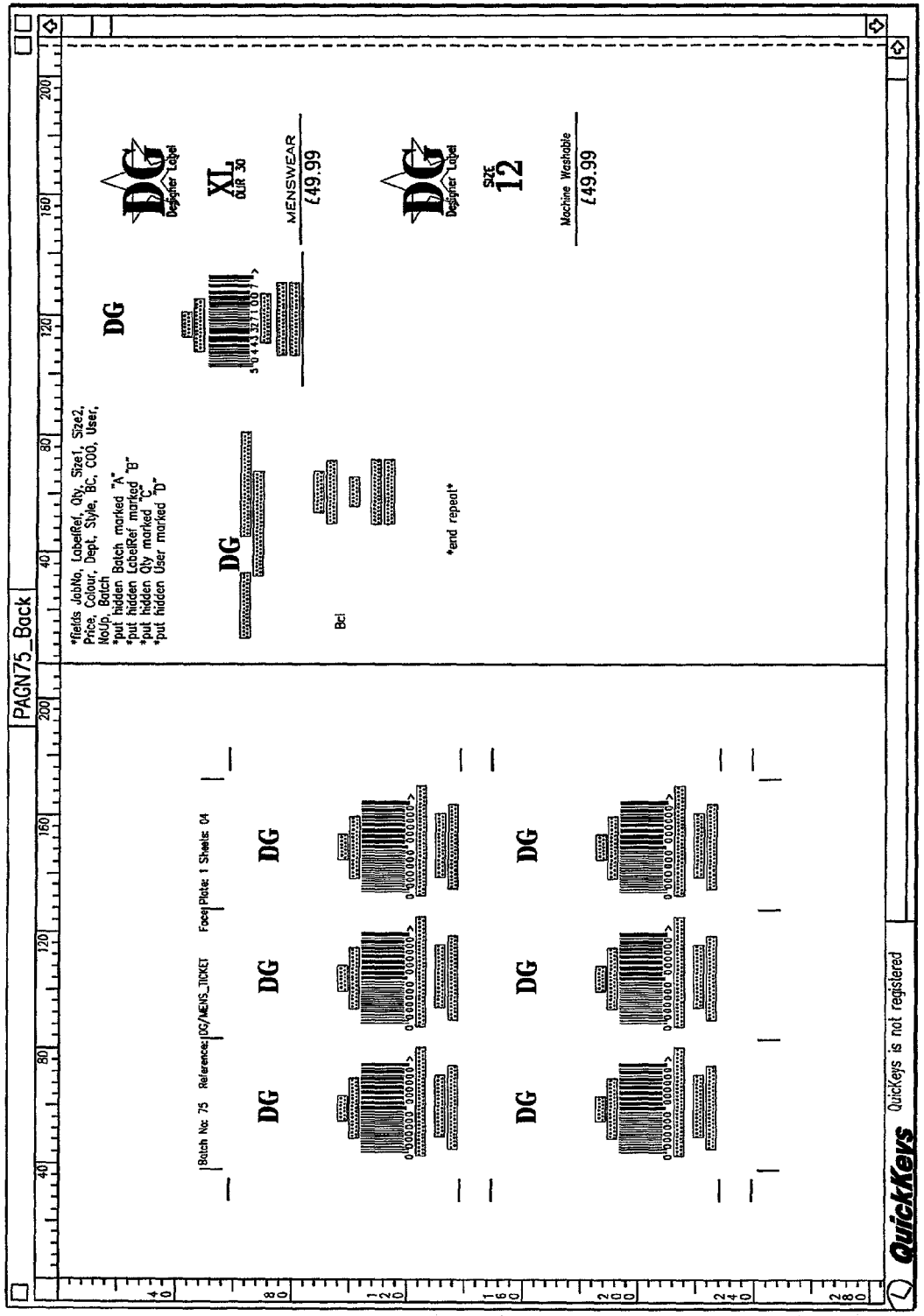

Returning to FIG. 44B, an administrator, in communication with the server 30 by using a P.C. or the like can monitor the job controller via the screen depicted in FIG. 44A. If the administrator or user chooses "completed jobs" from the screen of FIG. 44A as determined at block 260, a list of completed jobs will be sent at block 262 to the user for display. If the user chooses "logs" as determined at block 264, at block 266 the job controller log file will be sent to the user for display. If the user chooses "available templates" as determined at block 267, the identification of templates accessible by the server 30 are sent at block 268 to the user for display. If the user chooses the "select upload folder" option as determined at block 270, at block 272 the upload folder is amended to modify the jobs therein. If the user chooses a "select download folder" as determined at block 274, at block 276, the download folder is amended. If the user chooses the "start processing" button as determined at block 278, at block 280, the job controller begins processing received job files. The user can also choose to exit as determined at block 282 in which case the program is stopped.

As will be apparent from above, the label production system and method of the present invention allows labels to be produced at remote locations worldwide that are in communication with the server 14 and central database 16 via the internet 12. Once orders are selected to be processed together as a job, the system of the present invention provides automatic typesetting so as to generate the production, image data files required by the particular production machines to be used in printing the labels. The production data files are generated by merging the data in the job file with a template selected in accordance with the printing method and/or machine type selected. Moreover, new products can be easily added to the system due to the hierarchy of store groups, schemas, label types, label references, i.e. products and items, i.e. variable data fields used in accordance with the present invention. This hierarchy also allows new web pages to be automatically generated as the schema files and associated tables are updated with new information defining the new products. Many modifications and variations of the present invention are possible in light of the above teachings. Thus, it is to be understood that, within the scope of the appended claims, the invention may be practiced otherwise than as described hereinabove.

The invention claimed is:

1. A method of determining a number of plates to be used to print a predetermined number of labels, each plate having a fixed number of label positions to allow the simultaneous printing of a plurality of labels with the same or different data comprising:

determining a minimum number of plates to print the predetermined number of labels;

determining a total number of times that each of the determined minimum number of plates must be run to print the predetermined number of labels;

comparing the total run time number to a reference number to determine whether to increase the number of plates to be used to print the predetermined number of labels; and displaying information representing the number of plates to be used to print the predetermined number of labels.

2. A method of determining a number of plates to be used to print a predetermined number of labels as recited in claim 1 wherein the reference number is a function of the predetermined number of labels to be printed and the fixed number of label positions on a plate.

3. A method of determining a number of plates to be used to print a predetermined number of labels as recited in claim 1 wherein the minimum number of plates is determined based on the number of different label types and the fixed number of label positions on a plate.

4. A method of determining a number of plates to be used to print a predetermined number of labels as recited in claim 1 wherein the step of determining the total number of times that each of the plates must be run includes determining a number of label positions on at least one plate to be used for printing labels with the same data.

5. A method of determining a number of plates to be used to print a predetermined number of labels as recited in claim 4 wherein a quantity of labels with the same data can be printed by splitting the quantity between two or more plates.

6. A method of determining a number of plates to be used to print a predetermined number of labels as recited in claim 1 including increasing the number of plates based on the comparing step; determining a new total number of times that each of the increased number of plates must be run to print the predetermined number of labels; and comparing the new total to the previously determined total to determine whether to increase or decrease the number of plates.

7. A method of determining a number of plates to be used to print a predetermined number of labels as recited in claim 6 wherein the comparing step determines whether the new total is within a predetermined range of the previously determined total.

8. A method of determining a number of plates to be used to print a predetermined number of labels as recited in claim 7 wherein the range represents an approximate cost of a plate relative to an approximate cost of a sheet of material on which the fixed number of labels are printed using a plate.

9. A method of determining a number of plates to be used to print a predetermined number of labels, each plate having a fixed number of label positions to allow the simultaneous printing of a plurality of labels of the same or different type where labels of the same type have the same data printed thereon comprising:
  determining a minimum number of plates to print the predetermined number of labels based on the number of different label types to be printed;
  determining for each different label type a number of label positions on at least one plate to be used for printing the labels of that type;
  determining a total number of times that each of the determined minimum number of plates must be run to print the predetermined number of labels; and
  comparing the total run time number to a reference number to determine whether to increase the number of plates to be used to print the predetermined number of labels; and
  displaying information representing the number of plates to be used to print the predetermined number of labels.

10. A method of determining a number of plates to be used to print a predetermined number of labels as recited in claim 9 wherein the reference number is a function of the predetermined number of labels to be printed and the fixed number of label positions on a plate.

11. A method of determining a number of plates to be used to print a predetermined number of labels as recited in claim 10 wherein the comparing step determines whether the total run time number is within a predetermined range of the reference.

12. A method of determining a number of plates to be used to print a predetermined number of labels as recited in claim 11 wherein the range represents an approximate cost of a plate relative to an approximate cost of a sheet of material on which the fixed number of labels are printed using a plate.

13. A method of determining a number of plates to be used to print a predetermined number of labels as recited in claim 9 wherein the minimum number of plates is equal to the number of different label types to be printed divided by the fixed number of label positions on a plate.

14. A method of determining a number of plates to be used to print a predetermined number of labels as recited in claim 9 wherein a quantity of labels with the same data can be printed by splitting the quantity between two or more plates.

15. A method of determining a number of plates to be used to print a predetermined number of labels as recited in claim 9 including increasing the number of plates based on the comparing step; determining a new total number of times that each of the increased number of plates must be run to print the predetermined number of labels; and comparing the new total to the previously determined total to determine whether to increase or decrease the number of plates.

16. A method of determining a number of plates to be used to print a predetermined number of labels, each plate having a fixed number of label positions to allow the simultaneous printing of a plurality of labels of the same or different type where labels of the same type have the same data printed thereon comprising:
  receiving an order to print a plurality of labels including labels of different types, the order identifying a quantity to be printed for each different type of label;
  determining a minimum number of plates to print the predetermined number of labels based on the number of different label types to be printed;
  determining for each different label type a number of label positions on at least one plate to be used for printing the labels of that type;
  determining a total number of times that each of the determined minimum number of plates must be run to print the predetermined number of labels; and
  comparing the total run time number to a reference number to determine whether to increase the number of plates to be used to print the predetermined number of labels; and
  displaying information representing the number of plates to be used to print the predetermined number of labels.

17. A method of determining a number of plates to be used to print a predetermined number of labels as recited in claim 16 wherein the reference number is a function of the predetermined number of labels to be printed and the fixed number of label positions on a plate.

18. A method of determining a number of plates to be used to print a predetermined number of labels as recited in claim 17 wherein the comparing step determines whether the total run time number is within a predetermined range of the reference.

19. A method of determining a number of plates to be used to print a predetermined number of labels as recited in claim 18 wherein the range represents an approximate cost of a plate relative to an approximate cost of a sheet of material on which the fixed number of labels are printed using a plate.

20. A method of determining a number of plates to be used to print a predetermined number of labels as recited in claim 16 wherein the minimum number of plates is equal to the number of different label types to be printed divided by the fixed number of label positions on a plate.

21. A method of determining a number of plates to be used to print a predetermined number of labels as recited in claim 16 wherein a quantity of labels with the same data can be printed by splitting the quantity between two or more plates.

22. A method of determining a number of plates to be used to print a predetermined number of labels as recited in claim 16 including increasing the number of plates based on the comparing step; determining a new total number of times that each of the increased number of plates must be run to print the predetermined number of labels; and comparing the new total to the previously determined total to determine whether to increase or decrease the number of plates.

23. A method of determining a number of plates to be used to print a predetermined number of labels, each plate having a fixed number of label positions to allow the simultaneous printing of a plurality of labels of same or different types comprising:
  determining a minimum number of plates to print the predetermined number of labels;
  calculating a first value representing an estimated production cost based on the minimum number of plates;
  increasing the number of plates to be used to print the predetermined number of labels;
  calculating a second value representing an estimated production cost based on the increased number of plates; and
  comparing the first and second values to determine the number of plates to be used; and displaying information representing the number of plates to be used.

24. A method of determining a number of plates to be used to print a predetermined number of labels as recited in claim 23 wherein the first value represents the total number of times that each plate of the minimum number must be run to print the predetermined number of labels.

25. A method of determining a number of plates to be used to print a predetermined number of labels as recited in claim 23 wherein the second value represents the total number of times that each plate of the increased number must be run to print the predetermined number of labels.

26. A method of determining a number of plates to be used to print a predetermined number of labels as recited in claim 23 wherein the comparing step determines whether the second value is within a predetermined range of the first value.

27. A method of determining a number of plates to be used to print a predetermined number of labels as recited in claim 26 wherein the range represents an approximate cost of a plate relative to an approximate cost of a sheet of material on which the fixed number of labels are printed using a plate.

* * * * *